United States Patent
Xiao et al.

(10) Patent No.: US 11,495,865 B2
(45) Date of Patent: Nov. 8, 2022

(54) MICROLAYER MEMBRANES, IMPROVED BATTERY SEPARATORS, AND RELATED METHODS

(71) Applicant: Celgard, LLC, Charlotte, NC (US)

(72) Inventors: Kang Karen Xiao, Mississauga (CA); Eric J. Penegar, Fort Mill, SC (US); Takahiko Kondo, Charlotte, NC (US); Robert Nark, Fort Mill, SC (US); Eric R. White, Fort Mill, SC (US); Xiaomin Zhang, Charlotte, NC (US); Kristoffer K. Stokes, Lunenburg, MA (US); Stefan Reinartz, Waxhaw, NC (US); Masaaki Okada, Charlotte, NC (US)

(73) Assignee: Celgard, LLC, Charlotte, NC (US)

( * ) Notice: Subject to any disclaimer, the term of this patent is extended or adjusted under 35 U.S.C. 154(b) by 372 days.

(21) Appl. No.: 16/348,658

(22) PCT Filed: Nov. 10, 2017

(86) PCT No.: PCT/US2017/061026
§ 371 (c)(1),
(2) Date: May 9, 2019

(87) PCT Pub. No.: WO2018/189748
PCT Pub. Date: May 17, 2018

(65) Prior Publication Data
US 2020/0028139 A1    Jan. 23, 2020

Related U.S. Application Data

(60) Provisional application No. 62/508,360, filed on May 18, 2017, provisional application No. 62/420,781, filed on Nov. 11, 2016.

(51) Int. Cl.
*H01M 50/449*    (2021.01)
*H01M 10/052*    (2010.01)
(Continued)

(52) U.S. Cl.
CPC ....... *H01M 50/449* (2021.01); *B29C 48/0018* (2019.02); *B29C 48/0021* (2019.02);
(Continued)

(58) Field of Classification Search
None
See application file for complete search history.

(56) References Cited

U.S. PATENT DOCUMENTS

| 5,223,032 A | 6/1993 | Gaudio et al. |
| 5,240,655 A | 8/1993 | Troffkin et al. |

(Continued)

FOREIGN PATENT DOCUMENTS

| EP | 0924780 | 6/1999 |
| EP | 2832542 | 2/2015 |

(Continued)

OTHER PUBLICATIONS

EP Extended Search report dated Sep. 25, 2020; from counterpart EP Application No. 17868593.9.
(Continued)

*Primary Examiner* — Karie O'Neill Apicella
(74) *Attorney, Agent, or Firm* — Hammer & Associates, P.C.

(57) ABSTRACT

Described herein is a multilayer microporous film or membrane that may exhibit improved properties, including improved dielectric break down and strength, compared to prior monolayer or tri-layer microporous membranes of the same thickness. The preferred multilayer microporous membrane comprises microlayers and one or more lamination barriers. Also disclosed is a battery separator or battery comprising one or more of the multilayer microporous films or membranes. The inventive battery and battery separator is preferably safer and more robust than batteries and battery separators using prior monolayer and tri-layer microporous
(Continued)

membranes. Also, described herein is a method for making the multilayer microporous separators, membranes or films described herein.

18 Claims, 45 Drawing Sheets

(51) Int. Cl.
| | |
|---|---|
| H01M 50/457 | (2021.01) |
| H01M 50/417 | (2021.01) |
| H01M 50/497 | (2021.01) |
| H01M 50/489 | (2021.01) |
| H01M 50/494 | (2021.01) |
| H01M 50/491 | (2021.01) |
| B29C 48/08 | (2019.01) |
| B29C 48/21 | (2019.01) |
| B29C 48/00 | (2019.01) |
| B32B 27/08 | (2006.01) |
| B32B 27/32 | (2006.01) |
| B29C 48/07 | (2019.01) |
| B32B 27/00 | (2006.01) |
| H01M 50/403 | (2021.01) |
| H01M 50/411 | (2021.01) |
| B29L 31/34 | (2006.01) |
| H01M 10/0525 | (2010.01) |
| B29K 23/00 | (2006.01) |
| B29L 31/00 | (2006.01) |

(52) U.S. Cl.
CPC .............. *B29C 48/07* (2019.02); *B29C 48/08* (2019.02); *B29C 48/21* (2019.02); *B32B 27/00* (2013.01); *B32B 27/08* (2013.01); *B32B 27/32* (2013.01); *H01M 10/052* (2013.01); *H01M 50/403* (2021.01); *H01M 50/411* (2021.01); *H01M 50/417* (2021.01); *H01M 50/457* (2021.01); *H01M 50/489* (2021.01); *H01M 50/491* (2021.01); *H01M 50/494* (2021.01); *H01M 50/497* (2021.01); *B29K 2023/06* (2013.01); *B29K 2023/12* (2013.01); *B29L 2031/3468* (2013.01); *B29L 2031/755* (2013.01); *B32B 2250/02* (2013.01); *B32B 2250/03* (2013.01); *B32B 2250/04* (2013.01); *B32B 2250/05* (2013.01); *B32B 2250/242* (2013.01); *B32B 2264/0257* (2013.01); *B32B 2270/00* (2013.01); *B32B 2305/026* (2013.01); *B32B 2305/30* (2013.01); *B32B 2307/204* (2013.01); *B32B 2307/50* (2013.01); *B32B 2307/54* (2013.01); *B32B 2307/70* (2013.01); *B32B 2307/704* (2013.01); *B32B 2307/726* (2013.01); *B32B 2307/746* (2013.01); *B32B 2323/04* (2013.01); *B32B 2323/10* (2013.01); *B32B 2457/10* (2013.01); *H01M 10/0525* (2013.01); *Y02E 60/10* (2013.01)

(56) References Cited

U.S. PATENT DOCUMENTS

| | | |
|---|---|---|
| 5,952,120 A | 9/1999 | Yu et al. |
| 2005/0031943 A1 | 2/2005 | Call |
| 2007/0207376 A1 | 9/2007 | Call et al. |
| 2008/0057389 A1 | 3/2008 | Kono et al. |
| 2011/0206973 A1* | 8/2011 | Brant .................... B01D 69/12 |
| | | 429/145 |
| 2011/0223486 A1* | 9/2011 | Zhang ................. H01M 50/491 |
| | | 521/143 |
| 2014/0079980 A1 | 3/2014 | Halmo et al. |
| 2015/0183195 A1 | 7/2015 | Jeon et al. |

FOREIGN PATENT DOCUMENTS

| | | |
|---|---|---|
| WO | WO2010048395 | 4/2010 |
| WO | WO 2010048397 | 4/2010 |
| WO | WO2010048397 | 4/2010 |
| WO | WO2010128370 | 11/2010 |
| WO | WO 2017023720 | 2/2017 |

OTHER PUBLICATIONS

EP Partial Search Report dated Jun. 17, 2020; from EP counterpart Application No. 17868593.9.
IPRP dated May 14, 2019; from counterpart PCT application No. PC/US2017/061026.
Written Opinion dated Feb. 21, 2018; from counterpart PCT application No. PC/US2017/061026.
Search Report dated Apr. 26, 2018; from counterpart PCT application No. PC/US2017/061026.

* cited by examiner

Surface of Example 1 at 3,000X

Surface of Example 1 at 10,000X

Surface of Example 1 at 30,000X

| Example | Comparative Example 1 | Example 1 | Example 2 | Comparative Example 2 | Example 3 | Example 4 | Comparative Example 3 | Example 5 | Comparative Example 4 | Comparative Example 6 |
|---|---|---|---|---|---|---|---|---|---|---|
| Thickness (μm) | 12.0 | 12.7 | 13.0 | 13.8 | 14.3 | 14.4 | 14.7 | 14.6 | 15.9 | 16.6 |
| Basis Weight (mg/cm²) | 0.66 | 0.69 | 0.7 | 0.76 | 0.70 | 0.76 | 0.76 | 0.73 | 0.75 | 0.79 |
| JIS Gurley (s/100cc) | 241 | 241 | 245 | 318 | 197 | 259 | 201 | 285 | 174 | 198 |
| % Shrinkage 105°C/1hr MD | 1.7 | 0.95 | 3.2 | 1.5 | 1.7 | 1.2 | 1.2 | 2.6 | 2.9 | 1.7 |
| MD Tensile (kgf/cm²) | 2439 | 2391 | 1804 | 2370 | 2085 | 2161 | 2110 | 2282 | 2074 | 2247 |
| MD Elongation (%) | 47 | 50 | 46 | 50 | 51 | 48 | 53 | 41 | 40 | 47 |
| TD Tensile (kgf/cm²) | 124 | 141 | 152 | 138 | 151 | 141 | 142 | 153 | 188 | 129 |
| TD Elongation (%) | 549 | 440 | 651 | 742 | 862 | 806 | 898 | 894 | 851 | 689 |
| Puncture Strength (gf) | 292 | 297 | 247 | 325 | 307 | 306 | 306 | 340 | 330 | 355 |

FIG. 22A

| | | | | | | | | From FIG. 22A |
|---|---|---|---|---|---|---|---|---|
| DB Average (V) | 1706 | 1733 | 1504 | 1930 | 1819 | 1954 | 1692 | 1826 | 1590 | 2060 |
| DB Min (V) | 1170 | 1329 | 1260 | 1450 | 1565 | 1570 | 1440 | 1520 | 1420 | 1585 |
| DB Std. Dev. (V) | 138 | 119 | 70 | 203 | 157 | 137 | 112 | 163 | 76 | 88 |
| Mix Penetration Average (N) | 554 | 656 | 563 | 669 | 696 | 696 | 572 | 548 | 660 | 639 |
| AQ Porosity (%) | 39.25 | 40.18 | 41.45 | 38.04 | 43.38 | 41.47 | 41.17 | 43.09 | 45.43 | 45.33 |
| AQ PP Pore Size (mm) | 0.0342 | 0.0415 | 0.0396 | 0.0323 | 0.0343 | 0.0395 | 0.0389 | 0.0388 | 0.0491 | 0.0443 |
| AQ PE Pore Size (mm) | 0.0548 | 0.0522 | 0.0899 | 0.0581 | 0.0751 | 0.0746 | 0.0741 | 0.0709 | 0.0829 | 0.0767 |
| AQ Surface Area (m²/g) | 82.61 | 71.46 | 75.46 | 78.50 | 92.83 | 76.14 | 78.16 | 81.31 | 73.80 | 82.82 |
| Shutdown Temp (°C) | 129.26 | 129.80 | 129.09 | 126.98 | 130.51 | 127.51 | 129.33 | 124.49 | 131.32 | 130.03 |
| Shutdown Speed (ohm-cm²) | 8687 | 20373 | 2881 | 10598 | 5157 | 10600 | 10598 | 8791 | 4477 | 6108 |

FIG. 22B

| Example | Comparative Example 1 | Example 1 | Example 2 | Comparative Example 2 | Example 3 | Example 4 | Comparative Example 3 | Example 5 | Comparative Example 4 | Comparative Example 6 |
|---|---|---|---|---|---|---|---|---|---|---|
| Thickness (μm) | 12.0 | 12.7 | 13.0 | 13.8 | 14.3 | 14.4 | 14.7 | 14.6 | 15.9 | 16.6 |
| Aquapore Porosity (%) | 41.29 | 40.42 | 41.4 | 39.87 | - | 41.99 | 42.88 | 43.32 | 47.65 | 45.96 |
| QC-ER (ohm-cm$^2$) | 0.94 | 1.06 | 1.57 | 1.27 | - | 1.26 | 1.16 | 1.64 | 1.02 | 1.03 |
| MacMillan Number | 6.8 | 7.1 | 10.3 | 7.2 | - | 7.6 | 7.0 | 9.3 | 5.2 | 5.8 |
| Calculated Tortuosity | 1.676 | 1.695 | 2.07 | 1.695 | - | 1.787 | 1.733 | 2.008 | 1.575 | 1.633 |

FIG. 23

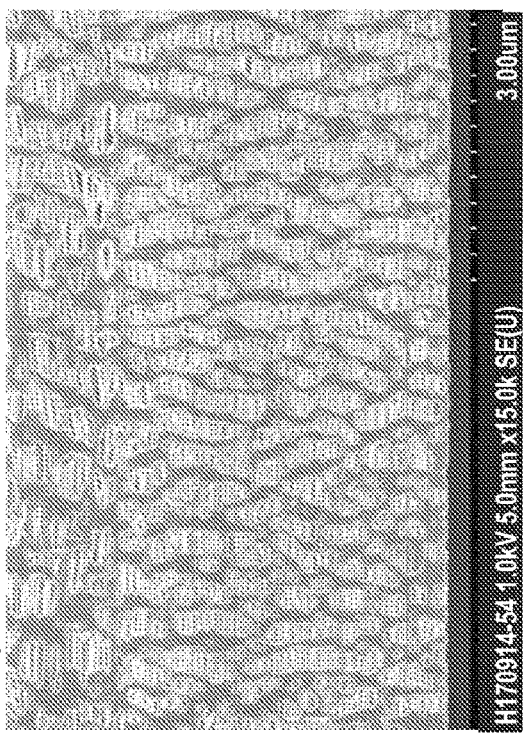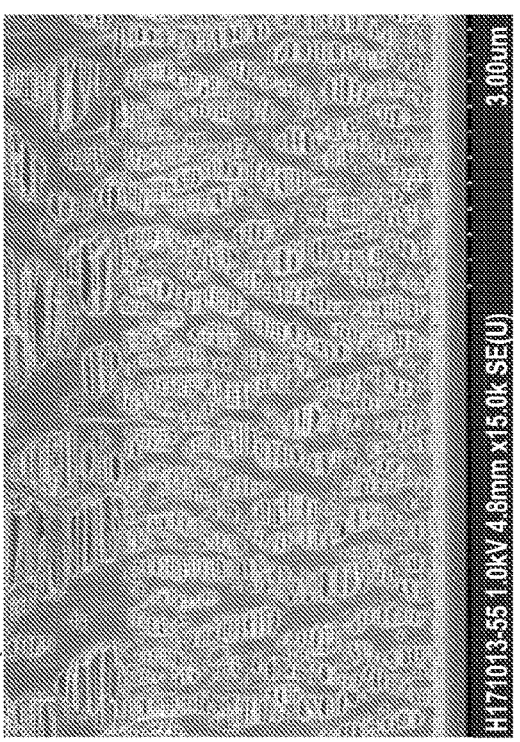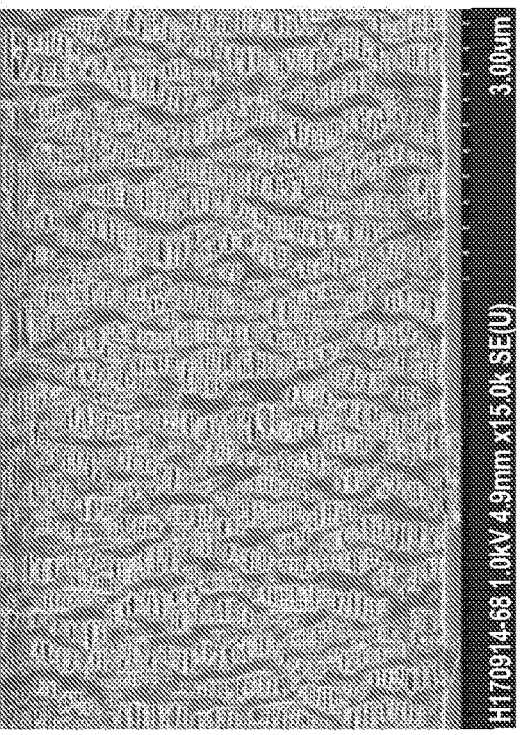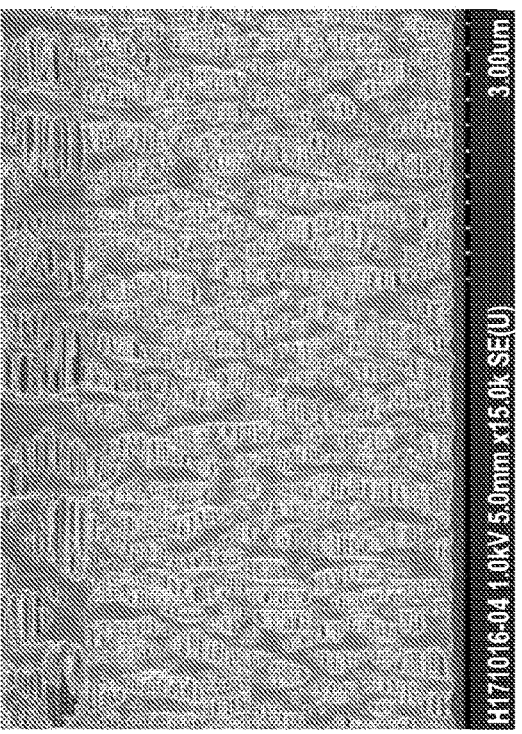
FIG. 24

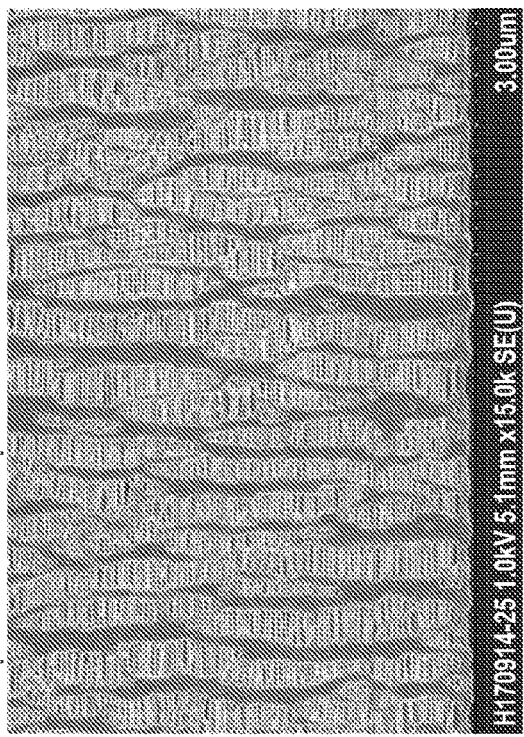
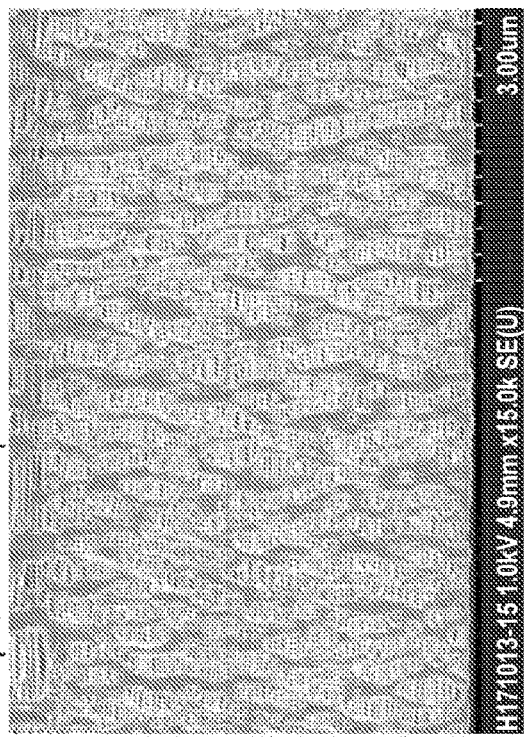
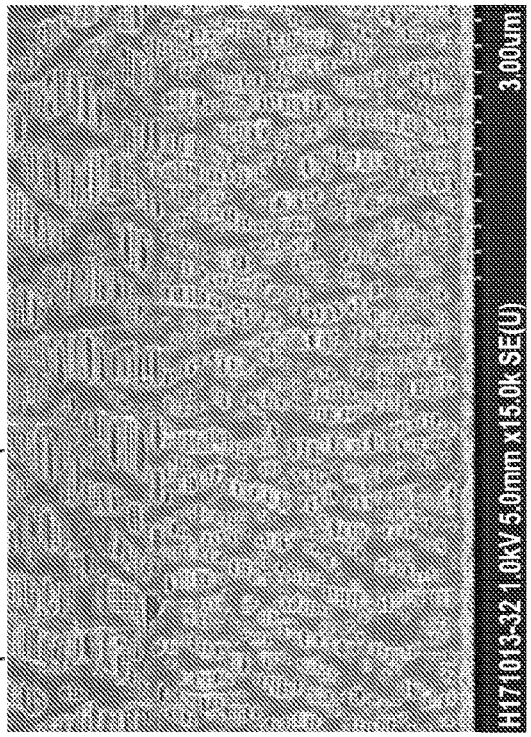
FIG. 25

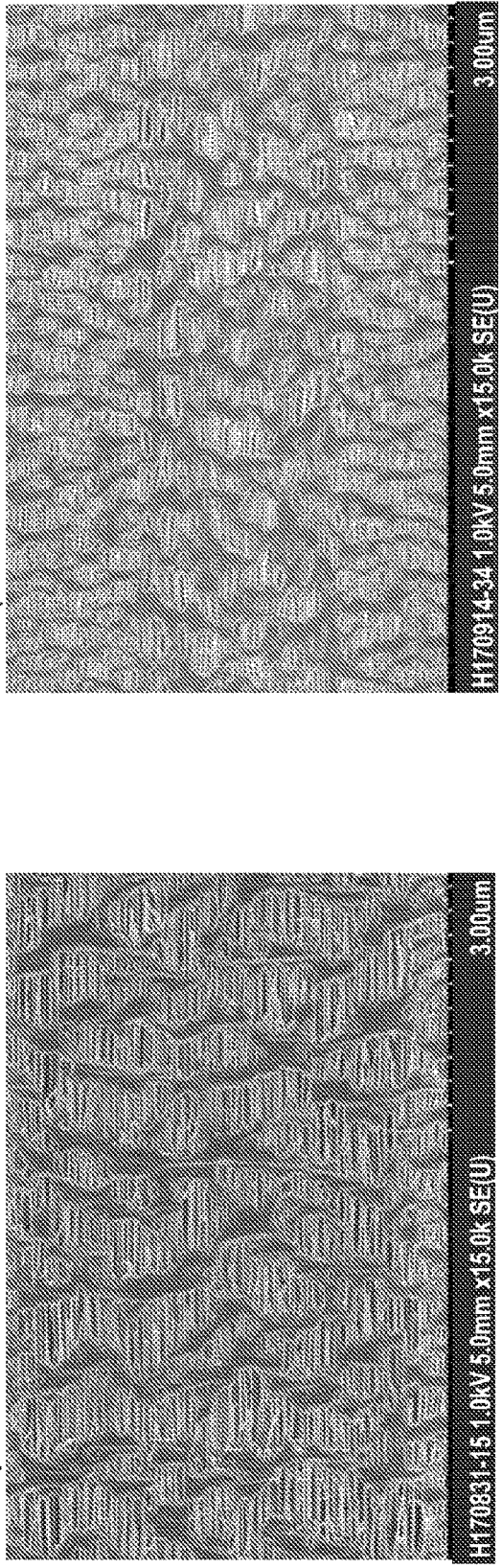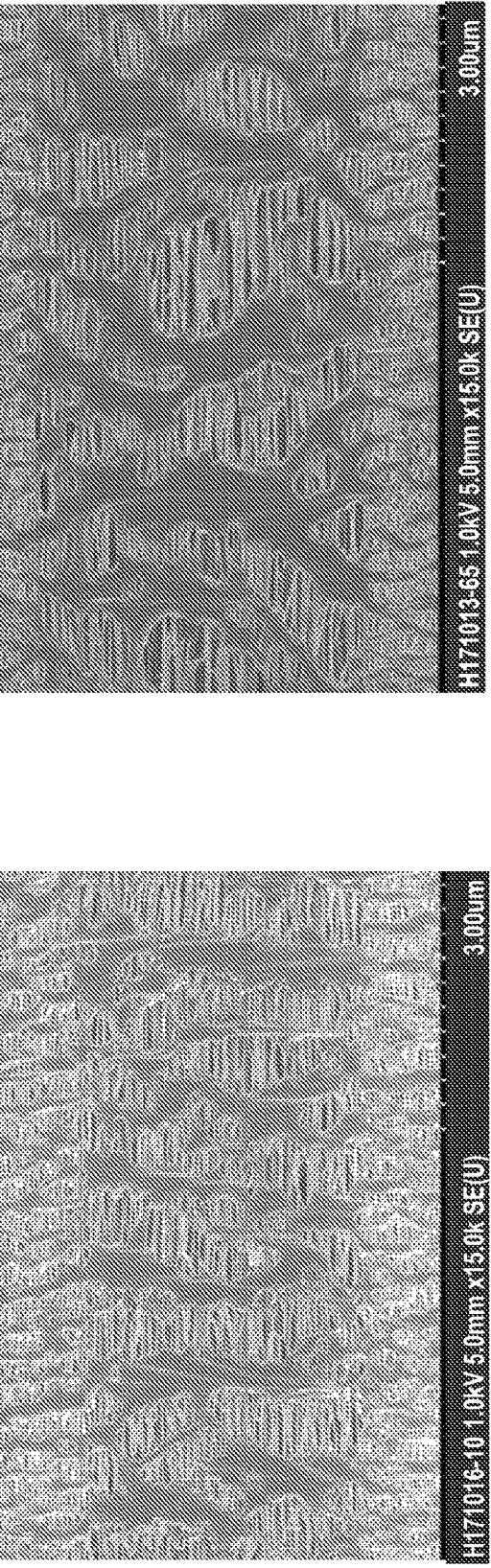
FIG. 26

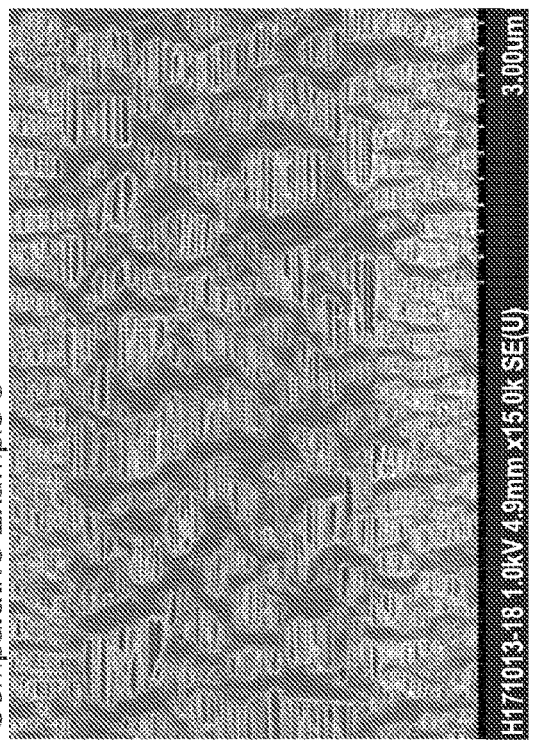
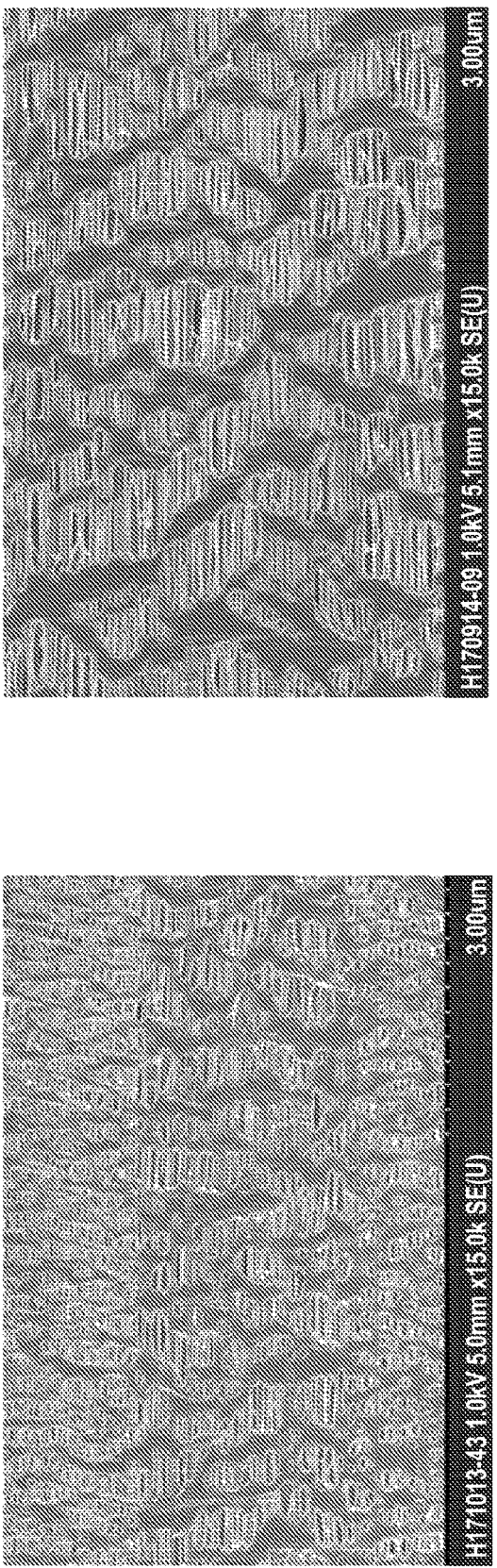
FIG. 27

Side-by-Side Comparison of PP layers of Tri-Layer Product and Multilayer Products
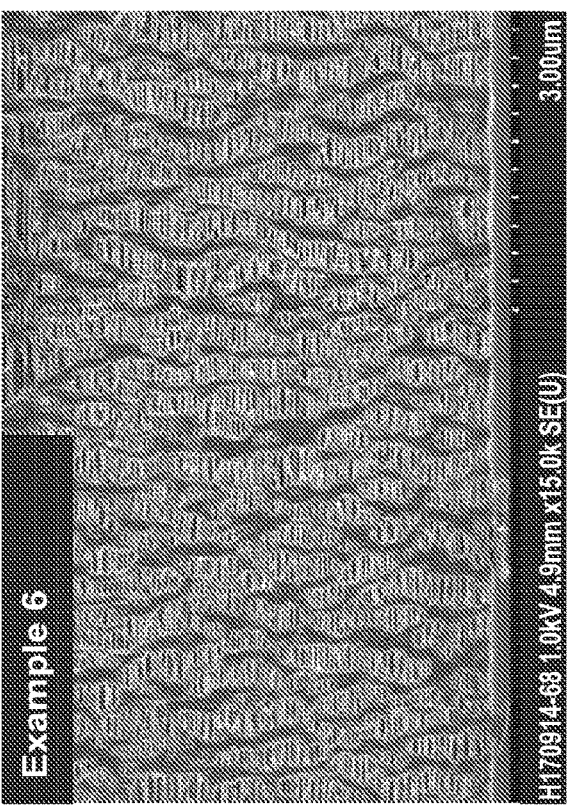
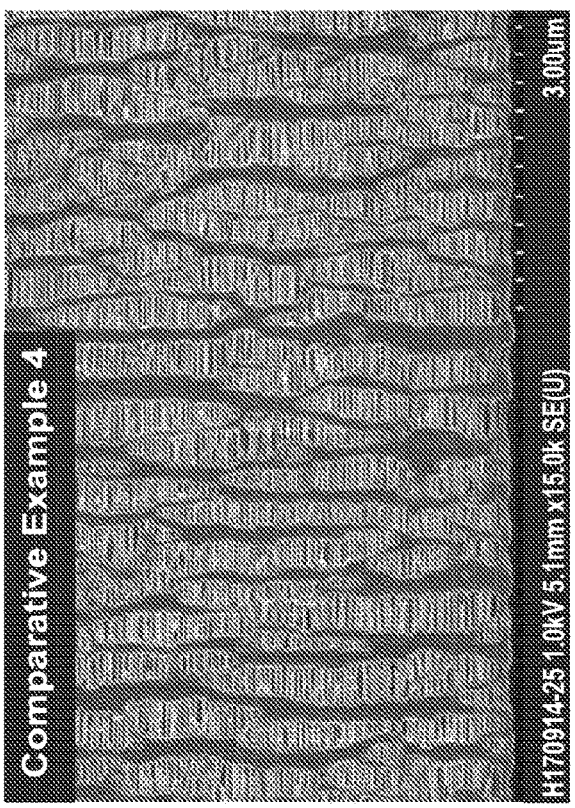
FIG. 28

Side-by-Side Comparison of PE layers of Tri-Layer Product and Multilayer Products
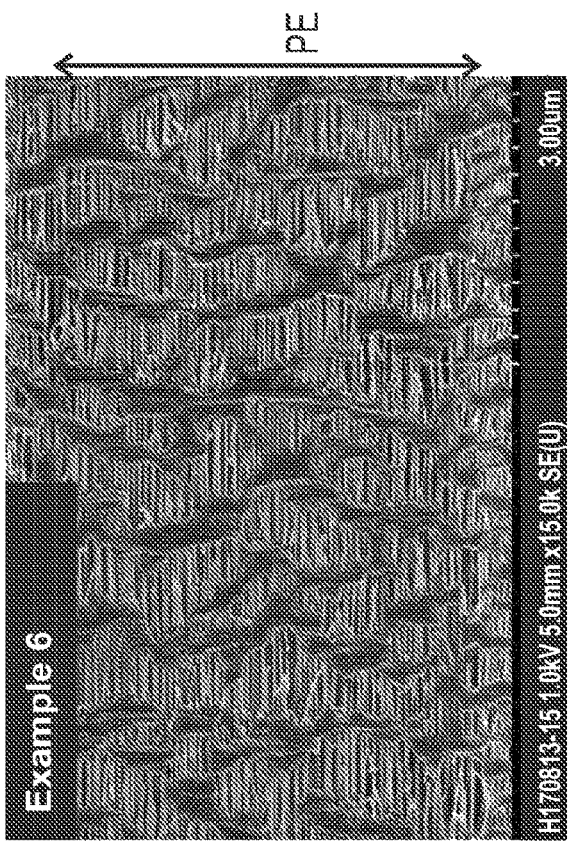
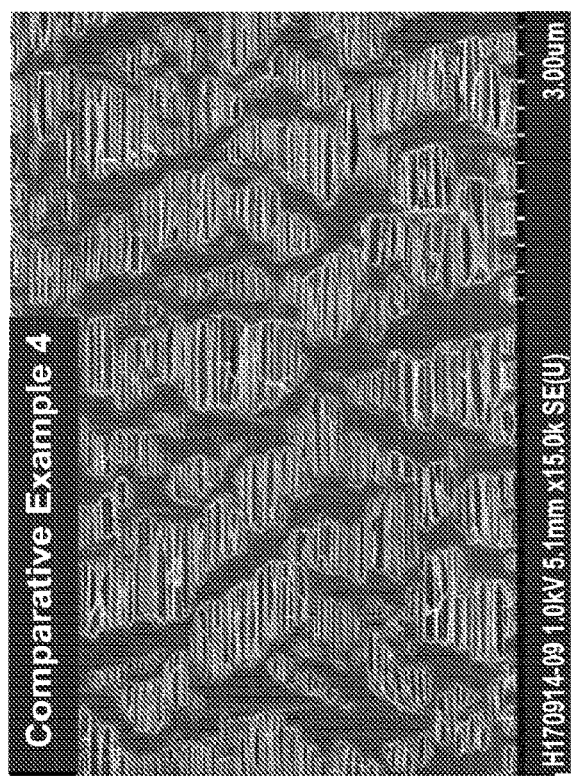
FIG. 29

Side-by-Side Comparison of Tri-Layer Product and Multilayer Products
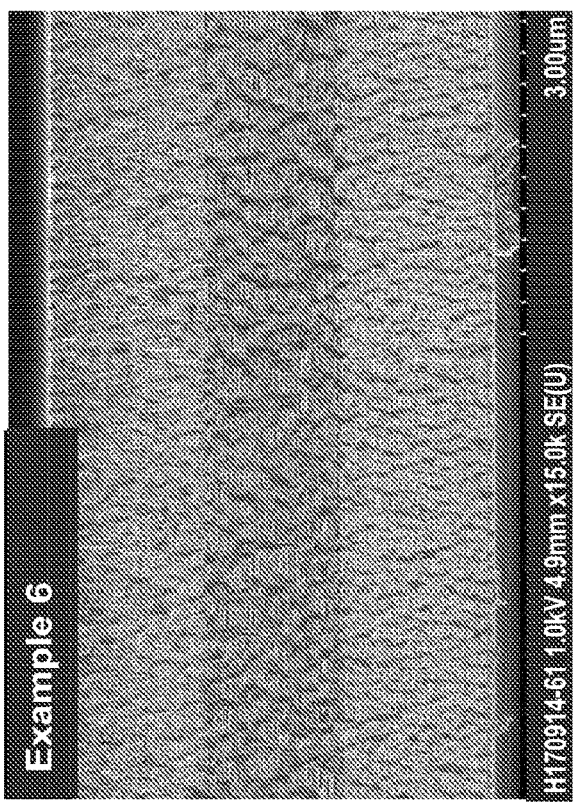
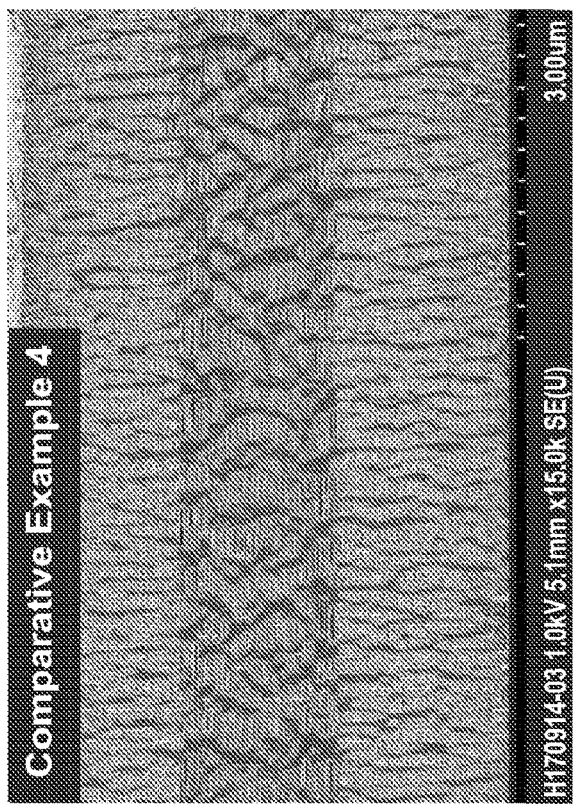
FIG. 30

| PE layer of | DSC (1st Cool Cycle) | | | | |
|---|---|---|---|---|---|
| | Area | Crystallinity | Peak | Onset | End |
| Comparative Example 1 | 239.7 | 82.1% | 111.5 | 100.74 | 119.03 |
| Example 1 | 200.7 | 68.7% | 111.7 | 101.47 | 118.96 |
| Comparative Example 2 | 227.2 | 77.8% | 112 | 101.65 | 119.37 |
| Comparative Example 3 | 192.5 | 65.9% | 115.2 | 110.53 | 119.3 |
| Example 5 | 220.4 | 75.5% | 113.9 | 102.53 | 119.2 |
| Example 3 | 208.9 | 71.5% | 112.4 | 102.01 | 119.48 |
| Comparative Example 4 | 253.5 | 86.8% | 110.5 | 100.38 | 119.05 |
| Example 6 | 235.7 | 80.7% | 114.2 | 103.71 | 119.31 |

| PE | DSC (1st Heat Cycle) | | | | |
|---|---|---|---|---|---|
| | Area | Crystallinity | Peak | Onset | End |
| Comparative Example 1 | 236.2 | 80.9% | 139.74 | 126.67 | 147.12 |
| Example 1 | 215.5 | 73.8% | 134.9 | 126.51 | 143.6 |
| Comparative Example 2 | 221.6 | 75.9% | 136.5 | 126.3 | 146.27 |
| Comparative Example 3 | 187.2 | 64.1% | 137.91 | 125.96 | 139.12 |
| Example 5 | 222.7 | 76.3% | 135.82 | 125.97 | 144.7 |
| Example 3 | 220 | 75.3% | 136.8 | 129.01 | 145.4 |
| Comparative Example 4 | 240 | 82.2% | 139.2 | 127.71 | 127.71 |
| Example 6 | 237.1 | 81.2% | 137.68 | 128.22 | 128.22 |

FIG. 31

| PP layer of | DSC (1st Cool Cycle) | | | | |
|---|---|---|---|---|---|
| | Area | Crystallinity | Peak | Onset | End |
| Comparative Example 1 | 102.4 | 62.1% | 113.7 | 109.33 | 116.81 |
| Example 1 | 108.4 | 65.7% | 113.8 | 110.03 | 119.11 |
| Comparative Example 3 | 112 | 67.9% | 111.5 | 106.98 | 113.54 |
| Comparative Example 2 | 106.8 | 64.7% | 113.5 | 108.98 | 118.79 |
| Example 5 | 96.13 | 58.3% | 114.4 | 109.57 | 119.73 |
| Example 3 | 106.1 | 64.3% | 115 | 110.59 | 117.72 |
| Comparative Example 4 | 105 | 63.6% | 113.4 | 109.29 | 119.7 |
| Example 6 | 103.9 | 63.0% | 111.5 | 107.6 | 115.82 |

| PP layer of | DSC (1st Heat Cycle) | | | | |
|---|---|---|---|---|---|
| | Area | Crystallinity | Peak | Onset | End |
| Comparative Example 1 | 105.2 | 63.8% | 164.28 | 156.49 | 173.41 |
| Example 1 | 104.7 | 63.5% | 165.73 | 156.5 | 173.37 |
| Comparative Example 3 | 94.78 | 57.4% | 164.04 | 157.6 | 171.6 |
| Comparative Example 2 | 103.3 | 62.6% | 164.33 | 155.46 | 173.48 |
| Example 5 | 89.41 | 54.2% | 164.39 | 156.1 | 174.93 |
| Comparative Example 4 | 105.4 | 63.9% | 164.14 | 156.41 | 173.72 |
| Example 6 | 101.4 | 61.5% | 165.37 | 156.14 | 174.76 |
| Example 6 | 104.8 | 63.5% | 159 | 148.98 | 167.85 |

FIG. 32

Normalization x into x'(in PP)

Normalization X to X'

$x = [x\_0, x\_1, ..., x\_10]$ — elements in the vector $x'\_k = (x\_k - m\_k)/s\_k$ vector m: mean vector
0.12125274202
0.09327029694
0.06376138321
0.04716285226
0.04109947876
0.04556129909
0.06638935575
0.14391393623
0.37369571461
3.4704138637
569.83050847 s: standard deviation vector
0.01778904602
0.01262267414
0.01092807460
0.00952236047
0.00919810029
0.00802167410
0.00965575771
0.01357293995
0.05563570961
0.18132697935
52.68814157

FIG. 34

Normalization x into x'(in PE)

Normalization X to X'

$x'\_k = (x\_k - m\_k)/s\_k$ $x = [x\_0, x\_1, ..., x\_10]$ — elements in the vector vector

| m: mean vector | s: standard deviation vector |
|---|---|
| 0.07536590216810 | 0.02127091385390 |
| 0.06474424044740 | 0.01563035263610 |
| 0.05244593482800 | 0.01008871998230 |
| 0.04418427056260 | 0.00610554172426 |
| 0.04249710598360 | 0.00588628646619 |
| 0.04952614540710 | 0.00509466227247 |
| 0.07451567913920 | 0.00868424601387 |
| 0.15315494777 | 0.01772494443105 |
| 0.43402815123800 | 0.04997262050470 |
| 3.51412063686 | 0.21792555552830 |
| 480.02173913 | 60.53174306690 |

FIG. 36

Coefficients and Boundary parameter (PE)

Using PE features, $w^T x' < a-b$  $a=0$  $w^T x' < a-b$ accu1: correct(9layer) / 9layer
accu2: correct(9layer) / classify(9layer)
accu3: correct(3layer) / classify(3layer)
accu4: correct(3layer) / 3layer

| a | a-b | accu1 | accu2 | accu3 | accu4 |
|---|---|---|---|---|---|
| -2 | -2.6542 | 0.988 | 0.782 | 0.857 | 0.414 |
| -1 | -1.6542 | 0.952 | 0.822 | 0.842 | 0.552 |
| 0 | -0.6542 | 0.810 | 0.895 | 0.657 | 0.793 |
| 1 | 0.3457 | 0.603 | 0.927 | 0.510 | 0.897 |
| 2 | 1.3457 | 0.381 | 1.000 | 0.426 | 1.000 |

| w 0: | 0.0026717153 |
| w 1: | -1.2072501509 |
| w 2: | -0.4883326802 |
| w 3: | 0.0172248418 |
| w 4: | -0.5467527574 |
| w 5: | -0.3892225728 |
| w 6: | 0.7356477088 |
| w 7: | 1.1574408691 |
| w 8: | -1.1992044378 |
| w 9: | -1.1920101147 |
| w 10: | 0.1068808983 |
| b: | 0.6542173447 |

Exemplary Co-Extruded Tri-Layer

| Homopolymer PP+Additive to Modify Surface Coefficient of Friction | Homopolymer PP+Copolymer PP | Homopolymer PP+Additive to Modify Surface Coefficient of Friction |
|---|---|---|

FIG. 38

A coextruded 2 layer PP precursor is proposed with the following structure:

Homopolymer PP + additive(s) to modify surface COF
Homopolymer PP + copolymer PP

FIG. 40

A coextruded 3 layer PP precursor is proposed with the following structure:

Homopolymer PP + additive(s) to modify surface COF
Homopolymer PP + copolymer PP
Hompolymer PP + additive(s) to modify surface COF

FIG. 41

A coextruded 3 layer PP precursor is proposed with the following structure:

Homopolymer PP + additive(s) to modify surface COF
Homopolymer PP + copolymer PP
Hompolymer PP + additive(s) to enhance coating adhesion

FIG. 42

A coextruded 4 layer PP precursor is proposed with the following structure:

<u>Homopolymer PP + additive(s) to modify surface COF</u>
<u>Homopolymer PP + copolymer PP</u>
<u>Homopolymer PP + copolymer PP</u>
Hompolymer PP + additive(s) to modify surface COF

FIG. 43

Another proposed 3 layer co-extruded sublayer or structure for a battery or textile application can be the following:

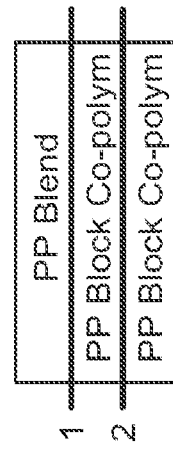

FIG. 44

A coextruded 2 layer PP membrane, separator, base film, sublayer, or precursor is proposed with the following structure:

Homopolymer PP + additive(s) to modify surface COF (to reduce the COF)
Homopolymer PP + copolymer PP (to reduce the shutdown temp)

FIG. 45

A coextruded 3 layer PP membrane, separator, base film, sublayer, or precursor is proposed with the following structure:

Homopolymer PP + additive(s) to modify surface COF (to reduce or increase the COF)
Homopolymer PP + copolymer PP (to reduce or increase the shutdown temperature)
Hompolymer PP + additive(s) to modify surface COF (to reduce or increase the COF)

FIG. 46

A coextruded 3 layer PP membrane, separator, base film, sublayer, or precursor is proposed with the following structure:

Homopolymer PP + additive(s) to modify the surface COF
Homopolymer PP + copolymer PP to modify the shutdown temperature
Hompolymer PP + additive(s) to modify the coating adhesion

FIG. 47

A coextruded 4 layer PP membrane, separator, base film, sublayer, or precursor is proposed with the following structure:

Homopolymer PP + additive(s) to modify the surface COF
Homopolymer PP + copolymer PP(s) to modify shutdown performance
Homopolymer PP + copolymer PP(s) to modify shutdown performance or the strength
Hompolymer PP + additive(s) to modify the surface COF, strength, or the coating adhesion

FIG. 48

A multilayer product example having the following sublayers laminated together:

The sublayer of any of Figs. 44 to 48
―――――――――――――――――――――
A PP or PE sublayer

FIG. 49

A multilayer product example having the following sublayers laminated together (an optional coating can be added to one or both sides):

The sublayer of any of Figs. 44 to 48
―――――――――――
A PP and/or PE sublayer
―――――――――――
A PP and/or PE sublayer, or the sublayer of any of Figs. 44 to 48

FIG. 50

MICROLAYER MEMBRANES, IMPROVED BATTERY SEPARATORS, AND RELATED METHODS

PRIORITY CLAIM

This application claims the benefit of and priority to co-pending International Application No. PCT/US2017/061026, filed Nov. 10, 2017, which claimed priority to and to the benefit of both U.S. Provisional Application No. 62/508,360 filed on May 18, 2017 and U.S. Provisional Application No. 62/420,781 filed on Nov. 11, 2016. These provisional applications are each incorporated by reference herein in their entirety.

FIELD OF THE INVENTION

In accordance with at least selected embodiments, the application, disclosure or invention relates to novel or improved membranes, separator membranes, separators, battery separators, secondary lithium battery separators, multilayer membranes, multilayer separator membranes, multilayer separators, multilayer battery separators, multilayer secondary lithium battery separators, and/or multilayer battery separators with improved properties, novel or improved batteries, capacitors, fuel cells, lithium batteries, lithium ion batteries, secondary lithium batteries, and/or secondary lithium ion batteries, and/or methods for making and/or using such membranes, separator membranes, separators, battery separators, secondary lithium battery separators, batteries, capacitors, fuel cells, lithium batteries, lithium ion batteries, secondary lithium batteries, and/or secondary lithium ion batteries, and/or devices, vehicles or products including the same. In accordance with at least certain embodiments, the disclosure or invention relates to novel or improved membrane layers, membranes or separator membranes, battery separators including such membranes, and/or related methods. In accordance with at least certain selected embodiments, the disclosure or invention relates to novel or improved porous polymer membranes or separator membranes, battery separators including such membranes, and/or related methods. In accordance with at least particular embodiments, the disclosure or invention relates to novel or improved microporous polyolefin membranes or separator membranes, microlayer membranes, multi-layer membranes including one or more microlayer or nanolayer membranes, battery separators including such membranes, and/or related methods. In accordance with at least certain particular embodiments, the disclosure or invention relates to novel, optimized or improved microporous stretched polymer membranes or separator membranes having one or more novel or improved exterior layers and/or interior layers, microlayer membranes, multi-layered microporous membranes or separator membranes having exterior layers and interior layers, some of which layers or sublayers are created by co-extrusion and then laminated together to form the novel, optimized or improved membranes or separator membranes. In some embodiments, certain layers, microlayers or nanolayers may comprise a homopolymer, a copolymer, block copolymer, elastomer, and/or a polymer blend. In select embodiments, at least certain layers, microlayers or nanolayers may comprise a different or distinct polymer, homopolymer, copolymer, block copolymer, elastomer, and/or polymer blend. The disclosure or invention also relates to novel or improved methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, and/or batteries, and/or methods of making and/or using such membranes, separators, composites, devices and/or batteries. In accordance with at least particular selected embodiments, the present application or invention is directed to novel or improved separator membranes that are multi-layered, in which one or more layers of the multi-layered structure is produced in a multi-layer or microlayer co-extrusion die with multiple extruders. The novel or improved membranes, separator membranes, or separators may preferably demonstrate improved shutdown, improved strength, improved dielectric breakdown strength, and/or reduced tendency to split.

BACKGROUND OF THE INVENTION

Known methods of making microporous bi-layered or tri-layered membranes, such as for use as battery separator membranes, include laminating or adhering two or more monolayer precursors together or coextruding more than one layer of membrane at the same time using a coextrusion die. Such methods are described in, for example, U.S. Pat. No. 5,952,120, U.S. 2014/0079980, U.S. Pat. Nos. 5,223,032, 5,240,655, and U.S. 2005/031943. The aforementioned methods may not fully optimize a balance of strength and/or performance properties for use in applications such as certain primary and/or secondary batteries, such as lithium ion rechargeable batteries. This is especially true as the battery separator requirements are becoming more demanding as customers want thinner and stronger battery separators. For example, a microporous trilayer membrane formed by coextruding the three layers may have reduced strength. Separators formed by laminating monolayers also may eventually not satisfy the ever-increasing demands.

Hence, there is a need for a new and improved multi-layered microporous membranes, base films, or battery separators having various improvements, such as improved tensile strength and improved dielectric breakdown strength.

SUMMARY OF THE INVENTION

In accordance with at least selected embodiments, the application, disclosure or invention may address the above needs, issues or problems and/or may provide novel or improved membranes, separator membranes, separators, battery separators, secondary lithium battery separators, multilayer membranes, multilayer separator membranes, multilayer separators, multilayer battery separators, multilayer secondary lithium battery separators, and/or multilayer battery separators with improved properties, novel or improved batteries, capacitors, fuel cells, lithium batteries, lithium ion batteries, secondary lithium batteries, and/or secondary lithium ion batteries, and/or methods for making and/or using such membranes, separator membranes, separators, battery separators, secondary lithium battery separators, batteries, capacitors, fuel cells, lithium batteries, lithium ion batteries, secondary lithium batteries, and/or secondary lithium ion batteries, and/or devices, vehicles or products including the same. In accordance with at least certain embodiments, the disclosure or invention relates to novel or improved membrane layers, membranes or separator membranes, battery separators including such membranes, and/or related methods. In accordance with at least certain selected embodiments, the disclosure or invention relates to novel or improved porous polymer membranes or separator membranes, battery separators including such membranes, and/or related methods. In accordance with at least particular embodiments, the disclosure or invention relates to novel or improved microporous polyolefin membranes or separator membranes, microlayer membranes, multi-layer membranes including one or more microlayer or nanolayer membranes, battery separators including such membranes, and/or related methods. In accordance with at least certain particular embodiments, the disclosure or invention relates to novel, optimized or improved microporous stretched polymer membranes or separator membranes having one or more novel or improved exterior layers and/or interior layers, microlayer membranes, multi-layered microporous membranes or separator membranes having exterior layers and interior layers, some of which layers or sublayers are created by co-extrusion and then laminated together to form the novel, optimized or improved membranes or separator membranes. In some embodiments, certain layers, microlayers or nanolayers may comprise a homopolymer, a copolymer, random copolymer, PP and/or PE copolymers, block copolymer, elastomer, and/or a polymer blend. In select embodiments, at least certain layers, microlayers or nanolayers may comprise a different or distinct polymer, homopolymer, copolymer, block copolymer, elastomer, and/or polymer blend. The disclosure or invention also relates to novel or improved methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, and/or batteries, and/or methods of making and/or using such membranes, separators, composites, devices and/or batteries. In accordance with at least particular selected embodiments, the present application or invention is directed to novel or improved separator membranes that are multi-layered, in which one or more layers of the multi-layered structure is produced in a multi-layer or microlayer co-extrusion die with multiple extruders. The novel or improved membranes, separator membranes, or separators may preferably demonstrate improved shutdown, improved strength, improved dielectric breakdown strength, and/or reduced tendency to split.

The microporous multilayer battery separators described herein, in some embodiments, exhibit improved safety, strength, and durability compared to prior bi-layer, tri-layer, or multi-layer battery separators. For example, the separators may exhibit increased average Dielectric Breakdown (DB), increased minimum DB, increased shutdown speed, and increased tortuosity, all of which are indicative of a safer battery separator. The separators may also exhibit increased puncture strength and an increased mixed penetration value, indicative of a stronger more durable battery. These properties of the microporous multilayer battery separators described herein are a result of, at least in part, the method by which they are made. This method, in some embodiments, comprises at least coextruding two or more polymer mixtures to form a first coextruded bi-layer, tri-layer, or multi-layer film, coextruding two or more other polymer mixtures to form a second coextruded bi-layer, tri-layer, or multi-layer film, and coextruding two or more further polymer mixtures to form a third coextruded bi-layer, tri-layer, or multi-layer film. Co-extrusion typically involves use of a co-extrusion die with one or more extruders feeding the die (typically one extruder per layer of the bi-layer, tri-layer, or multi-layer film). The polymer mixtures used to form each layer of the first, second, and third bi-layer, tri-layer, or multi-layer layer film may be the same or different. The mixtures may only include one polymer, or more than one polymer, e.g., polymer blends. Also, more than three bi-layer, tri-layer, or multi-layer films may be formed. After the first, second, and third bi-layer, tri-layer, or multi-layer film is formed, the films are laminated together with two of the films formed on opposite surfaces of one of the films to form the possibly preferred microporous battery separators described herein.

The microporous multilayer battery separators described herein may be used in lithium ion batteries, including secondary lithium batteries, resulting in batteries with improved safety and durability.

The battery separators herein may be described in several different ways.

In a first aspect, a battery separator for a lithium battery is described herein. In some embodiments, the battery separator comprises at least one microporous separator membrane or sub-membrane comprising a plurality of porous or microporous polymer microlayers or nanolayers, wherein at least one of the individual microlayers or nanolayers comprises a different or distinct polymer, molecular weight polymer, homopolymer, copolymer, and/or polymer blend, comprises a different or distinct additive, agent, material, and/or filler, or comprises combinations of different or distinct polymers, molecular weight polymers, homopolymers, copolymers, random copolymers of ethylene and/or proplylene, polymer blends, additives, agents, materials, elastomers, SEPS, SEBS, PVDF, EVOH, PMP, filler, particles, ceramic particles, beads, fibers, scavenger, cross linker, adhesion promoter, surface modifier, and/or combinations thereof as compared to an adjacent individual microlayer or nanolayer. In some embodiments, a plurality of said separator membranes or sub-membranes of polymer microlayers or nanolayers are laminated to each other or to a microporous polymer membrane. In some embodiments, at least one of said separator membranes or sub-membranes of polymer microlayers or nanolayers has at least three microlayers or nanolayers. Sometimes, at least one of said separator membranes or sub-membranes of polymer microlayers or nanolayers are made of one or more polyolefins. Sometimes, at least one of said separator membranes or sub-membranes of polymer microlayers or nanolayers are made up of coextruded dry process polyolefin microlayers or nanolayers. In some embodiments, at least two said separator membranes or sub-membranes of polymer microlayers or nanolayers. In some embodiments, at least three said separator membranes or sub-membranes of polymer microlayers or nanolayers.

In another aspect, a lithium battery comprising any battery separator described directly above is described herein.

In another aspect, an improved separator, membrane or base film is described herein. In some embodiments, the separator is a multilayer separator, membrane, or base film that that comprises one or more microporous co-extruded multi-microlayer or multi-nanolayer polymer membranes or sub-membranes adapted to be laminated or adhered to another polymer membrane, wherein at least one of the individual microlayers or nanolayers comprises a different or distinct polymer, molecular weight polymer, homopolymer, copolymer, and/or polymer blend, comprises a different or distinct additive, agent, material, and/or filler, or comprises combinations of different or distinct polymers, molecular weight polymers, homopolymers, copolymers, polymer blends, additives, agents, materials, and/or fillers as compared to an adjacent individual microlayer or nanolayer.

In another aspect, a battery comprising at least one battery separator as described in the preceding paragraph is described herein.

In one other aspect, a battery separator or separator membrane is described herein. In some embodiments, the battery separator or separator membrane comprises one or more co-extruded multi-microlayer membranes laminated or adhered to another polymer membrane, wherein the separator or separator membrane may provide improved strength, for example, improved puncture strength, particularly at a certain thickness, and may exhibit improved shutdown and/or a reduced propensity to split, and wherein at least one of the individual microlayers comprises a different or distinct polymer, molecular weight polymer, homopolymer, copolymer, and/or polymer blend, comprises a different or distinct additive, agent, material, and/or filler, or comprises combinations of different or distinct polymers, molecular weight polymers, homopolymers, copolymers, polymer blends, additives, agents, materials, and/or fillers as compared to an adjacent individual microlayer.

In another aspect, a battery, particularly a lithium ion battery comprising at least one separator as described in the preceding paragraph is described herein.

In another aspect, a battery separator or separator membrane is described herein. The battery separator or separator membrane comprises, in some embodiments, one or more co-extruded multi-microlayer or multi-nanolayer membranes optionally laminated or adhered to another polymer membrane. The separator or separator membrane may exhibit improved strength, improved puncture strength, particularly at a certain thickness, and/or that may exhibit improved shutdown and/or a reduced propensity to split. In some embodiments, at least one of the individual microlayers or nanolayers comprises a different or distinct polymer, molecular weight polymer, homopolymer, copolymer, and/or polymer blend, comprises a different or distinct additive, agent, material, and/or filler, or comprises combinations of different or distinct polymers, molecular weight polymers, homopolymers, copolymers, polymer blends, additives, agents, materials, and/or fillers as compared to an adjacent individual microlayer or nanolayer.

In another aspect, a battery, particularly a lithium ion battery, comprising at least one separator as described in the preceding paragraph is described herein.

In another aspect, an improved battery separator comprising a multilayer microporous film is described herein. In some embodiments, the multilayer microporous film comprises 9 or more layers, 12 or more layers. 15 or more layers, 18 or more layers, 21 or more layers, 24 or more layers, 27 or more layers, 30 or more layers, or more. In some embodiments, at least three consecutive layers of the microporous film have a thickness of from 0.1 to 5 microns, from 0.1 to 3 microns, from 0.1 to 2.5 microns, or from 0.1 to 2.0 microns. In some embodiments, the battery separator itself has a thickness of of 1 micron to 30 microns, 2 microns to 20 microns, 3 microns to 15 microns, or 4 microns to 10 microns. In some embodiments, the at least three consecutive layers each individually comprise a polyolefin or a polyolefin blend, in some embodiments they each comprise polyethylene, and in some embodiments the each comprise polypropylene.

In some cases, the at least three consecutive layers are coextruded layers. In some embodiments, these at least three consecutive layers are laminated with at least one other layer to form the microporous polymer film. In some embodiments, this at least one other layer is also a coextruded layer, which was coextruded with at least one other layer. The battery separator of claim 28, wherein the at least one other layer is a coextruded layer. The battery separator described, in some embodiments, has a puncture strength of 290 gf or more, 300 gf or more, or 310 gf or more.

In another aspect, a battery, including a lithium ion battery, particularly a lithium ion secondary battery comprising one or more of the battery separators described in the preceding paragraph is described herein. The battery is at least more durable, particularly in embodiments where the battery separator has a puncture strength of 290 gf or more, 300 gf or more, or 310 gf or more.

In yet another aspect, a microporous multilayer battery separator is described herein. The battery separator comprises a first region comprising two or more layers, wherein the first region comprises mostly discontinuous amorphous regions when viewed in the z-direction of the film using SEM; and a second region comprising at least one layer. In some embodiments, 50% or more, 60% or more, 70% or more, 80% or more, or 90% or more of the amorphous regions in the first region are discontinuous. In some embodiments, the second region comprises two or more layers, preferably three or more layers, and amorphous regions with a maximum width of 0.8 microns, a maximum width of 0.7 microns, or a maximum width of 0.6 microns. In some of the embodiments described herein, at least one of the first and second regions comprises one or more layers that comprise a polyolefin. In some embodiments, the first region comprises at least one layer that comprises polyethylene and the second region comprises at least one layer that comprises a polypropylene. Sometimes, at least one of the first region and the second region comprises a co-extruded bi-layer, tri-layer, or multi-layer film. Sometimes, the first region comprises a co-extruded bi-layer, tri-layer or multi-layer film. Sometimes, the first region and the second region comprise a co-extruded bi-layer, tri-layer or multi-layer film. Sometimes, the first region, the second, region, and a third region of the microporous multilayer battery separator each comprise a co-extruded bi-layer, tri-layer or multi-layer film. Sometimes, at least one of the second and a third region of the microporous multilayer battery separator a co-extruded bi-layer, tri-layer or multi-layer film. Sometimes, the second region comprises a co-extruded bi-layer, tri-layer or multi-layer film. Sometimes, the third region comprises a co-extruded bi-layer, tri-layer or multi-layer film.

In another aspect, a battery, particularly a lithium ion battery, comprising at least one separator as described in the preceding paragraph is described herein.

In another aspect, a battery separator comprising a multilayer microporous film having an average dielectric breakdown (DB) value that is higher than that of a typical tri-layer microporous film having at least one of the same thickness, Gurley, and porosity as the multilayer microporous film. For example, the average DB value may be 1 to 35% higher, 5 to 35% higher, 10 to 35% higher, 15 to 35% higher, or 20 to 35% higher. In some embodiments, the DB minimum value of the microporous multilayer film of the battery separator described herein may be higher than that of a typical or conventional tri-layer microporous film having the same thickness, Gurley, and/or porosity as the multilayer microporous film. For example, it may be 3 to 20% higher, 5 to 15% higher, or 10 to 15% higher than that of a tri-layer microporous film having the same thickness, Gurley, and/or porosity as the multilayer microporous film. Sometimes, the multilayer microporous film comprises 9 or more layers, 12 or more layers, 15 or more layers, 18 or more layers, 21 or more layers, 24 or more layers, 27 or more layers, or 30 or more layers. In some embodiments, at least one of the layers comprise a polyolefin or a polyolefin blend. The polyolefin blend may be a polyethylene or a polyethylene blend or a polypropylene or a polypropylene blend. In some other embodiments, the multilayer microporous film having the dielectric breakdown values herein may comprise a first region comprising two or more layers and a second region comprising at least one layer. The first region may comprise polypropylene and mostly discontinuous amorphous regions when viewed in the z-direction of the film using SEM. In some embodiments, the multilayer microporous film of the battery separator, which has the dielectric breakdown improvements described herein may comprise the following: (1) a first region comprising two or more layers, a second region comprising at least one layer, and a third region comprising at least one layer. The first region may comprise polypropylene and mostly discontinuous amorphous regions when viewed in the z-direction (or thickness direction) of the film using SEM.

In another aspect, a battery, particularly a lithium ion battery, comprising at least one separator as described in the preceding paragraph is described herein.

In another aspect herein a battery separator comprising a multilayer microporous film that when measured using mercury intrusion porosimetry, exhibits a mercury intrusion value of log differential intrusion 5 mL/g or less, 4.5 mL/g or less, 4 mL/g or less, or 3.5 mL/g or less, at a pressure sufficient to cause the mercury to fill the pores.

In another aspect, a battery, particularly a lithium ion battery, comprising at least one separator as described in the preceding paragraph is described herein In another aspect, a battery separator comprising a multilayer microporous film that has a MacMillan number above 5, above 5.5, above 6, above 6.5, above 7, above 8, above 9, or above 10 is described herein.

In another aspect, a battery, particularly a lithium ion battery, comprising at least one separator as described in the preceding paragraph is described herein In another aspect herein a battery separator comprising a multilayer microporous film having a tortuosity value of 1.6 or higher, 1.8 or higher, or 2.0 or higher is described herein. In some embodiments, the battery separator herein is a microporous battery separate. In some embodiments, the battery separator is a microporous multilayer battery separator.

In another aspect, a battery, particularly a lithium ion battery, comprising at least one separator as described in the preceding paragraph is described herein.

In another aspect, a battery separator comprising a multilayer microporous film that exhibits a pin removal force of less than 50 Newtons, 40 Newtons, 30 Newtons, 20 Newtons, 15 Newtons, or 10 Newtons.

In another aspect, a battery, particularly a lithium ion battery, comprising at least one membrane or separator as described in the preceding paragraph is described herein. It may be preferred that the membrane or separator be a dry process or dry stretch process polyolefin based membrane, especially a blown or bubble extrusion MD stretched or MD+TD stretched membrane, but other membranes such as slot die extruded or cast, wet process, BNBOPP, BOPP, particle stretch, and/or the like may be used. For example, a dry process multilayer PO membrane may be laminated to a BNBOPP membrane.

In another aspect, a battery separator is described herein. The battery separator comprises a microporous multilayer film comprising the following: (1) a first region comprising two or more layers; (2) a second region comprising two or more layers that is on a first side of the first region; and (3) a third region comprising two or more layers that is on a side of the first region opposite the first side, wherein at least one of the first, second or third regions comprises PE and has a crystallinity that is lower, when measured by DSC, than a PE-containing layer of a trilayer microporous film, where the tri-layer microporous film has the same thickness as the multilayer microporous film. For example, the crystallinity may be 1 to 20% lower, 1 to 15% lower, 1 to 10% lower, or 1 to 5% lower.

In another aspect, a battery, particularly a lithium ion battery, comprising at least one separator as described in the preceding paragraph is described herein.

In another aspect, a battery separator comprising a multilayer microporous film having a mixed penetration (N) value of greater than 380 N, greater than 400 N, greater than 450 N, greater than 500 N, greater than 550 N, 600 N, greater than 650 N, or greater than 700 N is described herein.

In another aspect, a battery, particularly a lithium ion battery, comprising at least one separator as described in the preceding paragraph is described herein.

In another aspect, a battery separator is described herein. The battery separator comprises a microporous film that has an electrical resistance value less than or equal to two in some embodiments, in some embodiments less than or equal to 1.7, in some embodiments less than or equal to 1.6, in some embodiments less than or equal to 1.5, in some embodiments less than or equal to 1.4, in some embodiments less than or equal to 1.3, in some embodiments less than or equal to 1.2, in some embodiments less than or equal to 1.0.

In another aspect, a battery, particularly a lithium ion battery, comprising at least one separator as described in the preceding paragraph is described herein.

In another aspect, a battery separator comprising a multilayer microporous film having a mixed penetration value of 380 N or more, 400 N or more, 450N or more, 500 N or more, 550 N or more, 600N or more, 650 N or more, or 700 N or more is described.

In another aspect, a battery, particularly a lithium ion battery, comprising at least one separator as described in the preceding paragraph is described herein.

In another aspect, a battery separator comprising a multilayer microporous film having an electrical resistance less than or equal to 2.0, less than or equal to 1.7, less than or equal to 1.6, less than or equal to 1.5, less than or equal to 1.4, less than or equal to 1.3, less than or equal to 1.2, less than or equal to 1.1, or less than or equal to 1.0 is described.

In another aspect, a battery, particularly a lithium ion battery, comprising at least one separator as described in the preceding paragraph is described herein.

In another aspect, a battery separator comprising a multilayer microporous film comprising a region that comprises two or more layers or microlayers and polyethylene in one or more of the layers or microlayers. When the region is tested according to the Machine Learning Test described herein, at least one of the following is satisfied: $W^T x' \geq -4$, $W^T x' \geq -2.654$, $W^T x' \geq 1.3$, and $W^T x' \geq 2$, $W^T x' \geq 2$ being the most preferred.

In another aspect, a battery, particularly a lithium ion battery, comprising at least one separator as described in the preceding paragraph is described herein.

In another aspect, a battery separator comprising a multilayer microporous film comprising a region that comprises two or more layers or microlayers and polypropylene in one or more of the layers or microlayers. When the region is tested according to the Machine Learning Test described herein, at least one of the following is satisfied: $W^Tx' \geq -5$, $W^Tx' \geq 3$ being the most preferred.

In another aspect, a battery, particularly a lithium ion battery, comprising at least one separator as described in the preceding paragraph is described herein.

In another aspect, a battery separator comprising a multilayer membrane or microporous film that has a dielectric break down uniformity which is better than a typical separator of the same thickness, porosity and Gurley.

In another aspect, a battery, particularly a lithium ion battery, comprising at least one separator as described in the preceding paragraph is described herein.

In another aspect, a battery separator is described. The battery separator comprises at least one multilayer microporous membrane or film having at least two regions or sublayers each including at least two microlayers, the multilayer membrane having or exhibiting at least one of following: (a) mixed penetration (N) value greater than 380 N; (b) mixed penetration (N) value greater than 600 N; (c) a tortuosity of 1.8 or higher;

(d) an average dielectric breakdown value (V) that is 1 to 35% higher than that of a tri-layer microporous film having the same thickness, Gurley, and/or porosity as the multilayer microporous film; (e) a minimum dielectric breakdown value (V) that is 3 to 20% higher than that of a tri-layer microporous membrane or film having the same thickness, Gurley, and/or porosity as the multilayer microporous membrane; (f) having a dielectric breakdown uniformity; (g) that passes the nail penetration test; (h) having at least one microlayer including, PO, PP and/or PE and an elastomer; (i) having at least one microlayer including siloxane; (j) having at least one microlayer that includes PP and an elastomer; (k) having at least one microlayer including a co-polymer; (l) having at least one microlayer that includes PP and a co-polymer; (m) having at least two microlayers that include different resins or resin blends; (n) when one of the regions comprises polypropylene in one or more of the microlayers, wherein when this region is tested according to the Machine Learning Test described herein, at least one of the following is satisfied: $W^Tx' \geq -5$ or $W^Tx' \geq -3$; (o) when one of the regions comprises polypropylene in one or more of the microlayers, wherein when this region is tested according to the dimension reduction technique known as PCA described herein, at least one of the following is satisfied: $W^Tx' \geq 0$, and $W^Tx' \geq 3$; (p) when one of the regions comprises polyethylene in one or more of the microlayers, wherein when this region is tested according to the Machine Learning Test described herein, at least one of the following is satisfied: $W^Tx' \geq -4$ and $W^Tx' \geq -2.654$; (q) when one of the regions comprises polyethylene in one or more of the microlayers, wherein when this region is tested according to the Machine Learning Test described herein, at least one of the following is satisfied: $W^Tx' \geq 1.3$, and $W^Tx' \geq 2$; (r) wherein one of the regions comprises PE and has a crystallinity that is 1 to 20% lower, when measured by DSC, than that of a PE-containing layer of a tri-layer microporous membrane or film having the same thickness, Gurley, and/or porosity as the multilayer microporous film; (s) the microporous multilayer membrane or film has 30 to 100 microlayers or more; (t) wherein at least one of the microlayers comprises lithium stearate; (u) wherein the multilayer microporous film exhibits reduced MD or TD splittiness; (v) wherein at least one of the microlayers comprises PE beads; (w) having a pin removal of less than 50 N; (x) that exhibits reduced contact with pin; (y) that has reduced MD or TD splittiness; (z) may be a precursor for at least one of transverse direction (TD) stretching, calendaring, and pore filling. In some embodiments the microporous multilayer membrane exhibits one or more, two or more, three or more, four or more, five or more, six or more, seven or more, eight or more, nine or more, ten or more, eleven or more, twelve or more, thirteen or more, fourteen or more, fifteen or more, sixteen or more, seventeen or more, eighteen or more, nineteen or more, twenty or more, twenty-one or more, twenty-two or more, twenty-three or more, twenty-four or more, twenty-five or more, or twenty-six of the twenty-six options. The separator may also comprise other properties. In some embodiments the battery separator is coated on one or more surfaces thereof and in some embodiments it is uncoated. In some embodiments, the coating is a ceramic coating.

In another aspect, a battery, particularly a lithium ion battery, comprising at least one separator as described in the preceding paragraph is described herein.

In another aspect; a method for forming an improved battery separator comprising a multilayer microporous membrane or film is described herein. The method comprises at least the steps of coextruding at least two layers and laminating the at least two coextruded layers to one other layer, or in some embodiments to two other layers, to form the multilayer microporous membrane. In some embodiments, at least two, three, four, five, six, seven, eight, nine, or ten layers are coextruded. In some embodiments, the at least one other layer or at least one of the at least two other layers are coextruded layers. In some embodiments, at least one of the other layers are monoextruded layers. In embodiments where the at least two coextruded layers are laminated to two other layers, sometimes, one of the two other layers is laminated on a first side of the at least two coextruded layers and the second of the two other layers is laminated on a side of the at least two coextruded layers that is opposite to the first side. At least one of the two other layers may be a coextruded layer. In some embodiments, both of the two other layers are coextruded layers. In some embodiments, at least one of the at least two coextruded layers and the other layers comprise a polyolefin or polyolefin blend. For example, they may comprise a polyethylene or a polyethylene blend or a polypropylene or a polypropylene blend. In some embodiments, at least one of the at least two coextruded layers comprise polyethylene and at least one or both of the other layers comprise polypropylene or a polyolefin blend. In some embodiments, at least one of the at least two coextruded layers comprise polyethylene and at least one or both of the other layers comprise polypropylene or a polypropylene blend. In some embodiments, each of the two other layers comprises polyethylene or a polyethylene blend. In some embodiments, each of the two other layers comprise polypropylene or a polypropylene blend. In some embodiments, one or both of the two other layers are coextruded layers that were coextruded with 2 or more, 3 or more, 4 or more, 5 or more, 6 or more, 7 or more, 8 or more, or 9 or more other layers. When the layers are coextruded with 9 other layers, the total number of coextruded layers is 10.

In another aspect, a battery separator made by the method described in the preceding paragraph

BRIEF DESCRIPTION OF FIGURES

FIG. 16 shows that numerous different embodiments are possible in one 9 microlayer membrane and that variation in the sublayers and individual microlayers are possible and possibly desired. For example, one may want to add some PE in the outer most PP microlayers to increase adhesion, wettability, lamination bond strength, and/or the like.

FIG. 17 shows that numerous different embodiments are possible and that variation in the use of PP or PE sublayers are possible and possibly desired. For example, one may want to add some PE in the outer or center sublayers to increase adhesion, wettability, lamination bond strength, or to provide a center shutdown function, and/or the like.

FIG. 21 is a cross-section SEM at 10,000× showing the PP/PE/PP sublayers of the 9 microlayer (each sublayer has 3 microlayers) about 14 um membrane with an about 3.11 um thick center PE sublayer (with each PE microlayer of only about 1.037 um thick each). The present invention can be used to create multi-microlayer structures from polyolefin resins with superior performance to other PO membranes, with 2 um or less each thick microlayers, with 1.5 or less um each thick microlayers, with 1.3 or less urn each thick microlayers, with 1.15 or less um each thick microlayers, with 1.05 or less urn each thick microlayers, and/or the like.

FIG. 22 shows data on several examples of Multilayer products (EX 1, EX 3, EX 2, EX 4, and EX 6) as compared to other more conventional trilayer products (COM EX 1, COM EX 3, COM EX 2, COM EX 4). Normalizing for thickness and porosity helps show some of the benefits of the new Multilayer structures.

FIG. 23 shows more data on several examples of Multilayer products (EX 1, EX 3, EX 4, and EX 6) as compared to other more conventional trilayer products (COM EX 1, COM EX 3, COM EX 2, COM EX 4). Normalizing for thickness and porosity helps show some of the benefits of the new Multilayer structures. Tortuosity was calculated by $N_m = T^2/P$, where $N_m$ is the MacMullin Number, T is the tortuosity, and P is the porosity.

FIG. 24 includes SEM images of polypropylene layers of multilayer products according to some embodiments described herein.

FIG. 25 includes SEM images of polypropylene layers of more conventional tri-layer products described herein.

FIG. 26 includes SEM images of polyethylene layers of multilayer products according to some embodiments described herein.

FIG. 27 includes SEM images of polyethylene layers of more conventional tri-layer products described herein.

FIG. 28 includes SEM images showing side-by-side comparisons of polypropylene layers of tri-layer and multi-layer products described herein.

FIG. 29 includes SEM images showing side-by-side comparisons of polyethylene layers of tri-layer and multi-layer products described herein.

FIG. 30 includes SEM images showing a side-by-side comparison of tri-layer or multi-layer products described herein.

FIG. 31 is a Table of DSC data for polyethylene layers of multilayer and tri-layer products described herein.

FIG. 32 is a Table of DSC data for polypropylene layers of multilayer and tri-layer products described herein.

FIG. 34 shows normalization of x into x' (in PP) according to the Machine Learning Test described herein.

FIG. 36 shows normalization of x into x' (in PE) according to the Machine Learning Test described herein.

FIGS. 38 to 50 are respective schematic representations of certain coextruded multilayer precursors, membranes or separators according to some additional embodiments described herein.

DETAILED DESCRIPTION OF THE INVENTION

Figure 1:
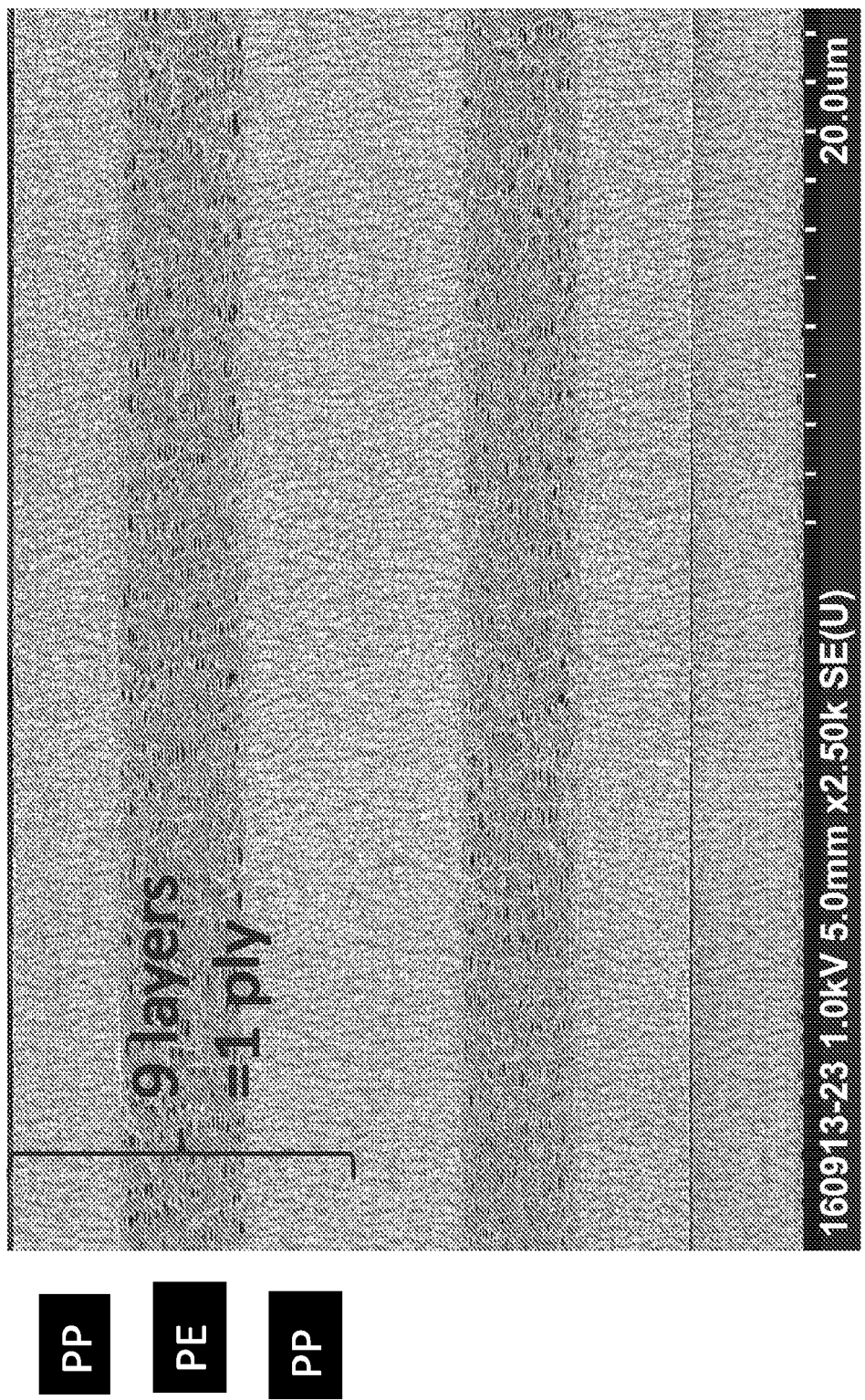
FIG. 1 is a partial cross-section Scanning Electron Micrograph (SEM) of an exemplary inventive laminated 3 layer or triple trilayer microporous membrane tri-layer/tri-layer/tri-layer (with 9 coextruded microlayers per each trilayer layer, and with 3 microlayers per each PP or PE sub-layer of each trilayer layer) at a magnification of 2,500× (at least the outer PP layers of each layer are microporous).
Figure 2:
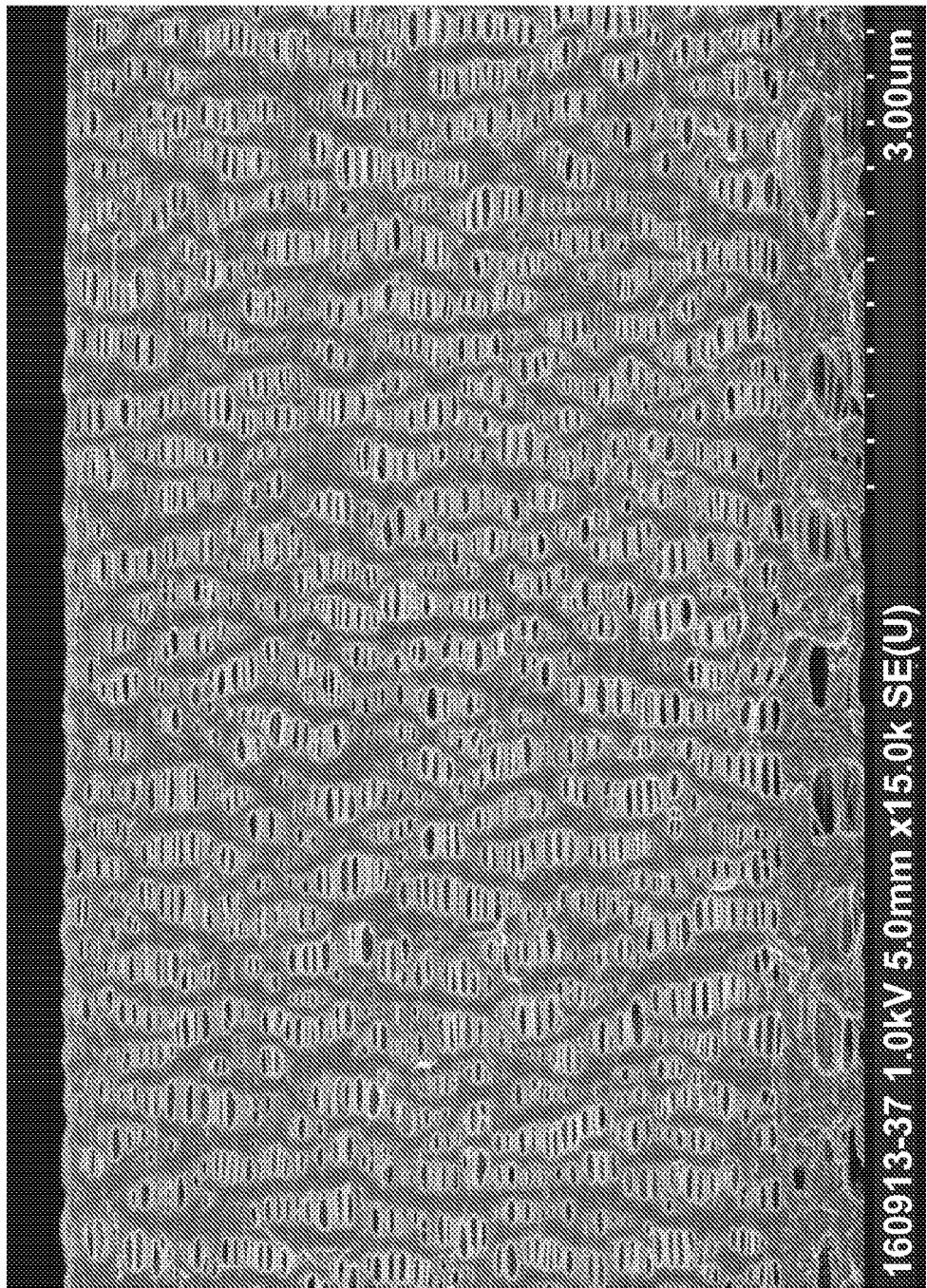
FIG. 2 is a partial cross-section Scanning Electron Micrograph (SEM) of a portion of the polypropylene surface sub-layer (3 microlayers of PP) of the surface trilayer component or sub-membrane of the composite laminated membrane of FIG. 1 at a magnification of 15,000× (the PP sublayer is enlarged and is actually 3 co-extruded PP microlayers with difficult to discern interfaces).
Figure 3:
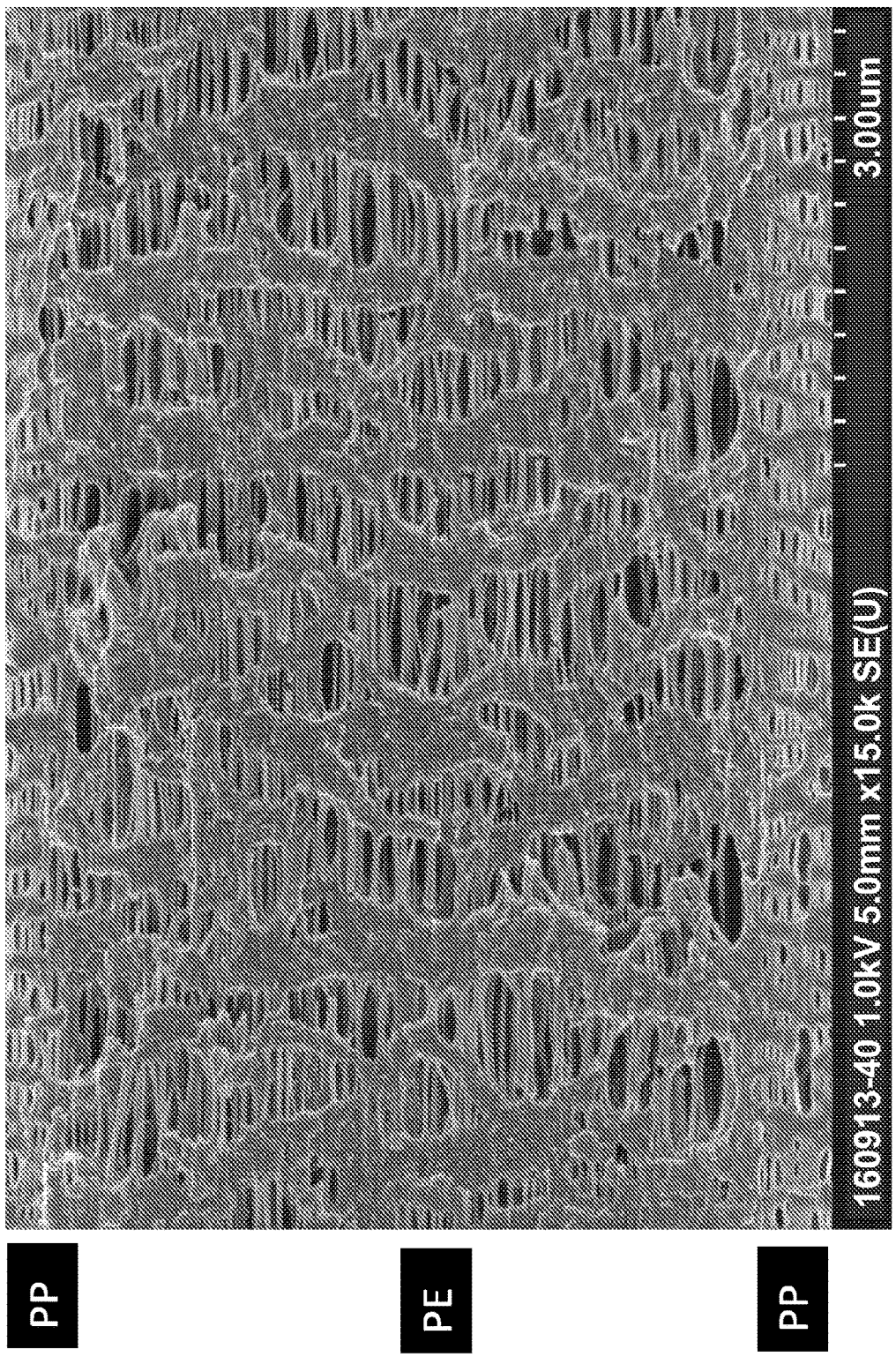
FIG. 3 is a partial cross-section Scanning Electron Micrograph (SEM) of the polyethylene sub-layer (3 microlayers of PE) of one of the 9 microlayer trilayer layers of the 3 layer membrane of FIG. 1 at a magnification of 15,000× (the PE sublayer is enlarged).
Figure 4:
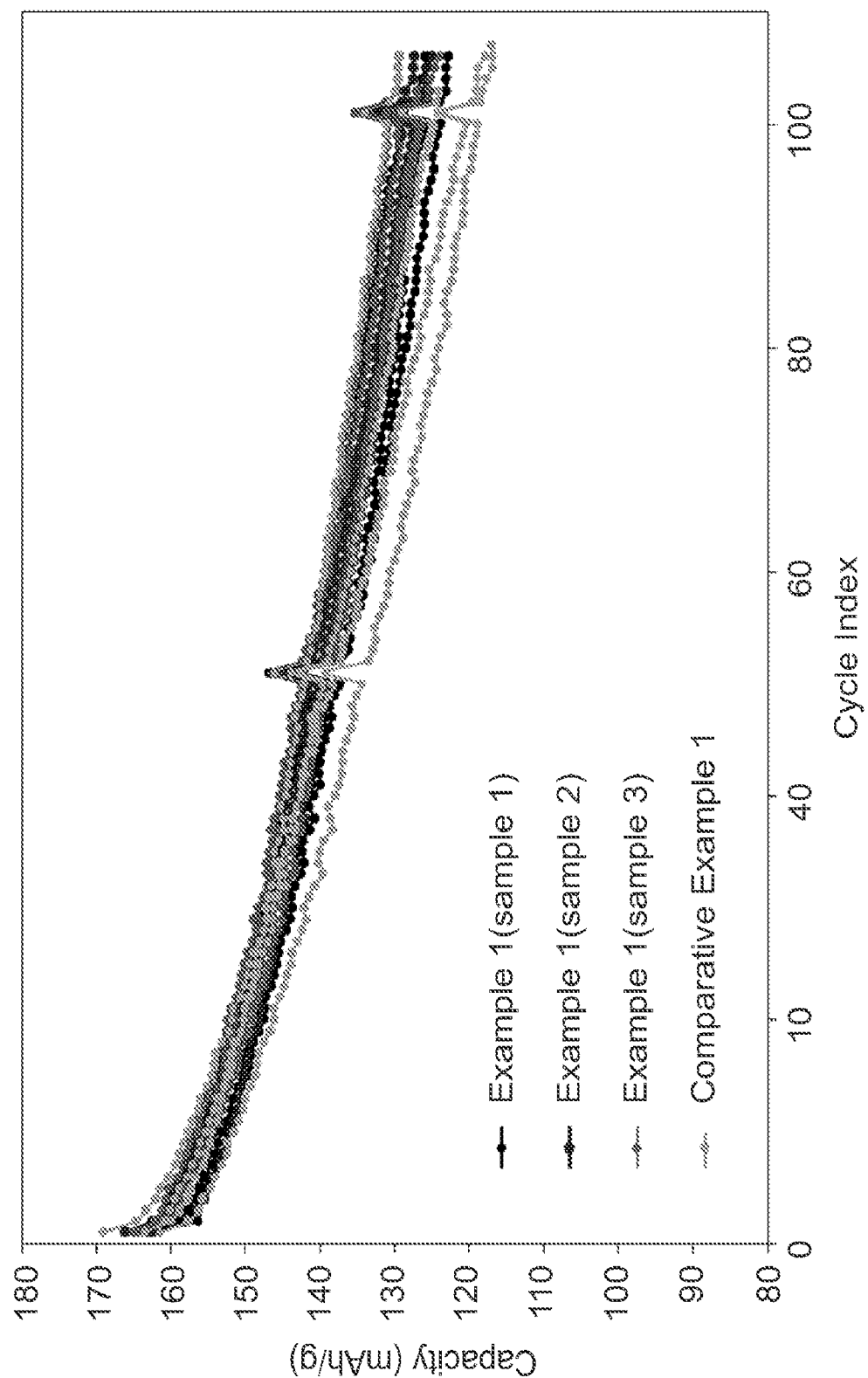
FIG. 4 is a graph demonstrating the improved cycling behavior of exemplary inventive constructions as compared to COM EX 1.

Embodiments described herein can be understood more readily by reference to the following detailed description, examples, and figures. Elements, apparatus, and methods described herein, however, are not limited to the specific embodiments presented in the detailed description, examples, and figures. It should be recognized that these embodiments are merely illustrative of the principles of the present invention. Numerous modifications and adaptations will be readily apparent to those of skill in the art without departing from the spirit and scope of the invention.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

Described herein is the following: a microporous multilayer film or membrane; a battery separator comprising at least one of the microporous multilayer film or membrane; a battery, particularly a lithium-ion battery, comprising at least one of the battery separators described herein, a device comprising the batteries described herein, and a method for making the microporous multilayer film or membrane.

The multilayer microporous film or membrane exhibits improved properties, particularly when compared to past tri-layer and multilayer microporous films having the same thickness, Gurley, and/or porosity. Improved properties of the films or membranes include, but are not limited to, improved puncture strength (gf) compared to prior tri-layer and multi-layer products, improved mixed penetration average (N) compared to prior tri-layer and multi-layer products, improved elongation ($kgf/cm^2$) compared to prior tri-layer and multi-layer products, faster shutdown speed ($ohm-cm^2$) compared to prior tri-layer and multi-layer products, higher average dielectric breakdown (DB) values (V) compared to prior tri-layer and multi-layer products, lower DB standard deviation (V) compared to prior tri-layer and multi-layer products, higher minimum DB values (V) compared to prior tri-layer and multi-layer products, passage of industry nail penetration tests that were not passed by prior tri-layer and multi-layer microporous films, and improved cycle life compared to past tri-layer and multi-layer products. It was also found that the multilayer microporous films herein have a unique structure. The unique structure of these films explains many of the improved properties observed.

Battery Separator

The battery separator herein comprises, consists of, or consists essentially of a (i.e., one or more) multilayer membranes or multilayer microporous films, and optionally a coating layer on one or both sides of the film. The film itself, i.e., without a coating or any other additional components, exhibits the improved properties described above. The performance of the films may be enhanced by the addition of coatings or other additional components.

(1) Multilayer Microporous Film or Membrane

In some embodiments, the multilayer membrane or multilayer microporous film comprises 4 or more, 5 or more, 6 or more, 7 or more, 8 or more, 9 or more 11 or more, 12 or more, 13 or more, 14 or more, 15 or more, 15 or more, 16 or more 17 or more, 18 or more, 19 or more, 20 or more, 21 or more, 22 or more, 23 or more, 24 or more, 25 or more, 26 or more, 27 or more, 28 or more, 29 or more, 30 or more, 40 or more, 50 or more, 60 or more, 70 or more, 80 or more, 90 or more, or 100 or more layers. What is meant by the term "layer" includes a mono-extruded layer having a thickness from 2 to 20 microns. As understood by those skilled in the art, a mono-extruded layer is a layer that was extruded by itself, not with any other layers. Also, the layers of a co-extruded bi-layer, tri-layer, or multi-layer film are each considered to be a "layer" for purposes of determining whether a given battery separator is a multilayer battery separator. The number of layers in coextruded bi-layer will be two, the number of layers in a co-extruded tri-layer will be three, and the number of layers in a co-extruded multi-layer film will be two or more, preferably three or more. The exact number of layers in a bi-layer, tri-layer, or multi-layer co-extruded film is dictated by the die design and not necessarily the materials that are co-extruded to form the co-extruded film. For example, a co-extruded bi-, tri-, or multi-layer film may be formed using the same material to form each of the two, three, or four or more layers, and these layers will still be considered to be separate layers even though each is made of the same material. The exact number, again, will be dictated by the die design. The layers of the co-extruded bi-, tri-, or multi-layer films each have a thickness of 0.01 to 20 microns, preferably 0.1 to 5 microns, most preferably 0.1 to 3 microns, 0.1 to 2 microns, 0.1 to 1 microns, 0.01 to 0.9 microns, 0.01 to 0.8 microns, 0.01 to 0.7 microns, 0.01 to 0.6 microns, 0.01 to 0.5 microns, 0.01 to 0.4 microns, 0.01 to 0.3 microns, or 0.01 to 0.2 microns. These layers are microlayers.

In some embodiments, the multilayer microporous film or multilayer microporous membrane disclosed herein comprises two or more, or preferably three or more co-extruded layers. Co-extruded layers are layers formed by a co-extrusion process. The at least two, or preferably at least three consecutive coextruded layers may be formed by the same or separate co-extrusion processes. For example, the at least two or at least three consecutive layers may be formed by the same co-extrusion process or two or more layers may be coextruded by one process, two or layers may be coextruded by a separate process, and the two or more layers formed by the one process may be laminated to the two or more layers formed by the separate process so that combined there are four or more consecutive coextruded layers. In some preferred embodiments, the two or more, or preferably three or more co-coextruded layers are formed by the same co-extrusion process. For example, two or more, or preferably three or more, four or more, five or more, six or more, seven or more, eight or more, nine or more, ten or more, fifteen or more, twenty or more, twenty-five or more, thirty or more, thirty-five or more, forty or more, forty-five or more, fifty or more, fifty-five or more or sixty or more co-extruded layers may be formed by the same co-extrusion process. In further preferred embodiments, the extrusion process is performed by extruding two or more polymer mixtures, that may be the same or different, without a solvent. The preferred co-extrusion process is a dry process, e.g., Celgard® dry process.

In some embodiments, the multilayer microporous film or multilayer membrane described herein is made by forming a coextruded bi-layer (two coextruded layer), tri-layer (three coextruded layers), or multi-layer (two or more, preferably three or more co-extruded layers) film and then laminating the bi-layer, tri-layer, or multi-layer film to at least one, but preferably two other films. The at least one, but preferably two, other films may be a non-woven film mono-extruded films or a co-extruded films. In preferred embodiments, the other films are co-extruded films having the same number of co-extruded layers as the co-extruded bi-layer, tri-layer, or multi-layer films. For example, if a co-extruded tri-layer film is formed, the other layers are also co-extruded tri-layers.

Lamination of the bi-layer, tri-layer, or multilayer co-extruded film with at least one other mono-extruded monolayer film or a bi-layer, tri-layer, or multi-layer film may involve use of heat, pressure, or preferably heat and pressure.

The polymers or co-polymers that may be used in the instant battery separator are those that are extrudable. Such polymers are typically referred to as thermoplastic polymers.

In some embodiments, one or more of the layers of the multilayer microporous film or multilayer membrane comprises a polymer or co-polymer or a polymer or co-polymer blend, preferably a polyolefin or polyolefin blend. A polyolefin blend, as understood by one of ordinary skill in the art, may include a mixture of two or more different kinds of polyolefin, e.g., polyethylene and polypropylene, a blend of two or more of the same kind of polyolefin, wherein each polyolefin has a different property, e.g., a or ultra-high molecular weight polyolefin and a low or ultra-low molecular weight polyolefin, or a mixture of a polyolefin and another type of polymer or co-polymer or any additive.

Polyolefins include, but are not limited to: polyethylene, polypropylene, polybutylene, polymethylpentene, copolymers thereof, and blends thereof. In some embodiments, the polyolefin can be an ultra-low molecular weight, a low-molecular weight, a medium molecular weight, a high molecular weight, or an ultra-high molecular weight polyolefin, e.g., a medium or a high weight polyethylene (PE) or polypropylene (PP). For example, an ultra-high molecular weight polyolefin may have a molecular weight of 450,000 (450k) or above, e.g. 500k or above, 650k or above, 700k or above, 800k or above, 1 million or above, 2 million or above, 3 million or above, 4 million or above, 5 million or above, 6 million or above, etc. A high-molecular weight polyolefin may have a molecular weight in the range of 250k to 450k, e.g., 250k to 400k, 250k to 350k, or 250k to 300k. A medium molecular weight polyolefin may have a molecular weight from 150 to 250k, e.g., 100k, 125k, 130K, 140k, 150k to 225k, 150k to 200k, 150k to 200k, etc. A low molecular weight polyolefin may have a molecular weight in the range of 100k to 150k, e.g., 100k to 125k. An ultra-low molecular weight polyolefin may have a molecular weight less than 100k. The foregoing values are weight average molecular weights. In some embodiments, a higher molecular weight polyolefin may be used to increase strength or other properties of the microporous multilayer membranes or batteries comprising the same as described herein. In some embodiments, a lower molecular weight polymer, e.g., a medium, low, or ultra-low molecular weight polymer may be beneficial. For example, without wishing to be bound by any particular theory, it is believed that the crystallization behavior of lower molecular weight polyolefins may result in a microporous multilayer film having smaller pores resulting from at least an MD stretching process that forms the pores.

Exemplary thermoplastic polymers, blends, mixtures or copolymers other than polyolefin polymers, blends, or mixtures may include, but are not limited to: polyacetals (or polyoxymethylenes), polyamides, polyesters, polysulfides, polyvinyl alcohols, polyvinyl esters, and polyvinylidenes (and may include PVDF, PVDF:HFP, PTFE, PEO, PVA, PAN, or the like). Polyamides (nylons) include, but are not limited to: polyamide 6, polyamide 66, Nylon 10, 10, polyphthalamide (PPA), co-polymers thereof, and blends thereof. Polyesters include, but are not limited to: polyester terephthalate, polybutyl terephthalate, copolymers thereof, and blends thereof. Polysulfides include, but are not limited to, polyphenyl sulfide, copolymers thereof, and blends thereof. Polyvinyl alcohols include, but are not limited to: ethylene-vinyl alcohol, copolymers thereof, and blends thereof. Polyvinyl esters include, but are not limited to, polyvinyl acetate, ethylene vinyl acetate, copolymers thereof, and blends thereof. Polyvinylidenes include, but are not limited to: fluorinated polyvinylidenes (e.g., polyvinylidene chloride, polyvinylidene fluoride), copolymers thereof, and blends thereof. Various materials may be added to the polymers. These materials are added to modify or enhance the performance or properties of an individual layer or the overall separator. Such materials include, but are not limited to: Materials to lower the melting temperature of the polymer may be added. Typically, the multi-layered separator includes a layer designed to close its pores at a predetermined temperature to block the flow of ions between the electrodes of the battery. This function is commonly referred to as shutdown.

In some embodiments, each layer of the multilayer microporous film or multilayer membrane comprises, consists of, or consists essentially of a different polymer or co-polymer or polymer or co-polymer blend. In some embodiments each layer comprises, consists of, or consists essentially of the same polymer or co-polymer or polymer or co-polymer blend. In some embodiments, alternating layers of the multilayer microporous film or the multilayer membrane comprise, consist of, or consist essentially of the same polymer or co-polymer or polymer or co-polymer blend. In other embodiments, some of the layers of the multilayer membrane or microporous multilayer film comprise, consist of, or consist essentially of the same polymer or polymer blend and some do not.

Although it may be preferred that each of the layers or microlayers comprise, consist of, or consist essentially of polyolefin (PO) such as PP or PE or PE+PP blends, mixtures, co-polymers, or the like, it is contemplated that other polymers (PY), additives, agents, materials, fillers, and/or particles (M), and/or the like may be added or used and may form layers or microlayers such as PP+PY, PE+PY, PP+M, PE+M, PP+PE+PY, PE+PP+M, PP+PY+M, PE+PY+M, PP+PE+PY+M, or blends, mixtures, co-polymers, and/or the like thereof.

Also, identical, similar, distinct, or different PP or PE or PE+PP polymers, homopolymers, copolymers, molecular weights, blends, mixtures, co-polymers, or the like may be used. For example, identical, similar, distinct, or different molecular weight PP, PE, and/or PP+PE polymers, homopolymers, co-polymers, multi-polymers, blends, mixtures, and/or the like may be used in each layer. As such, constructions may include various combinations and subcombinations of PP, PE, PP+PE, PP1, PP2, PP3, PE1, PE2, PE3, PP1+PP2, PE1+PE2, PP1+PP2+PP3, PE1+PE2+PE3, PP1+PP2+PE, PP+PE1+PE2, PP1/PP2, PP1/PP2/PP1, PE1/PE2, PE1/PE2/PP1, PE1/PE2/PE3, PP1+PE/PP2, or other combinations or constructions.

In some embodiments, one or more additives may be added to the outermost layers of the multilayer microporous film or the multilayer membrane to improve the properties thereof or the properties of the battery separator or battery comprising the same. The outermost layer may comprise PE, PP, or PE+PP in addition to the additive. For example, to improve pin removal (i.e., lower the coefficient of friction of the film or membrane), additives such as lithium stearate, calcium stearate, PE beads, siloxane, and polysiloxanes may be added.

In addition, particular polymers, co-polymer or polymer or co-polymer blends may be used in the outermost layers of the multilayer microporous film or the multilayer membrane to improve the properties thereof or the properties of the battery separator or battery comprising the same. For example, adding an ultra-high molecular weight polymer or co-polymer in the outermost layer may improve puncture strength.

In further embodiments additives to improve oxidation resistance may be added to the outermost layers of the multilayer microporous film or membranes. The additive may be an organic or inorganic additive or a polymeric or non-polymeric additive.

In some embodiments, the outermost layers of the multilayer film or membrane may comprise, consist of, or consist essentially of polyethylene, polypropylene, or a mixture thereof.

In some embodiments, the microporous multilayer film or membrane may comprise three or more distinct regions or sub-membrane areas. In a preferred embodiment, one or more of the regions or sub-membrane areas may comprise, consist of, or consist essentially of two or more layers, which may or may not be co-extruded layers. In some preferred embodiments, the two or more layers are co-extruded layers. In some embodiments, there is a lamination barrier between region or sub-membrane area and an adjacent region or sub-membrane area. A lamination barrier is formed when two surfaces, e.g., two surfaces of different films or layer are laminated together using heat, pressure, but preferably heat and pressure. In some embodiments, the sub-membrane areas have the following non-limiting constructions: PP, PE, PP/PP, PP/PE, PE/PP, PE/PE, PP/PP/PP, PP/PP/PE, PP/PE/PE. PP/PE/PP, PE/PP/PE, PE/PE/PP, PP/PP/PP/PP, PP/PE/PE/PP, PE/PP/PP/PE, PP/PP/PP/PP, PE/PE/PP/PP, PE/PE/PP/PE, PE/PP/PP/PP, PP/PP, PP/PE/PP/PE, PE/PP/PP/PE, PP/PP/PE/PP/ PP, PE/PE/PP/PP/PE/PE, PP/PP/PP/PE/PP, PP/PP/PE/PE/ PP/PP, PE/PE/PP/PP/PE/PE, PP/PE/PP/PE/PP, PP/PE/ PP/PE/PP/PE, PP/PP/PP/PE/PP/PP, PE/PE/PE/PP/PE/ PE/PE, PP/PE/PP/PE/PP/PE/PP, PE/PP/PE/PP/PE/PP/PE, PE/PP/PE/PP/PE/PP/PP, PE/PP/PE/PP/PE/PP/PE, PP/PE/PP/PE/PP/PE/PP, PP/PE/PP/PE/PE/PP/PE, PP/PP/PE/PE/PP/PP/PE, PP/PE/PE/PE/PE/PE/PP, PP/PP/PE/PE/PE/PE/PP, PP/PE/PE/PE/PE/PE/PE/PE, PP/PE/PP/PE/PP/PP/PE/PP, PP/PP/PP/PE/PE/PE/PE/PE, PP/PP/PP/PP/PP/PP/PE, PP/PP/PP/PP/PE/PE/PE/PE, PP/PP/PP/ PP/PP/PE/PE/PE/PE, PE/PE/PE/PE/PE/PP/PP/PP/ PP, PP/PE/PP/PE/PP/PE/PP/PE/PE, PE/PP/PP/PP/PE/ PP/PE/PP/PE/PP, PE/PE/PP/PP/PP/PP/PP/PP/PP/PE, PP/PE/PE/PE/PE/PE/PE/PE/PP, PP/PP/PE/PE/PP/ PP/PE/PE/PP/PP, PE/PE/PP/PP/PP/PP/PP/PP/PE/PE, PP/PP/PP/PE/PE/PP/PP/PP/PE, PE/PE/PE/PP/PP/PE/ PE/PE/PP/PP. Herein PE denotes a layer or microlayer, e.g., a co-extruded layer or microlayer, of the regions or sub-membrane areas that comprises, consists of, or consists essentially of PE. Herein PP denotes a layer or microlayer, e.g., a co-extruded layer or microlayer, of the regions or sub-membrane areas that comprises, consists of, or consists essentially of PP. The PE or PP of the different layers or microlayers may be the same or different. Similar variations including up to 50 layers or microlayers, particularly co-extruded layers or microlayers, per region or sub-membrane area may be formed with the appropriate extrusion die.

In one preferred embodiment, the coextruded precursor may have a structure (PP1/PP2/PP3) (PP3/PP2/PP1), (PP3/PP3/PP2/PP1/PP1), (PP3/PP3/PP2/PP2/PP1/PP1), (PP3/PP3/PP3/PP2/PP2/PP2/PP1/PP1/PP1), etc. PP1 is made of a homopolymer PP and an additive to modify the surface coefficient of friction, including any anti-slip or anti-block additives like polysiloxane or siloxane. PP2 may be made of the same or a different PP homopolymer than PP1 and a copolymer of PP. the PP copolymer may be any propylene-ethylene or ethylene-propylene random copolymer, block copolymer, or elastomer. PP3 may be made of the same or a different homopolymer PP than PP1 and PP2 and also includes an additive to modify surface coefficient of friction, which may be the same or different from that used in PP1.

In other preferred embodiment, the coextruded precursor may have a structure (PP1/PP2/PP3) (PP3/PP2/PP1), (PP3/PP3/PP2/PP1/PP1), (PP3/PP3/PP2/PP2/PP1/PP1), (PP3/PP3/PP3/PP2/PP2/PP2/PP1/PP1), etc. PP1 may be any polypropylene blend. PP2 may be made of any PP block co-polymer, including those described herein. PP3 may be made of the same or a different PP-block co-polymer than that used in PP2.

The regions or sub-membrane areas may be arranged in any order to form the microporous multilayer membrane or the microporous multilayer film. For example, the microporous multilayer membrane or the microporous multilayer film may have the following non-limiting constructions: (PP/PP)(PE/PE)/(PP/PP); (PE/PE)(PP/PP)(PE/PE); (PP/PE)(PP/PE)(PP/PE); (PP/PE)(PE/PP)(PE/PP); (PP/PP/PP)(PE/PE/PE)(PP/PP/PP); (PE/PE/PE)(PP/PP/PP)(PE/PE/PE); (PP/PE/PP)(PE/PP/PE)(PP/PE/PP); (PP/PP/PE)(PE/PE/PE)(PE/PP/PP); (PE/PE/PP)(PP/PP/PP)(PP/PE/PE); (PE/PP/PE)/(P P/PE/PP)(PE/PP/PE); (PP/PE/PP)(PE/PP/PE)(PP/PE/PP); (PP/PE/PP)(PP/PE/PP)(PP/PE/PP); (PP/PP/PP)(PP/PP/PP)(PP/PP/PP); (PE/PE/PE)(PE/PE/PE)(PE/PE/PE); (PE/PE/PE)(PP)(PE/PE/PE); (PP/PP/PP)(PE)(PP/PP/PP); (PE/PE/PE)(PP/PP)(PE/PE/PE); (PP/PP/PP)(PE/PE)(PP/PP); (PE/PP/PE)(PP)(PE/PP/PE); (PP/PP/PP)(PE)(PP/PP); (PE/PP/PE)(PP/PP)(PE/PP/PE); (PP/PP/PE)(PP/PE/ PE)(PP/PE/PP); (PP/PP/PP)(PE)(PP/PP/PP/PP); (PE/PE/PE/PE)(PP)(PE/PE/PE/PE); (PP/PP/PP/PP/PP)(PE)(PP/ PP/PP/PP); (PE/PE/PE/PE)(PP/PP)(PE/PE/PE/PE/ PE); (PP/PP/PP/PP/PP)(PE/PE/PE/PE/PE)(PP/PP/PP/PP/ PP); (PE/PE/PE/PE/PE)(PP/PP/PP/PP/PP)(PE/PE/PE/ PE/PE); (PP/PE/PP/PE/PP)(PE/PE/PE/PP/PE)(PP/PE/PP/ PE/PP); (PE/PP/PE/PP/PE)(PP/PE/PE/PP/PE)(PE/PP/PE/ PP/PE). Variations of the foregoing may be used to form microporous multilayer films or multilayer membranes having up to 10, 20, 30, 40, 50, 60, 70, 80, 90, 100, 110, 120, 130, 140, 150, 160, 170, 180, 190, or 200 layers or microlayers.

The thickness of the microporous multilayer films or multilayer membranes is not so limited, but is preferably less than 50 microns, less than 40 microns, less than 30 microns, less than 25 microns, less than 20 microns, less than 19 microns, less than 18 microns, less than 17 microns, less than 16 microns, less than 15 microns, less than 14 microns, less than 13 microns, less than 12 microns, less than 11 microns, less than 10 microns, less than 9 microns, less than 8 microns, less than 7 microns, less than 6 microns, or less than 5 microns. This is the thickness of the multilayer films or membranes before any coating or treatment is applied thereto.

Microporous as used herein means that the average pore size of the film, membrane, or coating is 2 microns or less, preferably 1 micron or less, 0.9 microns or less, 0.8 microns or less, 0.7 microns or less, 0.6 microns or less, 0.5 microns or less, 0.4 microns or less, 0.3 microns or less, 0.2 microns or less, and preferably 0.1 microns or less, 0.09 microns or less, 0.08 microns or less, 0.07 microns or less, 0.06 microns or less, 0.05 microns or less, 0.04 microns or less, 0.03 microns or less, 0.02 microns or less, or 0.01 microns or less. In preferred embodiments, pores may be formed, for example, by performing a stretching process on a precursor film, e.g., as is done in the Celgard® dry process.

In some preferred embodiments, where the multilayer microporous film or membrane comprises submembranes or regions comprising, consisting of, or consisting essentially of PE are microporous and have an average pore size between 0.03 and 0.1, preferably between 0.05 to 0.09, 0.05 to 0.08, 0.05 to 0.07, or 0.05 to 0.06.

In other preferred embodiments, wherein the multilayer microporous film or membrane comprises submembranes or regions comprising, consisting of, or consisting essentially of PP are microporous and have an average pore size between 0.02 to 0.06, preferably 0.03 to 0.05, and more preferably 0.04 to 0.05 or 0.03 to 0.04.

In some other preferred embodiments where the wherein the multilayer microporous film or membrane comprises submembranes or regions comprising, consisting of, or consisting essentially of PP a comprises submembranes or regions comprising, consisting of, or consisting essentially of PE, the average pore size of the PP submembranes or regions is smaller than that of the PE submembranes or regions.

The Gurley of the microporous multilayer film or membrane is not so limited and it may have any Gurley that makes it acceptable for use as a battery separator. In some embodiments, the microporous multilayer film or membrane described herein has a JIS Gurley (s/100 cc) of 150 or more, 160 or more, 170 or more, 180 or more, 190 or more, 200 or more, 210 or more, 220 or more, 230 or more, 240 or more, 250 or more, 260 or more, 270 or more, 280 or more, 290 or more, 300 or more, 310 or more, 320 or more, 330 or more, 340 or more, or 350 or more.

The porosity of the microporous multilayer film is not so limited. For example, any porosity that could form an acceptable battery separator is acceptable. In some embodiments, the porosity of the film or membrane may be from 10 to 60%, from 20 to 60%, from 30 to 60%, or from 40 to 60%.

The microporous multilayer film or membrane may have a puncture strength, uncoated, of 290 gf or more, 300 gf or more, 310 gf or more, 320 gf or more, 330 gf or more, 340 gf or more, 350 gf or more, or as high as 400 gf or more.

The microporous multilayer film or membrane may have any average dielectric break down not inconsistent with the stated goals herein. In some embodiments, the average dielectric break down value is improved or higher than that of a tri-layer microporous film having at least one of the same thickness, Gurley, and porosity. For example, it may be 1 to 35% higher, 5 to 35% higher, 10 to 35% higher, 15 to 35% higher, 20 to 35% higher, 25 to 35% higher, or 30 to 35% higher than that of a tri-layer microporous film having the same thickness, Gurley, and/or porosity.

The minimum dielectric breakdown value of the microporous multilayer film or membrane is not so limited. In some embodiments, the minimum value may be improved (or higher) than that of a tri-layer microporous film having the same thickness, Gurley, and/or porosity. For example, the minimum dielectric breakdown value may be 3 to 20% higher, 5 to 15% higher, 10 to 15% higher, 5 to 10% higher, 3 to 10% higher, 3 to 15% higher, 15 to 20% higher, 10 to 20% higher, or 5 to 20% higher than that of a tri-layer microporous film having the same thickness, Gurley, and/or porosity.

The standard deviation of the dielectric break down value is also not so limited. In some embodiments, it is improved (or lower) compared to a tri-layer microporous film having the same thickness, Gurley, and/or porosity. For example, the standard deviation may be 10 to 55% lower, 10 to 50% lower, 10 to 45% lower, 10 to 40% lower, 10 to 35% lower, 10 to 30% lower, 10 to 25% lower, 10 to 20% lower, or 10 to 15% lower.

Higher average DB values and minimum DB values and lower DB standard deviation is indicative of a film that can be used to provide a safer battery separator and battery. Dielectric breakdown is the voltage value at which current begins to flow across an insulator. A higher value obviously indicates a separator that can withstand higher voltage. The higher minimum value is also important because the battery separator is only as safe as its weakest point. Even with a higher average value, if one point on the film breaks down at a lower value, this is not good. Lower standard deviation in DB values for the multilayer microporous films described herein, show consistency in the safety of the microporous multilayer films described herein.

The mixed penetration average (N) of the microporous multilayer films or membranes described herein are also not so limited. For example, the mixed penetration value may be 380 N or higher, 390 N or higher, 400 N or higher, 410 N or higher, 420 N or higher, 440 N or higher, 450 N or higher, 460 N or higher, 470 N or higher, 480 N or higher, 500 N or higher, 510 N or higher, 520 N or higher, 550 N or higher, 560 N or higher, 580 N or higher, 600 N or higher, 620 N or higher, 640 N or higher, 660 N or higher, 680 N or higher, 690 N or higher, 700 N or higher, 710 N or higher, 720 N or higher, 740 N or higher, 750 N or higher, 760 N or higher.

The MD shrinkage of the multilayer microporous films or membranes described herein are not so limited, but are preferably lower than those of prior tri-layer microporous films. For example, the % MD shrinkage at 105° C. is less than 3%, preferably less than 2.5%, more preferably less than 2% or less than 1.5%, and most preferably less than 1%.

MD tensile strength of the microporous multilayer film is not so limited, but is preferably high. For Example, it is above 1800 kgf/cm$^2$, above 2000 kgf/cm$^2$, above 2100 kgf/cm$^2$, above 2200 kgf/cm$^2$, above 2250 kgf/cm$^2$, above 2300 kgf/cm$^2$, above 2400 kgf/cm$^2$, or above 2500 kgf/cm$^2$.

MD elongation of the microporous multilayer film is not so limited. For example, in some embodiments, it is above 45%, 46%, 47%, 48%, 49%, 50%, 51%, 52%, 53%, 54%, 55%, 56%, 57%, 58%, 59%, or 60%.

TD tensile strength of the microporous multilayer film is not so limited. For example, in some embodiments, the TD tensile strength is 120 kgf/cm$^2$ or above, 125 kgf/cm$^2$ or above, 130 kgf/cm$^2$ or above, 135 kgf/cm$^2$ or above, 140 kgf/cm$^2$ or above, 145 kgf/cm$^2$ or above, 150 kgf/cm$^2$ or above, 155 kgf/cm$^2$ or above, 160 kgf/cm$^2$ or above, 165 kgf/cm$^2$ or above, 170 kgf/cm$^2$ or above, 175 kgf/cm$^2$ or above, 180 kgf/cm$^2$ or above, 185 kgf/cm$^2$ or above, or 190 kgf/cm$^2$ or above, or 195 kgf/cm$^2$ or above.

TD elongation of the microporous multilayer film is not so limited. For example, it may be above 500%, above 550%, above 600%, above 650%, above 700%, above 750%, above 800%, above 850%, above 900%, above 950%, or above 1000%.

The shutdown temperature of the microporous multilayer film is not so limited, but is preferably 120° C. or higher, 130° C. or higher, 140° C. or higher, 150° C. or higher 160° C. or higher 170° C. or higher, 180° C. or higher, 190° C. or higher, or 200° C. or higher.

The shutdown speed of the microporous multilayer film is not so limited, but is preferably 6,000 ohm-cm$^2$ or higher, 7,000 ohm-cm$^2$ or higher, 8,000 ohm-cm$^2$ or higher, 9,000 ohm-cm$^2$ or higher, 10,000 ohm-cm$^2$ or higher, 11,000 ohm-cm$^2$ or higher, 12,000 ohm-cm$^2$ or higher, 13,000 ohm-cm$^2$ or higher, 14,000 ohm-cm$^2$ or higher, 15,000 ohm-cm$^2$ or higher, 16,000 ohm-cm$^2$ or higher, 17,000 ohm-cm$^2$ or higher, 18,000 ohm-cm$^2$ or higher, 19,000 ohm-cm$^2$ or higher or 20,000 ohm-cm$^2$ or higher.

Higher shutdown speed is also indicative of a safer battery separator. The faster a battery can shutdown, the greater its ability to prevent thermal runaway.

In some embodiments, the microporous multilayer membrane or film described herein may surprisingly exhibit increased strength performance, as defined by reduced splittiness or reduced propensity to split, when compared to known battery separators of the same (or greater) thickness, especially when compared to known dry process battery separators of the same (or greater) thickness. The improvement in splitting or splittiness may be quantified by a test method disclosed herein as Composite Splittiness Index (CSI) and the novel or improved separators formed from the membrane or films described herein may have an improvement in the CSI.

Regarding the structural features of the microporous multilayer films and membranes described herein, in some embodiments, the tortuosity of the films are above 1.6, above 1.7, 1.8, above 1.9, above 2.0, above 2.1, or above 2.2. Without wishing to be bound by any particular theory, it is believed that the observed tortuosity values, particularly the values above 2.0, 2.1, or 2.2, may be a cause for the increased puncture strength and mix penetration average values disclosed herein. A more tortuous film is also believed to be safer when used as a battery separator for a lithium ion battery.

The MacMullin number of the microporous multilayer films or membranes described herein is above 5.0, above 5.5, above 6.0, above 6.5, above 7.0, above 7.5, above 8.0, above 8.5, above 9.0, above 9.5, above 10.0, or above 10.5.

In some embodiments, the electrical resistance of the microporous multilayer films or membranes is above 0.9, above 1.0, above, 1.1, above 1.2, above 1.3, above 1.4, above 1.5, above 1.6, or above 1.7

The crystallinity of the microporous multilayer films described herein were found to be different from that of prior multilayer and tri-layer films. For example, in some embodiments where the microporous multilayer film comprises the following: (1) a first region comprising two or more layers; (2) a second region comprising two or more layers that is on a first side of the first region; and (3) a third region comprising two or more layers that is on a side of the first region opposite the first side, at least one of the first, second or third regions comprises PE and has a lower crystallinity, when measured by DSC, than a PE-containing layer of a trilayer microporous film, where the tri-layer microporous film has the same thickness as the multilayer microporous film. For example, the crystallinity may be 1 to 20% lower, 1 to 19%, 1 to 18%, 1 to 17%, 1 to 16%, 1 to 15% lower, 1 to 14%, 1 to 13%, 1 to 12%, 1 to 11%, 1 to 10% 1 to 9%, 1 to 8%, 1 to 7%, 1 to 6% 1 to 5%, 1 to 4%, 1 to 3%, or 1 to 2% lower than a PE-containing layer of a trilayer microporous film, where the tri-layer microporous film has the same thickness as the multilayer microporous film.

Another structural difference between the multilayer microporous films described herein and the prior tri-layer and multilayer films may be seen using a scanning electron microscope. For example, see FIGS. 25-31. As shown, for example, in FIGS. 25-31, the multilayer microporous film or membrane may comprise at least a first region comprising two or more layers and a second layer comprising at least one layer. The first region may comprise mostly discontinuous amorphous regions when viewed in the z-direction of the film using SEM. What is meant by the term "mostly" is that most, but not necessarily all, of the amorphous regions in the first layer are discontinuous. This can mean that at least 50%, more than 50%, more than 60%, more than 70%, more than 80%, more than 90%, more than 95%, more than 99%, or 100% of the amorphous regions in the first layer are continuous. "Discontinuous amorphous regions" means that, when a sample of the first layer is analyzed, for example by SEM, the path of the amorphous region is interrupted or broken by a crystalline (lamellae) region along the total thickness direction of the first layer. Discontinuous means that the amorphous region path is interrupted or broken by a crystalline (lamellae) region along the total thickness direction of the first layer. The amorphous region path does not go around the crystalline (lamellae) region. Instead, the crystalline (lamellae) region completely disrupts the path of the amorphous region along the total thickness of the first layer. The path of the amorphous region may be linear or circuitous. One example of the difference between discontinuous amorphous regions and continuous amorphous regions is seen by comparing the SEM of the polyethylene layer of COM EX 4 with the SEM of the polyethylene layer RO397 in FIG. 29. Discontinuous may also mean that the amorphous regions are non-columnar, non-vertically continuous, or not pillar-like along the thickness of the layer. In some preferred embodiments, the first region with the mostly discontinuous amorphous regions may comprise, consist of, or consist essentially of polypropylene in some or all of the layers in that region. In some other embodiments, the second region comprises two or more layers, and the amorphous areas of that region of the film or membrane have a maximum width of 0.85 microns, 0.8 microns, 0.75 microns, 0.70 microns, 0.65 microns, or 0.6 microns. For example, this is seen by comparing COM EX 4 with RO37 in FIG. 30 In some preferred embodiments, the second region may comprise, consist of, or consist essentially of polyethylene in some or all of the layers in that region.

(2) Optional Coating

In some embodiments, one or more coating layers may be applied to one or two sides of the microporous membrane or film to form a battery separator. In some embodiments, one or more of the coatings may be a ceramic coating comprising, consisting of, or consisting essentially of a polymeric binder and organic and/or inorganic particles. In some embodiments, only a ceramic coating is applied to one or both sides of the microporous membrane or film. In other embodiments, a different coating may be applied to the microporous membrane or film before or after the application of the ceramic coating. The different additional coating may be applied to one or both sides of the membrane or film also. In some embodiments, the different polymeric coating layer may comprise, consist of, or consist essentially of at least one of polyvinylidene difluoride (PVdF) or polycarbonate (PC).

In some embodiments, the thickness of the coating layer is less than about 12 µm, sometimes less than 10 µm, sometimes less than 9 µm, sometimes less than 8 µm, sometimes less than 7 µm, and sometimes less than 5 µm. In at least certain selected embodiments, the coating layer is less than 4 µm, less than 2 µm, or less than 1 µm.

The coating method is not so limited, and the coating layer described herein may be coated onto a porous substrate by at least one of the following coating methods: extrusion coating, roll coating, gravure coating, printing, knife coating, air-knife coating, spray coating, dip coating, or curtain coating. The coating process may be conducted at room temperature or at elevated temperatures.

The coating layer may be any one of nonporous, nanoporous, microporous, mesoporous or macroporous. The coating layer may have a JIS Gurley of 700 or less, sometimes 600 or less, 500 or less, 400 or less, 300 or less, 200 or less, or 100 or less.

One or more layers, treatments, materials, or coatings (CT) and/or nets, meshes, mats, wovens, or non-wovens (NW) may be added on one or both sides, or within the multilayer film or membrane (M) described herein, which may include but not limited to CT/M, CT/M/CT, NW/M, NW/M/NW, CT/M/NW, CT/NW/M/NW/CT, CT/M/NW/CT, etc.

Method

The method for forming the multilayer microporous film or membrane described herein is not so limited and may be a dry process, preferably the CELGARD® dry-stretch process, a dry process such as BNOPP, or a wet process, which utilize a solvent or oil.

The method for forming the multilayer microporous films or membranes described herein comprise at least the following steps: (1) coextruding two or more polymer mixtures, which may be the same or different, to form a co-extruded film as described hereinabove having two or more layers or microlayers; (2) laminating the co-extruded film to at least one other mono-extruded film, co-extruded film, or a nonwoven. In some preferred embodiments, the co-extruded film is laminated to with two other co-extruded films having two or more microlayers; and (3) optionally one or more additional steps.

(1) Co-Extrusion Step

Figure 7:
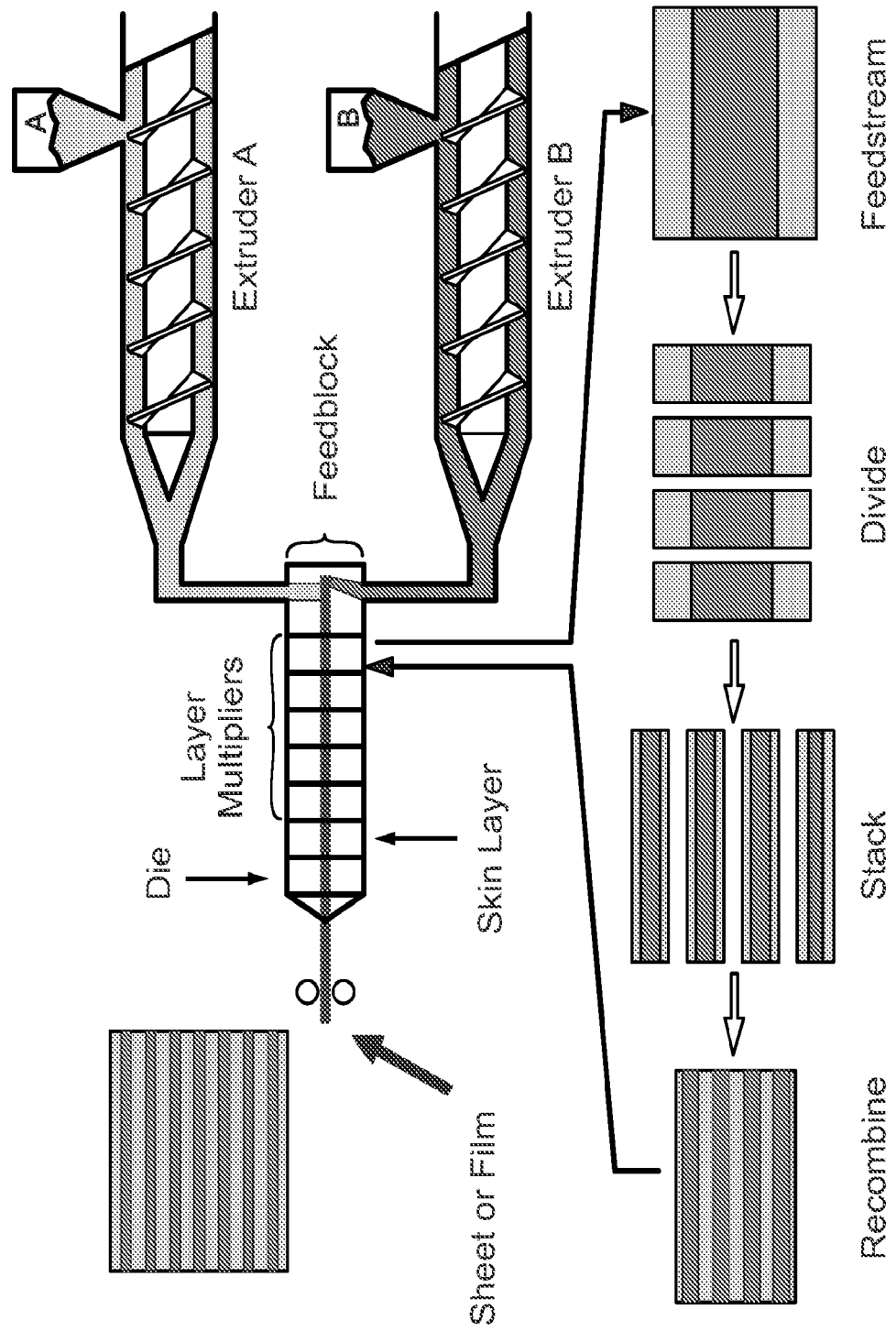
FIG. 7 is a schematic diagram of how microlayers may be created in the feedblock by layer multiplication in a co-extrusion process.
Figure 8:
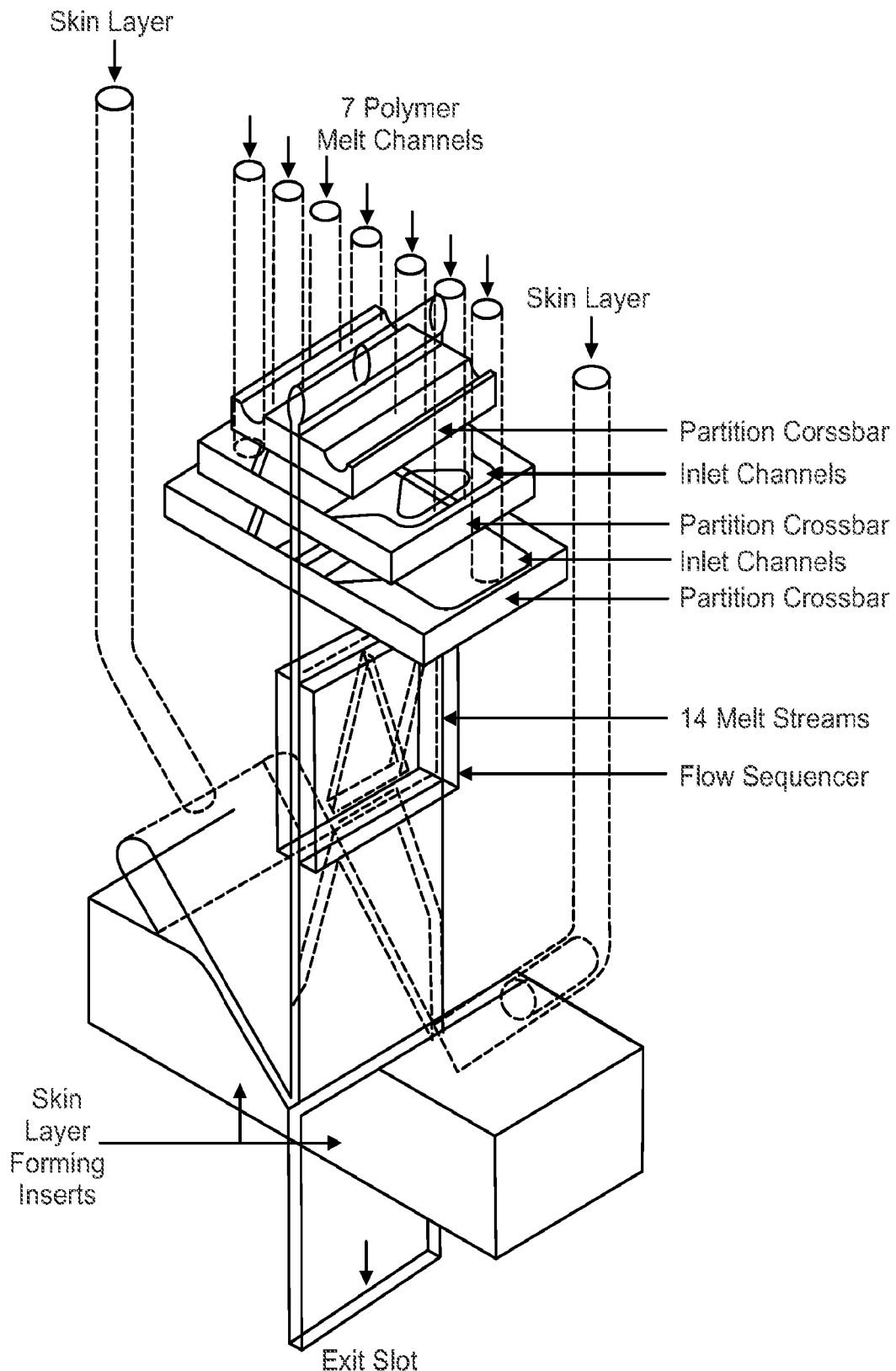
FIG. 8 is a schematic diagram of how microlayers may be created by layer splitting in a co-extrusion process.
Figure 9:
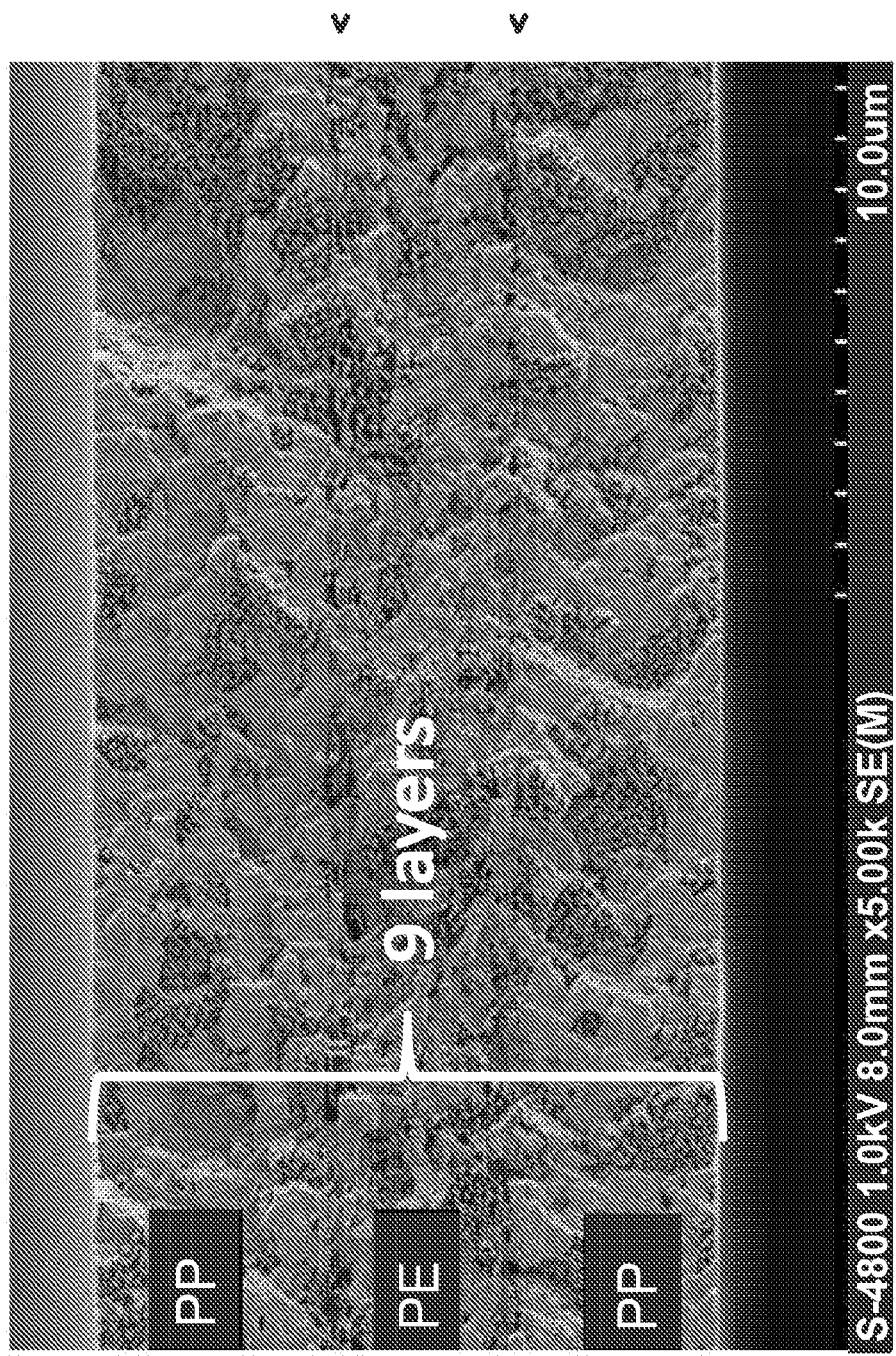
FIG. 9 is a cross-section Scanning Electron Micrograph (SEM) of an exemplary inventive 3 layer or trilayer (9 microlayers total, with 3 triple microlayer sub-layers laminated together) PP/PE/PP microporous membrane at a magnification of 5,000× (at least the outer PP sub-layers are microporous).
Figure 10:
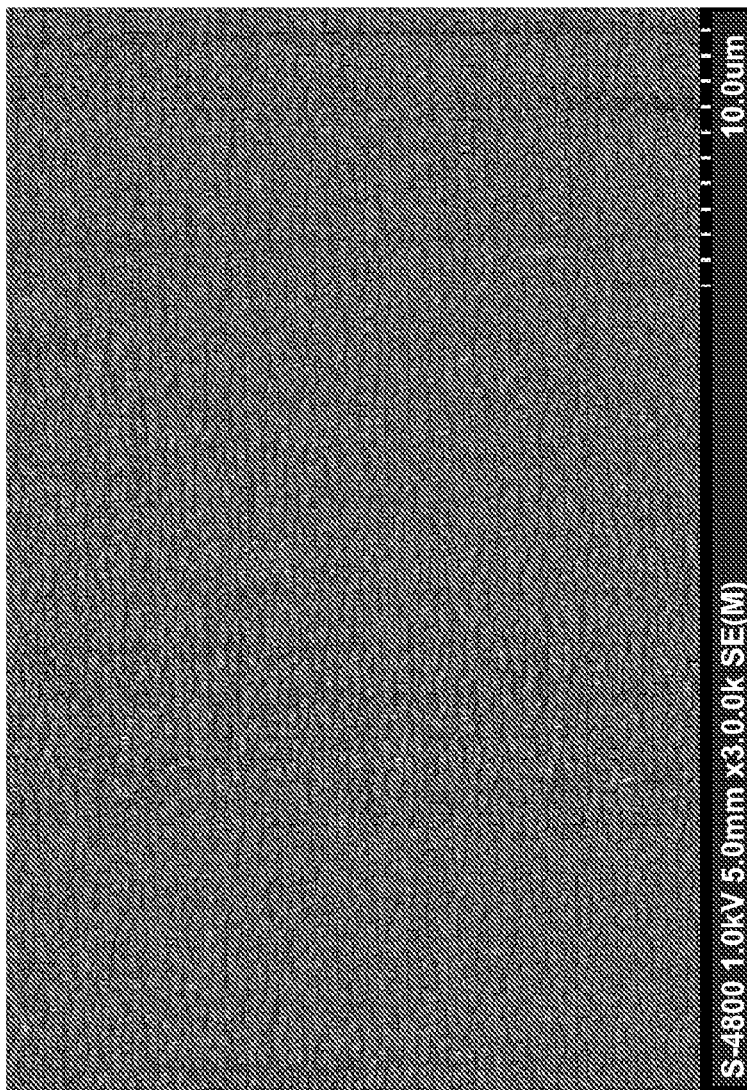
FIG. 10 is a surface Scanning Electron Micrograph (SEM) of a surface of the polypropylene surface sub-layer (surface PP microlayer) of the 9 microlayer, 3 layer membrane of FIG. 9 at a magnification of 3,000×. This 9 microlayer membrane could be used as one layer of a 3 layer (9 sublayer, 27 microlayer) membrane such as shown in FIG. 1.
Figure 11:
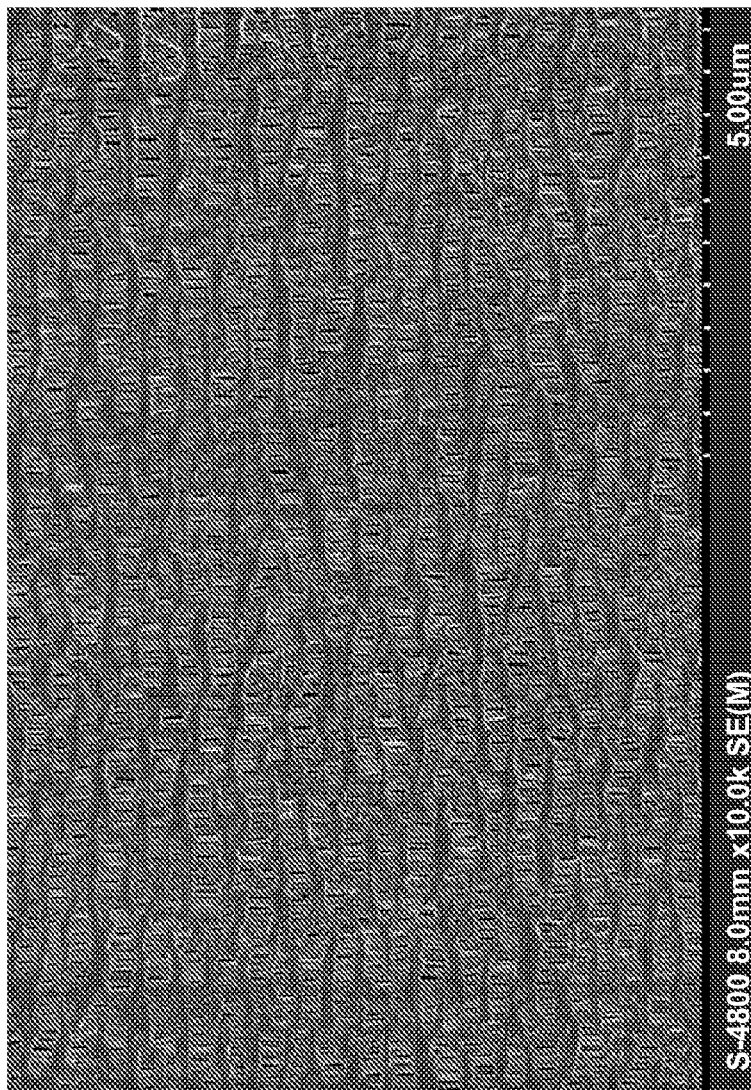
FIG. 11 is a surface Scanning Electron Micrograph (SEM) of a portion of the surface of the polypropylene surface sub-layer (surface PP microlayer) of the 9 microlayer layer, 3 layer membrane of FIG. 9 at a magnification of 10,000×.
Figure 12:
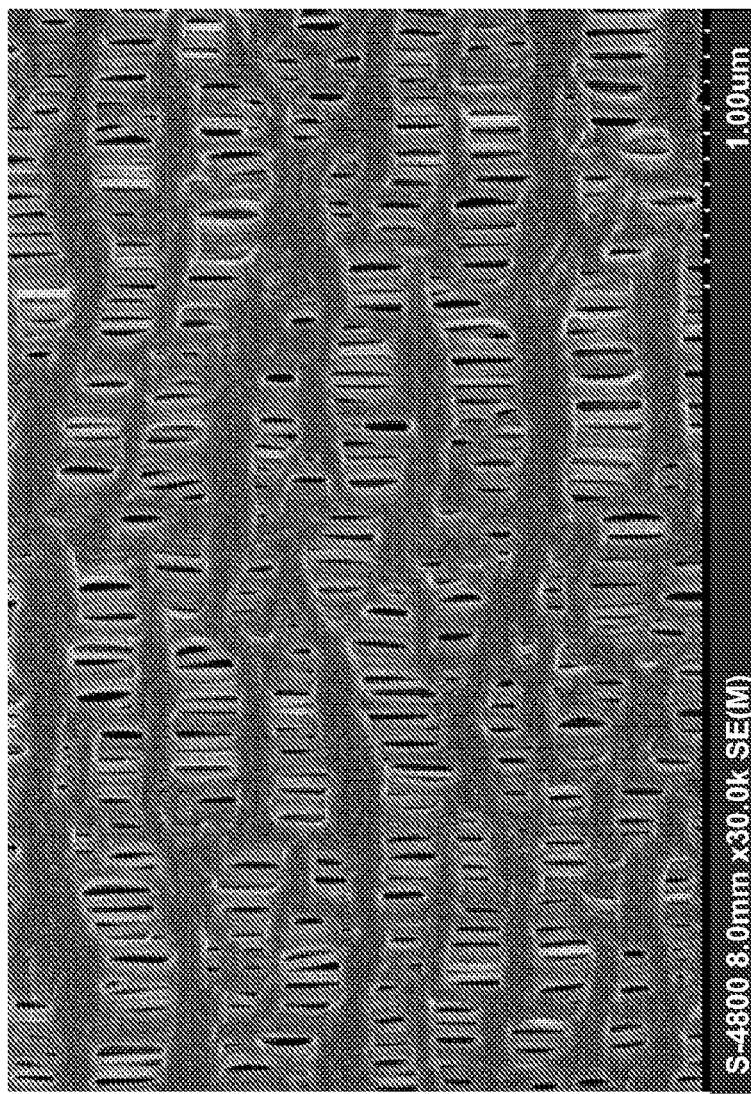
FIG. 12 is a surface Scanning Electron Micrograph (SEM) of a portion of the surface of the polypropylene surface sub-layer (surface PP microlayer) of the 9 microlayer, 3 layer membrane of FIG. 9 at a magnification of 30,000×.
Figure 13:
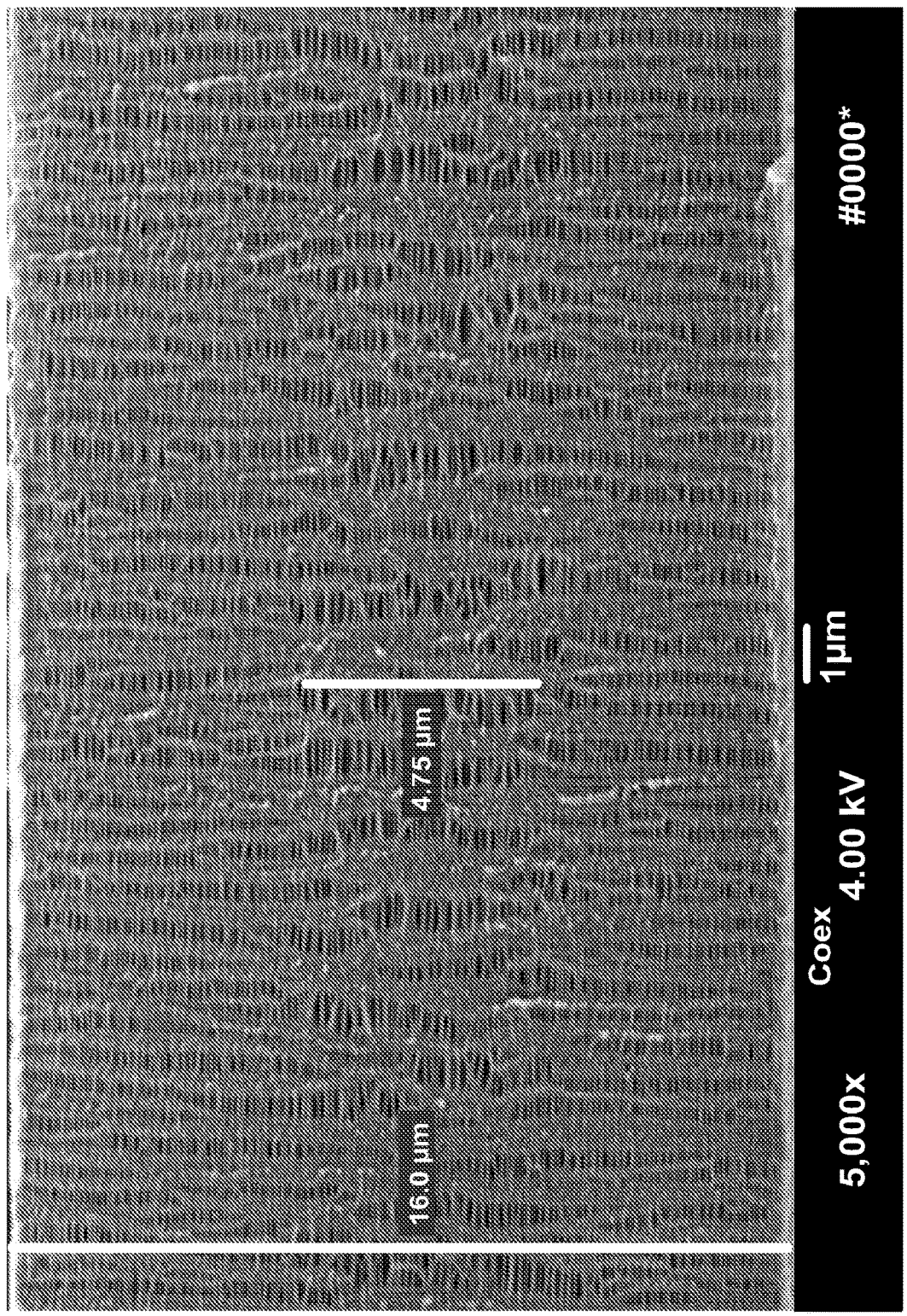
FIG. 13 is a cross-section Scanning Electron Micrograph (SEM) of an example inventive 3 "microlayer" co-extruded sublayer (PO1/PO2/PO1) microporous membrane at a magnification of 5,000× (at least the outer PO1 microlayers are microporous) with microlayer PO2 made of a different resin or resin blend than microlayers PO1 to more clearly show the interfaces (interface zones) of the adjacent co-extruded microlayers. It is believed that the multiple co-extruded microlayer interfaces and the laminated interfaces between adjacent sublayers provide the unique characteristics, properties and/or performance of the inventive Multilayer structure. The example sublayer of FIG. 13 was made of 3 layers of PP with the center PP layer of a different PP resin than the outer two layers and had to be run with a thicker precursor due to the lower viscosity of the center PP layer (typically the microlayers would be less than 4 um, preferably less than 3 um, and more preferably less than 2 um each).
Figure 14:
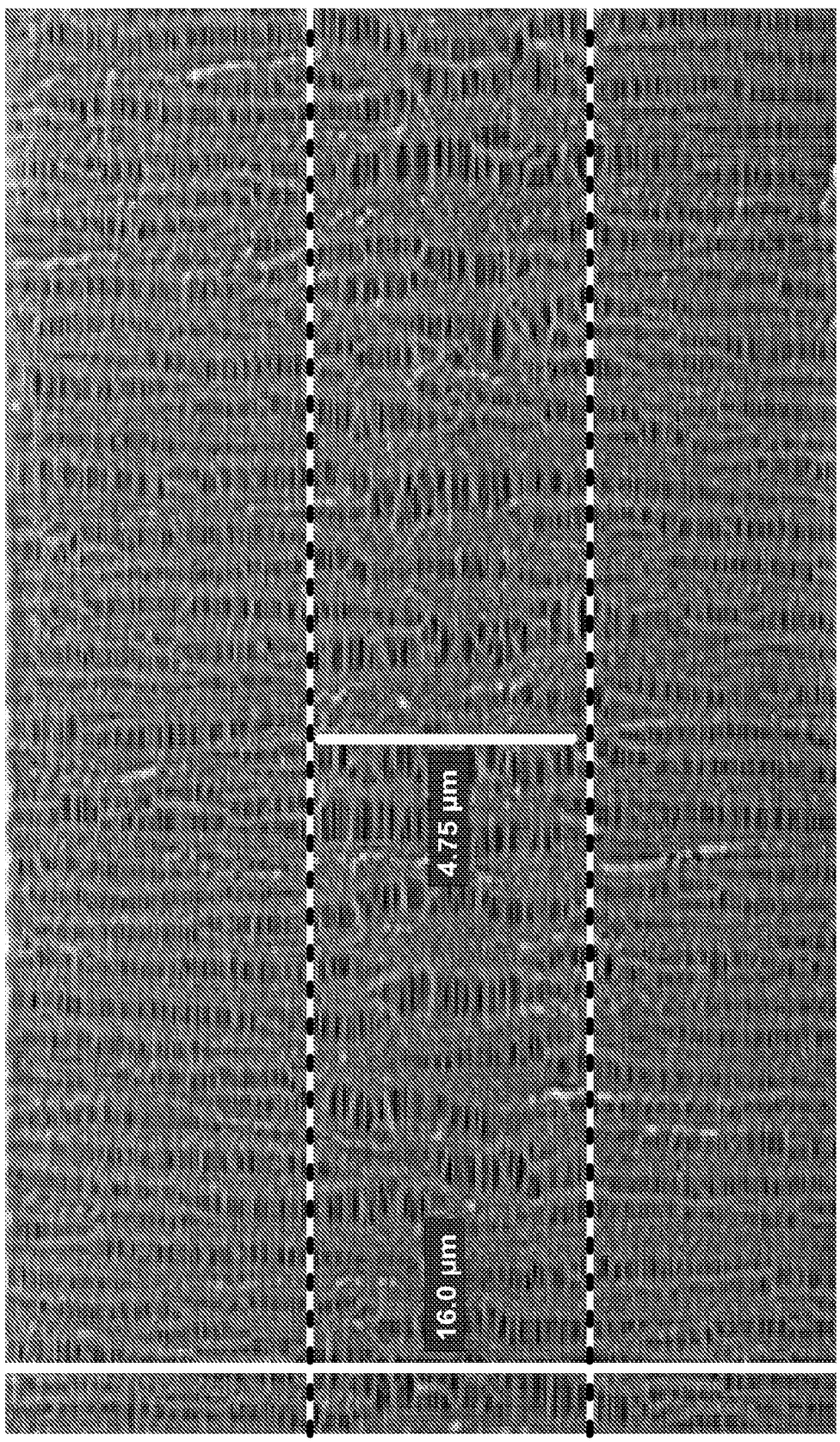
FIG. 14 is a markup of a portion of the SEM of FIG. 13 showing the interface zones with red and green horizontal lines.
Figure 15:
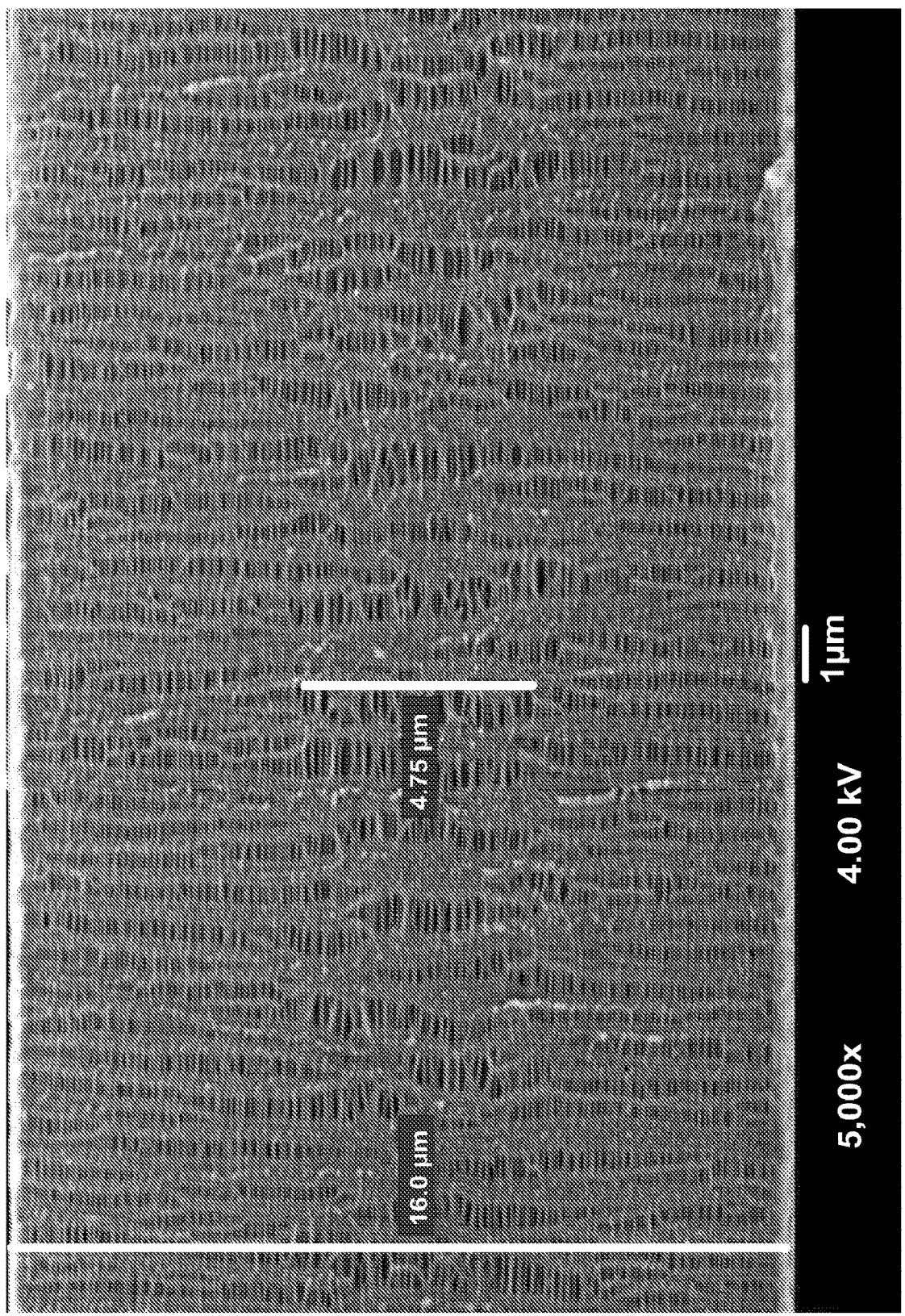
FIG. 15 is an enlarged version of FIG. 13 showing the unique pore structures and membrane structures.
Figure 16:
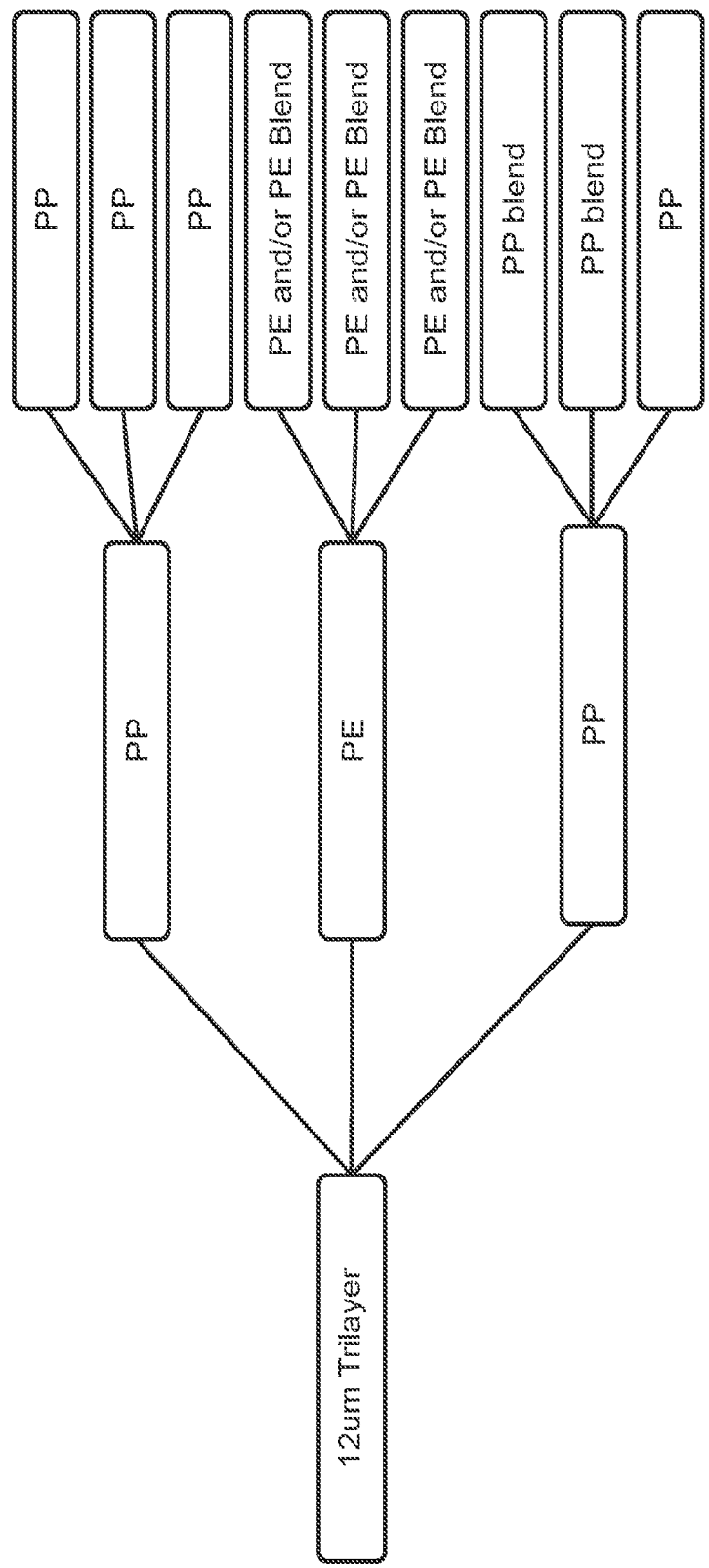
FIG. 16 is a schematic representation of an exemplary 12 um trilayer in accordance with at least one embodiment of the present invention (PP/PE/PP sublayers or microlayers laminated together, each of the sublayers differ, the top PP sublayer has 3, co-extruded PP microlayers, the center PE sublayer has 3 PE microlayers that can be the same or different than each other, and the bottom PP sublayer has 2 PP blend microlayers and a PP microlayer).
Figure 17:
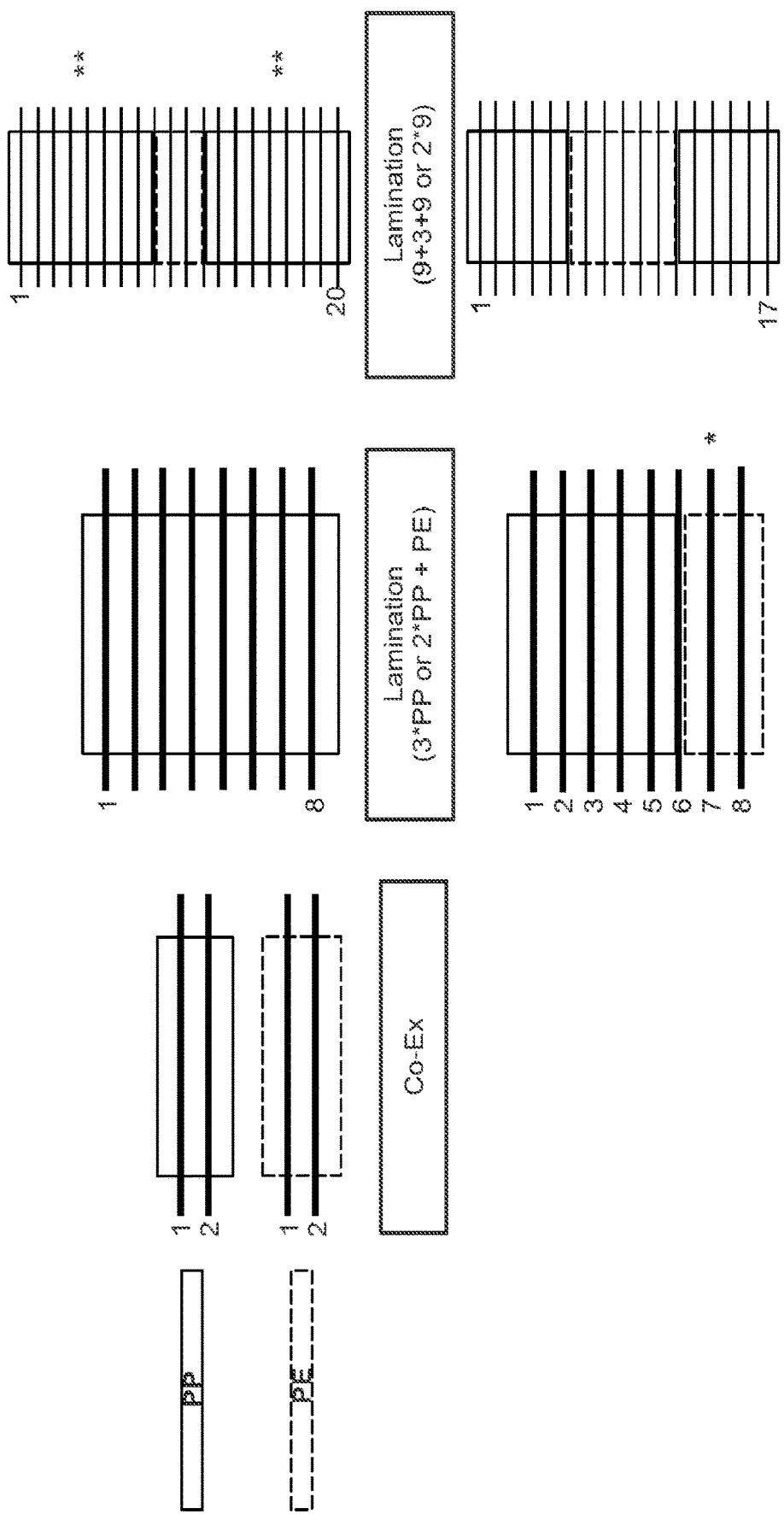
FIG. 17 is a schematic representation of exemplary 3, 9, 18, or 21 microlayer embodiments or examples in accordance with the present invention (the blue represents PP microlayers, the yellow represents PE microlayers, and the numbered black lines indicate interfaces).

Co-extrusion is not so limited. An exemplary co-extrusion process is shown in FIG. 7 and a co-extrusion die is shown in FIG. 8. In some embodiments, is performed using a co-extrusion die with one or more extruders feeding the die. Typically, there is one extruder for each desired layer or microlayer of the ultimately formed co-extruded film. For example, if the desired co-extruded film has three microlayers, three extruders are used with the co-extrusion die. In at least one embodiment the inventive membrane may be constructed of many microlayers or nanolayers wherein the final product may contain 50 or more layers of individual microlayers or nanolayers. In at least certain embodiments the microlayer or nanolayer technology may be created by in a pre-encapsulation feedblock prior to entering a cast film or blown film die.

In some preferred embodiments, the co-extrusion is an air bubble co-extrusion method and the blow-up ration may be varied between 0.5 to 2.0, preferably, 0.7 to 1.8, most preferably 0.9 to 1.5. Following co-extrusion using this blow-up ratio, the film may be MD stretched, MD stretched and then TD stretched (with or without MD relax) or simultaneously MD and TD stretched. The film may then be optionally calendared to further control porosity.

Co-Extrusion Benefits include but are not limited to increasing the number of layers (interfaces), which without wanting to be bound by any particular theory, is believed to improve puncture strength. Also, co-extrusion, without wishing to be bound by any particular theory, is believed to result in the observed DB improvement. Specifically, DB improvement may be related to the reduced PP pore size observed when a co-extrusion process is used. Also, co-extrusion allows for a wider number of choices of materials by incorporating blends in the microlayers. Co-extrusion also allows formation of thin tri-layer or multi-layer films (coextruded films). For example, a tri-layer co-extruded film having a thickness of 8 or 10 microns or thinner may be formed. Co-extrusion allows for higher MD elongation, different pore structure (smaller PP, larger PE). Co-extrusion can be combined with lamination to create desired inventive multi-layer structures. For, example, structures as formed in the Examples.

Minimum achievable thickness is determined by the extrusion process. In some examples, the thinnest PP microlayer may be about 0.19 mil (sublayer of about 4.83 urn), and PE is about 0.17 mil (sublayer is about 4.32 um). 0.19 mil and 0.17 mil for each of the 3 microlayers layers of PP and PE, respectively. For certain 21 layer structure examples, we may have about 1.14 mil of PP (or 0.57 mil on each side) and 0.17 mil of PE for a total extruded thickness of 1.31 mil (33 um). We may be able to make 21-layer products of only 30 um or less with this configuration.

(2)

Laminating is not so limited and involves brining a surface of the co-extruded film together with a surface of the at least one other film and fixing the two surfaces two one other using heat, pressure, and or heat and pressure. Heat may be used, for example, to increase the tack of a surface of either or both of the co-extruded film and the at least one other film to make lamination easier, making the two surfaces stick or adhere together better.

In some preferred embodiments, the laminate formed by laminating the co-extruded film to at least one other film is a precursor for subsequent MD and/or TD stretching steps, with or without relax. In some embodiments, the co-extruded films are stretched before lamination.

(3) Additional Steps

Additional steps may comprise, consist of, or consist essentially of an MD, TD, or sequential or simultaneous MD and TD stretching steps. The stretching steps may occur before or after the lamination step. Stretching may be performed with or without MD and/or TD relax. Co-pending, commonly owned, U.S. Published Patent Application Publication No. US2017/0084898 A1 published Mar. 23, 2017 is hereby fully incorporated by reference herein.

Other additional steps may include calendaring. For example, in some embodiments the calendaring step may be performed as a means to reduce the thickness, as a means to reduce the pore size and/or porosity, and/or to further improve the transverse direction (TD) tensile strength and/or puncture strength of the porous biaxially stretched membrane precursor. Calendaring may also improve strength, wettability, and/or uniformity and reduce surface layer defects that have become incorporated during the manufacturing process e.g., during the MD and TD stretching processes. The calendared film or membrane may have improved coat ability (using a smooth calendar roll or rolls). Additionally, using a texturized calendaring roll may aid in improved coating adhesion to the film or membrane.

Calendaring may be cold (below room temperature), ambient (room temperature), or hot (e.g., 90° C.) and may include the application of pressure or the application of heat and pressure to reduce the thickness of a membrane or film in a controlled manner. Calendaring may be in one or more steps, for example, low pressure calendaring followed by higher pressure calendaring, cold calendaring followed by hot calendaring, and/or the like. In addition, the calendaring process may use at least one of heat, pressure and speed to densify a heat sensitive material. In addition, the calendaring process may use uniform or non-uniform heat, pressure, and/or speed to selectively densify a heat sensitive material, to provide a uniform or non-uniform calendar condition (such as by use of a smooth roll, rough roll, patterned roll, micro-pattern roll, nano-pattern roll, speed change, temperature change, pressure change, humidity change, double roll step, multiple roll step, or combinations thereof), to produce improved, desired or unique structures, characteristics, and/or performance, to produce or control the resultant structures, characteristics, and/or performance, and/or the like Another additional step may include pore-filling. The pore-filling step is not so limited and can be performed in any manner not inconsistent with the stated goals herein. For example, in some embodiments the pores of the may be partially or fully coated, treated or filled with a pore-filling composition, material, polymer, gel polymer, layer, or deposition (like PVD). Preferably, the pore-filling composition coats 50% or more, 60% or more, 70% or more, 80% or more, 90% or more, 95% or more, etc. of the surface area of the pores. The pore-filling composition may comprise, consist of, or consist essentially of a polymer and a solvent. The solvent may be any suitable solvent useful for forming a composition for coating or filling pores, including organic solvent, e.g., octane, water, or a mixture of an organic solvent and water. The polymer can be any suitable polymer, including an acrylate polymer or a polyolefin, including a low-molecular weight polyolefin. The concentration of the polymer in the pore-filling composition may be between 1 and 30%, between 2 and 25%, between 3 and 20%, between 4 and 15%, between 5 and 10%, etc., but is not so limited, as long as the viscosity of the pore-filling composition is such that the composition can coat the walls of the pores of any porous biaxially-stretched precursor membrane disclosed herein. Pore-filling increases either or both of the machine direction (MD) and the transverse direction (TD) tensile Composite, Vehicle, or Device A composite comprising a battery separator as described hereinabove and one or more electrodes, e.g., an anode, a cathode, or an anode and a cathode, provided in direct contact therewith. The type of electrodes are not so limited. For example, the electrodes can be those suitable for use in a lithium ion secondary battery.

A suitable anode can have an energy capacity greater than or equal to 372 mAh/g, preferably ≥700 mAh/g, and most preferably ≥1000 mAH/g. The anode be constructed from a lithium metal foil or a lithium alloy foil (e.g. lithium aluminum alloys), or a mixture of a lithium metal and/or lithium alloy and materials such as carbon (e.g. coke, graphite), nickel, copper. The anode is not made solely from intercalation compounds containing lithium or insertion compounds containing lithium.

A suitable cathode may be any cathode compatible with the anode and may include an intercalation compound, an insertion compound, or an electrochemically active polymer. Suitable intercalation materials includes, for example, $MoS_2$, $FeS_2$, $MnO_2$, $TiS_2$, $NbSe_3$, $LiCoO_2$, $LiNiO_2$, $LiMn_2O_4$, $V_6O_{13}$, $V_2O_5$, and $CuCl_2$. Suitable polymers include, for example, polyacetylene, polypyrrole, polyaniline, and polythiopene.

Any separator described hereinabove may be incorporated to any vehicle, e.g., an e-vehicle, or device, e.g., a cell phone or laptop, that completely or partially battery powered.

Various embodiments of the invention have been described in fulfillment of the various objects of the invention. It should be recognized that these embodiments are merely illustrative of the principles of the present invention. Numerous modifications and adaptations will be readily apparent to those skilled in the art without departing from the spirit and scope of this invention.

EXAMPLES

Preparation of Examples

Inventive (multilayer) products were prepared and compared to Comparative (tri-layer) products. The multilayer products were formed by the methods described herein, and comprise the steps of coextruding three separate films comprising three coextruded layers, and laminating the three films together. The tri-layer products were formed by forming three separate extruded monolayer films and laminating the monolayers together.

The compositions of the microlayers of the inventive products prepared are as follows:

Example 1 (EX 1)

(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 2 (EX 2)

(PP1/PP2/PP1)(PE1/PE2/PE3)(PP1/PP2/PP1)—PP1 is a homopolymer PP. PP2 a homopolymer polypropylene having a higher MFR than PP1. PE1 high density polyethylene with melt index between 0.25-0.5 g/10 min at 2.16 kg and 190 deg C. PE2 is an ultrahigh density polyethylene. PE3 is a blend of 95% high density polyethylene with melt index between 0.25-0.5 g/10 min at 2.16 kg and 190 deg C., and density range between 0.955-0.966 g/cm$^3$ and 5% mLLDPE.

Example 3 (EX 3)

(PP/PP/PP)(PE1/PE2/PE1)(PP/PP/PP)—PP layers are made of a homopolymer PP, density=0.90 g/cm$^3$, MFR in the range of 0.5 MFR-2 MFR. PE1 is made of high density polyethylene with melt index between 0.25-0.5 g/10 min at 2.16 kg and 190 deg C. PE2 is made of an ultrahigh molecular weight polyethylene.

Example 4 (EX 4)

(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 5 (EX 5)

PP/PP/PPXPE/PE/PEXPP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 6 (EX 6)

(PP/PP/PP)(PE/PE/PE)(PP/PP/PP)—PP is made of a homopolymer PP, density=0.90 g/cm$^3$, MFR in the range of 0.5 MFR-2 MFR. PE is made of high density polyethylene with melt index between 0.25-0.5 g/10 min at 2.16 kg and 190 deg C.

Example 10-(EX 10)

(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 8 (EX 8)

(PP1/PP2/PP1)(PE1/PE2/PE1)(PP1/PP2/PP1) PP1 is homopolymer PP, density=0.90 g/cm$^3$, MFR in the range of 0.5 MFR-2 MFR. PP2 is made of a homopolymer PP, 0.25 MFR, 0.9 density. PE1 is high density polyethylene with melt index between 0.25-0.5 g/10 min at 2.16 kg and 190 deg C. PE2 is an ultrahigh molecular weight polyethylene.

Example 9 (EX 9)

(PP1/PP2/PP1)(PE/PE/PE)(PP1/PP2/PP1)—PP1 is made of homopolymer PP, density=0.90 g/cm$^3$, MFR in the range of 0.5 MFR-2 MFR. PP2 is a blend of 95% homopolymer PP, density=0.90 g/cm$^3$, MFR in the range of 0.5 MFR-2 MFR and 5% of a propylene-ethylene copolymer. PE is a blend of 92% high density polyethylene with melt index between 0.25-0.5 g/10 min at 2.16 kg and 190 deg C. and 8% olefin block copolymer.

Example 7 (EX 7)

(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Mainly with reference to FIGS. 38 to 50 and additional multilayer embodiments, here are additional Examples 11 to 38:

Example 11

Each PP and PE layer of the trilayer structure is itself made up of multiple layers, preferably co-extruded and then laminated-(PP/PP/PP)(PE/PE/PE)(PP/PP/PP)—all PP layers are made of a homopolymer PP, density=0.90 g/cm$^3$, MFR in the range of 0.5 MFR-2 MFR. All PE layers are made of a blend of 95% high density polyethylene with melt index between 0.25-0.5 g/10 min at 2.16 kg and 190 deg C., and density range between 0.955-0.966 g/cm$^3$ and 5% mLLDPE.

Example 12

(PP1/PP2/PP3), —PP1 is a Polypropylene blend, PP2 is a PP block co-polymer, and PP3 is the same as PP1, PP2, or a different blend or block co-polymer.

Example 13

(PP1/PP1) or (PP2/PP2) or (PP1/PP2)—PP1 is a Polypropylene blend, PP2 is a PP block co-polymer.

Example 14

(PP1/PP1/PP1) or (PP2/PP2/PP2)—PP1 is a Polypropylene blend, PP2 is a PP block co-polymer.

Example 15

(PP1/PP2/PP3)—PP1 is a Polypropylene blend, PP2 is a PP block co-polymer, and PP3 is the same or a different PP block copolymer.

Examples 16

(PP3/PP2/PP1)/(PP3/PP2/PP1)—PP1 is a Polypropylene blend, PP2 is a PP block co-polymer, and PP3 is the same or a different PP block copolymer.

Example 17

(PP1/PP2/PP3)/(PP3/PP2/PP1)—PP1 is a Polypropylene blend, PP2 is a PP block co-polymer, and PP3 is the same or a different PP block copolymer.

Example 18

(PP1/PP2)/(PP3/PP1)—PP1 is a Polypropylene blend, PP2 is a PP block co-polymer, and PP3 is the same or a different PP block copolymer.

Example 19

(PP1/PP2/PP3/PP1)—PP1 is a Polypropylene blend, PP2 is a PP block co-polymer, and PP3 is the same or a different PP block copolymer.

Example 20

(PP1/PP2/PP3)—PP1 is a Polypropylene blend, PP2 is a PP block co-polymer, and PP3 includes an adhesion promoter.

Example 21

(PO3/PP2/PP1)—PP1 is a Polypropylene blend, PP2 is a PP block co-polymer, and PO3 is a Polyolefin blend (such as PP+PE).

Example 22

(PP1/PP2/PP3)—PP1 is a homopolymer PP+ additives to modify the coefficient of friction as described herein, which may include any slip or block additives such as siloxane. PP2 is a homopolymer PP that is the same or different from that used in PP1 and includes a copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction (COF) that is the same or different from that used in PP1.

Examples 23

(PP3/PP2/PP1)—PP1 is a homopolymer PP+ additives to modify the coefficient of friction (COF) as described herein, which may include any slip or block additives such as siloxane. PP2 is a homopolymer PP that is the same or different from that used in PP1 and PP3+ copolymer PP, which may be any propylene ethylene or ethylene-propylene random copolymer, block co-polymer or elastomers. PP3 is a homopolymer PP that is the same or different from that in PP1 and PP2+ and additive to modify the surface coefficient of friction that is the same or different from that used in PP1.

Example 24

(PP3/PP2/PP1) or (PP1/PP2/PP3)—PP1 is a homopolymer PP+ additives to modify the coefficient of friction (COF) as described herein, which may include any slip or block additives such as siloxane. PP2 is a homopolymer PP that is the same or different from that used in PP1 and PP3+ copolymer PP, which may be any propylene ethylene or ethylene-propyleme random copolymer, block co-polymer or elastomers. PP3 is a homopolymer PP that is the same or different from that in PP1 and PP2+ copolymer PP, which may be any propylene ethylene or ethylene-propyleme random copolymer, block co-polymer or elastomers.

The composition of the layers of the comparative products may be as follows:

Comparative—Typical monolayer PP (for example Celgard 2500)
Comparative—Typical laminated trilayer (PP/PE/PP)
Comparative—Typical ceramic coated versions of Typical monolayer PP or of Typical trilayer (PP/PE/PP)

Example 25

A coextruded PP precursor is proposed with the following structure

Homopolymer PP+ additives to modify surface COF
Homopolymer PP+ copolymer PP
Hompolymer PP+ additives to modify surface COF The additives for surface modification can include any slip or antiblock additives such as siloxane. The copolymer can be any propylene-ethylene or ethylene-propylene random copolymer, block copolymer or elastomers.

The coextruded PP precursor can be extruded anywhere between 0.9-1.5 blow-up-ratio (BUR) to control the porosity. The coextruded PP precursor is then either sequentially MD-followed by TD-stretching or biaxially stretched simultaneously. The biaxially stretched film can be calendared further to control the porosity.

Example 26

A second proposed structure can be as the following for a battery separator or textile application:

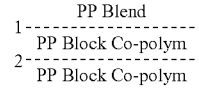

This structure can be designed for a higher tortuosity surface layer for water barrier in high velocity water test.

The types of copolymers that can be incorporated in the structure include but are not limited to propylene-ethylene or ethylene-propylene random copolymer, block copolymer or elastomers.

By extruding PP in the coextrusion format, the surface characteristics of the PP layer can be modified, and at the same time, a lower melting point copolymer resin can be incorporated in the middle layer to decrease the shut-down temperature. A different copolymer resin can also be incorporated anywhere in the structure to control the porosity of the TD-stretched film.

By incorporating a BUR in the precursor film, one can also further control the porosity required for different applications.

Example 27

(PP1/PP2/PP3)(PP1/PP2/PP3)(PP1/PP2/PP3)—PP1 is a Polypropylene blend, PP2 is a PP block co-polymer, and PP3 is the same or a different PP block copolymer.

Examples 28

(PP3/PP2/PP1)/(PP3/PP2/PP1)/(PP3/PP2/PP1)—PP1 is a Polypropylene blend, PP2 is a PP block co-polymer, and PP3 is the same or a different PP block copolymer.

Example 29

(PP3/PP2/PP1)(PP1/PP2/PP3)(PP3/PP2/PP1) PP1 is a Polypropylene blend, PP2 is a PP block co-polymer, and PP3 is the same or a different PP block copolymer.

Example 30

(PP1/PP2/PP3)(PP3/PP2/PP1)(PP1/PP2/PP3) PP1 is a Polypropylene blend, PP2 is a PP block co-polymer, and PP3 is the same or a different PP block copolymer.

Example 31

(PP1/PP2/PP3)(PP3/PP2/PP1)(PP3/PP2/PP1) PP1 is a Polypropylene blend, PP2 is a PP block co-polymer, and PP3 is the same or a different PP block copolymer.

Example 32

(PP3/PP2/PP1)(PP1/PP2/PP3)(PP1/PP2/PP3) PP1 is a Polypropylene blend, PP2 is a PP block co-polymer, and PP3 is the same or a different PP block copolymer.

Example 33

(PP1/PP2/PP3)(PP1/PP2/PP3)(PP1/PP2/PP3)—PP1 is a homopolymer PP+ additives to modify the coefficient of friction as described herein, which may include any slip or block additives such as siloxane. PP2 is a homopolymer PP that is the same or different from that used in PP1 and PP3+ copolymer PP, which may be any propylene ethylene or ethylene-propyleme random copolymer, block co-polymer or elastomers. PP3 is a homopolymer PP that is the same or different from that in PP1 and PP2+ and additive to modify the surface coefficient of friction that is the same or different from that used in PP1.

Examples 34

(PP3/PP2/PP1)/(PP3/PP2/PP1)/(PP3/PP2/PP1)—PP1 is a homopolymer PP+ additives to modify the coefficient of friction as described herein, which may include any slip or block additives such as siloxane. PP2 is a homopolymer PP that is the same or different from that used in PP1 and PP3+ copolymer PP, which may be any propylene ethylene or ethylene-propyleme random copolymer, block co-polymer or elastomers. PP3 is a homopolymer PP that is the same or different from that in PP1 and PP2+ and additive to modify the surface coefficient of friction that is the same or different from that used in PP1.

Example 35

(PP3/PP2/PP1)(PP1/PP2/PP3)(PP3/PP2/PP1) PP1 is a homopolymer PP+ additives to modify the coefficient of friction as described herein, which may include any slip or block additives such as siloxane. PP2 is a homopolymer PP that is the same or different from that used in PP1 and PP3+ copolymer PP, which may be any propylene ethylene or ethylene-propyleme random copolymer, block co-polymer or elastomers. PP3 is a homopolymer PP that is the same or different from that in PP1 and PP2+ and additive to modify the surface coefficient of friction that is the same or different from that used in PP1.

Example 36

(PP1/PP2/PP3)(PP3/PP2/PP1)(PP1/PP2/PP3) PP1 is a homopolymer PP+ additives to modify the coefficient of friction as described herein, which may include any slip or block additives such as siloxane. PP2 is a homopolymer PP that is the same or different from that used in PP1 and PP3+ copolymer PP, which may be any propylene ethylene or ethylene-propyleme random copolymer, block co-polymer or elastomers. PP3 is a homopolymer PP that is the same or different from that in PP1 and PP2+ and additive to modify the surface coefficient of friction that is the same or different from that used in PP1.

Example 37

(PP1/PP2/PP3)(PP3/PP2/PP1)(PP3/PP2/PP1) PP1 is a homopolymer PP+ additives to modify the coefficient of friction as described herein, which may include any slip or block additives such as siloxane. PP2 is a homopolymer PP that is the same or different from that used in PP1 and PP3+ copolymer PP, which may be any propylene ethylene or ethylene-propyleme random copolymer, block co-polymer or elastomers. PP3 is a homopolymer PP that is the same or different from that in PP1 and PP2+ and additive to modify the surface coefficient of friction that is the same or different from that used in PP1.

Example 38

(PP3/PP2/PP1)(PP1/PP2/PP3)(PP1/PP2/PP3) PP1 is a homopolymer PP+ additives to modify the coefficient of friction as described herein, which may include any slip or block additives such as siloxane. PP2 is a homopolymer PP that is the same or different from that used in PP1 and PP3+ copolymer PP, which may be any propylene ethylene or ethylene-propyleme random copolymer, block co-polymer or elastomers. PP3 is a homopolymer PP that is the same or different from that in PP1 and PP2+ and additive to modify the surface coefficient of friction that is the same or different from that used in PP1.

The composition of the layers of certain comparative products were prepared as follows:

Comparative Example 1 (COM EX 1)

(PP)(PE)(PP)—all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and and 5% mLLDPE.

Comparative Example 2 (COM EX 2)

(PP)(PE)(PP)—all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and and 5% mLLDPE.

Comparative Example 3 (COM EX 3)

(PP)(PE)(PP)—all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and and 5% mLLDPE.

Comparative Example 4 (COM EX 4)

(PP)(PE)(PP)—all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and and 5% mLLDPE.

Comparative Example 5 (COM EX 5)

(PP)(PE)(PP)—all PP layers are made of a homopolymer PP, density=0.90 g/cm$^3$, MFR in the range of 0.5 MFR-2 MFR. All PE layer is made of a blend of 95% high density polyethylene with melt index between 0.25-0.5 g/10 min at 2.16 kg and 190 deg C., and density range between 0.955-0.966 g/cm$^3$ and and 5% mLLDPE.

Characterization of Examples—Properties Related to Separator and Battery Performance Thickness (μm)

Thickness is measured in micrometers, μm, using the Emveco Microgage 210-A micrometer thickness tester and test procedure ASTM D374. The Thickness of Examples 1-6 and Comparative Examples 1-4 were determined and are reported in the table in FIGS. 22 and 23. Comparative Examples with corresponding thicknesses to the Examples were prepared so that the separators could be compared meaningfully.

Basis Weight (mg/cm$^2$)

The basis weight of Examples 1-6 and Comparative Examples 1-4 were determined and are reported in the table in FIG. 22.

JIS Gurley (s/100 cc)

Gurley is defined herein as the Japanese Industrial Standard (JIS Gurley) and is measured herein using the OHKEN permeability tester. JIS Gurley is defined as the time in seconds required for 100 cc of air to pass through one square inch of film at a constant pressure of 4.9 inches of water. The JIS Gurley of Examples 1-6 and comparative Examples 1-4 were measured and are reported in the table in FIG. 22.

% MD Shrinkage 105° C./1 hr

Shrinkage is measured by placing a test sample between two sheets of paper which is then clipped together to hold the sample between the papers and suspended in an oven. For the '105° C. for 1 hour' testing, a sample is placed in an oven at 105° C. for 1 hour. After the designated heating time in the oven, each sample was removed and taped to a flat counter surface using double side sticky tape to flatten and smooth out the sample for accurate length and width measurement. Shrinkage is measured in the both the Machine direction (MD) and Transverse direction (TD) direction and is expressed as a % MD shrinkage and % TD shrinkage.

MD shrinkage of Examples 1-6 and Comparative Examples 1-4 were measured and are reported in the table in FIG. 22.

MD Tensile Strength (Kgf/Cm$^2$)

Machine Direction (MD) tensile strength is measured using Instron Model 4201 according to ASTM-882 procedure. MD tensile strength of Examples 1-6 and Comparative Examples 1-4 were measured and are reported in the table in FIG. 22.

MD Elongation (%)

% MD elongation at break is the percentage of extension of a test sample along the machine direction of the test sample measured at the maximum tensile strength needed to break a sample. MD elongation of Examples 1-6 and Comparative Examples 1-4 were measured an are reported in the table in FIG. 22.

TD Tensile Strength (kgf/cm$^2$)

Transverse Direction (TD) tensile strength is measured using Instron Model 4201 according to ASTM-882 procedure. TD tensile strength of Examples 1-6 and Comparative Examples 1-4 were measured and are reported in the table in FIG. 22.

TD Elongation (%)

% TD elongation at break is the percentage of extension of a test sample along the transverse direction of the test sample measured at the maximum tensile strength needed to break a sample. TD elongation of Examples 1-6 and Comparative Examples 1-4 were measured and are reported in the table in FIG. 22.

Puncture Strength (gf)

Puncture Strength is measured using Instron Model 4442 based on ASTM D3763. The measurements are made across the width of the microporous membrane and the puncture strength defined as the force required to puncture the test sample. Puncture strength of Examples 1-6 and Comparative Examples 1-4 were measured and are reported in the table in FIG. 22.

One thought has been to use UHMW polymers to increase puncture strength. However, use of these polymers that may have molecular weights greater than 1 million causes processing difficulties, especially when the process is a dry process like the CELGARD® dry process. By leveraging these techniques it may alleviate the need to use polymers with molecular weights greater than 1M whose processing can be very difficult, especially in dry process membranes.

DB Average (V)

Voltage is applied to a separator membrane until the dielectric breakdown of the sample is observed. Strong separators show high DB. Any non-uniformity in the separator membrane leads to lower DB values. When used in a battery, a battery separator with a higher average DB, and particularly a higher minimum DB value, will make the battery safer. The average DB of Examples 1-6 and Comparative Examples 1-4 were measured and are reported in the table in FIG. 22.

DB Minimum (V)

Voltage is applied to a separator membrane until the dielectric breakdown of the sample is observed. Strong separators show high DB. Any non-uniformity in the separator membrane leads to lower DB values. When used in a battery, a battery separator with a higher average DB, and particularly a higher minimum DB value, will make the battery safer. Minimum DB for Examples 1-6 and Comparative Examples 1-4 was measured and is reported in the table in FIG. 22.

DB Uniformity

Figure 18:
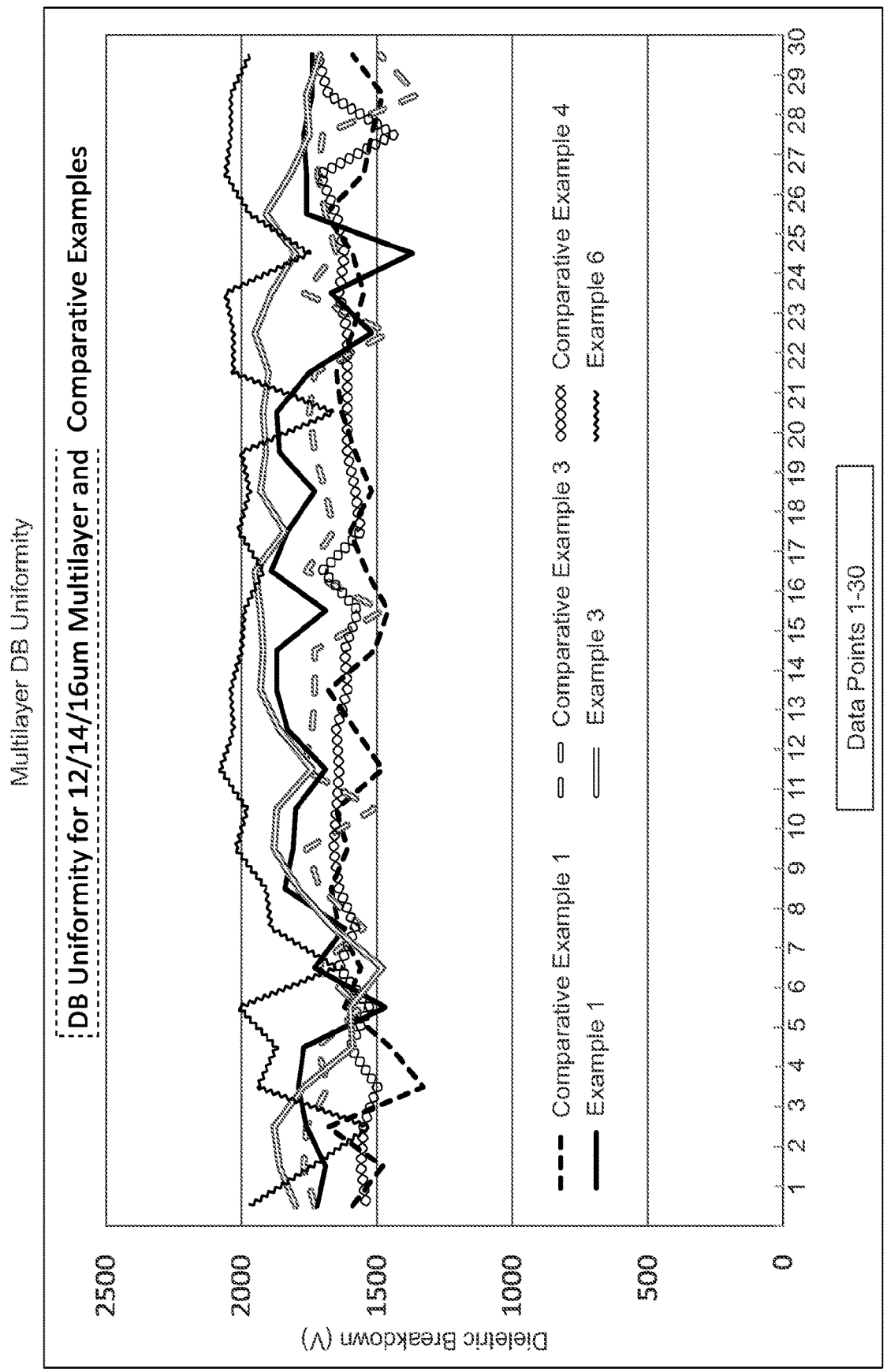
FIG. 18 shows improved DB uniformity data on several examples of Multilayer products (EX 1, EX 3, EX 6) as compared to other more conventional trilayer products.

DB values of Examples 1, 4, and 5, were compared to Comparative Examples 1, 2, and 4. The results for are shown in FIG. 18. DB std. deviation was calculated and is reported Mixed Penetration Average (N)

Mixed Penetration is the force required to create a short through a separator when placed between cathode and anode materials. This test is used to indicate the tendency of a separator to allow short circuits during the battery assembly. Details of this method are described in US 2010/209758, which is incorporated herein in its entirety. Mixed penetration values for Examples 1-6 and Comparative Examples 1-4 were calculated and are reported in the table in FIG. 22.

Nail Penetration Test

Examples 1-9 and Comparative Examples 1-5 were tested, and Examples 1 and 6 passed the nail penetration test. None of the Comparative Examples passed the nail penetration test. The nail penetration test is described in U.S. Pat. No. 9,065,152, which is incorporated herein by reference in its entirety, at a speed of 1 cm/second and at a speed of 10 cm/second.

Shutdown Temp (° C.)

The onset temperature for shutdown is recorded at the resistance reading of 100 W×cm$^2$ and is reported in ° C. Shutdown Temperature for Examples 1-6 and Comparative Examples 1-4 were measured and are reported in the table in FIG. 22.

Shutdown Speed (ohm-cm$^2$)

The Example film is sandwiched between two nickel disks and wetted with PC solvent. The wet separator stack is then subjected to a temperature ramp of 60° C./min. For the duration of the test, the resistance between the two nickel disks is monitored by a multimeter. The definition for shutdown for this test is that the resistance should increase by two orders of magnitude from 100 W×cm$^2$ to 10,000 W×cm$^2$, and it is normalized by the time required for that resistance rise. The result for shutdown speed is reported in units of W×cm$^2$/sec. Shutdown Speed for Examples 1-6 and Comparative Examples 1-4 were measured and are reported in the table in FIG. 22.

ER (ohm-cm$^2$)

The ER method uses a electrolyte solution composed of a solvent mixture of DI water and 2-propanol. The electrical resistance is evaluated by consecutively adding 4 circular separator discs (38-mm diameter) between two metal electrodes. The resistance value of the separator is measured in ohms using a LCR meter then it is multiplied by the area of the electrodes to get ohm-cm2. The electrolyte resistivity is measured using a YSI meter.

Calculations:
1) Average separator resistance of consecutive separator layers, $(\Omega)=(R_{layer4}\Omega-R_{layer3}\Omega+R_{layer3}\Omega-R_{layer2}\Omega/2$
2) Electrical Resistance, $\Omega$-cm2=average resistance of consecutive separator layers, $\Omega$*area of nickel-plated electrodes, cm2

QC-ER for Examples 1-6 and Comparative Examples 1-4 were determined and are reported in the table in FIG. 23.

MacMullin Number

The Electrical Resistance (ER) measurement is used to calculate the MacMullen number. The calculation is as follows: McMullen Number=(Electrical Resistance, $\Omega$-cm$^2$/Separator thickness, cm)/Electrolyte Resistivity (ohm-cm).

Macmullin numbers for Examples 1-6 and Comparative Examples 1-4 were determined and are reported in the table in FIG. 23.

Cycle Life

All cycling was done in constant current (CC) mode. Cathode used is 523 NMC. Anode used is superior graphite. Electrolyte used 1 M LiPF$_6$ salt in 3:7 v:v EC:EMC solvent. Voltage window is 3.0-4.3 V. Cycles 1-5 have charge rate and discharge rate of C/10. Cycles 6-10 have a charge rate and discharge rate of C/5. Cycles 11-15 have a charge rate of C/5 and a discharge rate of C/2. Cycles 16-20 have a charge rate of C/5 and a discharge rate of 1 C (charge/discharge rate capacity; 1 C is a rate of full charge or discharge in 60 minutes). Cycles 21-25 have a charge rate of C/5 and a discharge rate of 5 C. Cycles 26-30 have a charge rate of C/5 and a discharge rate of 10 C. Cycles 31-35 have a charge rate and discharge rate of C/10.

Figure 19:
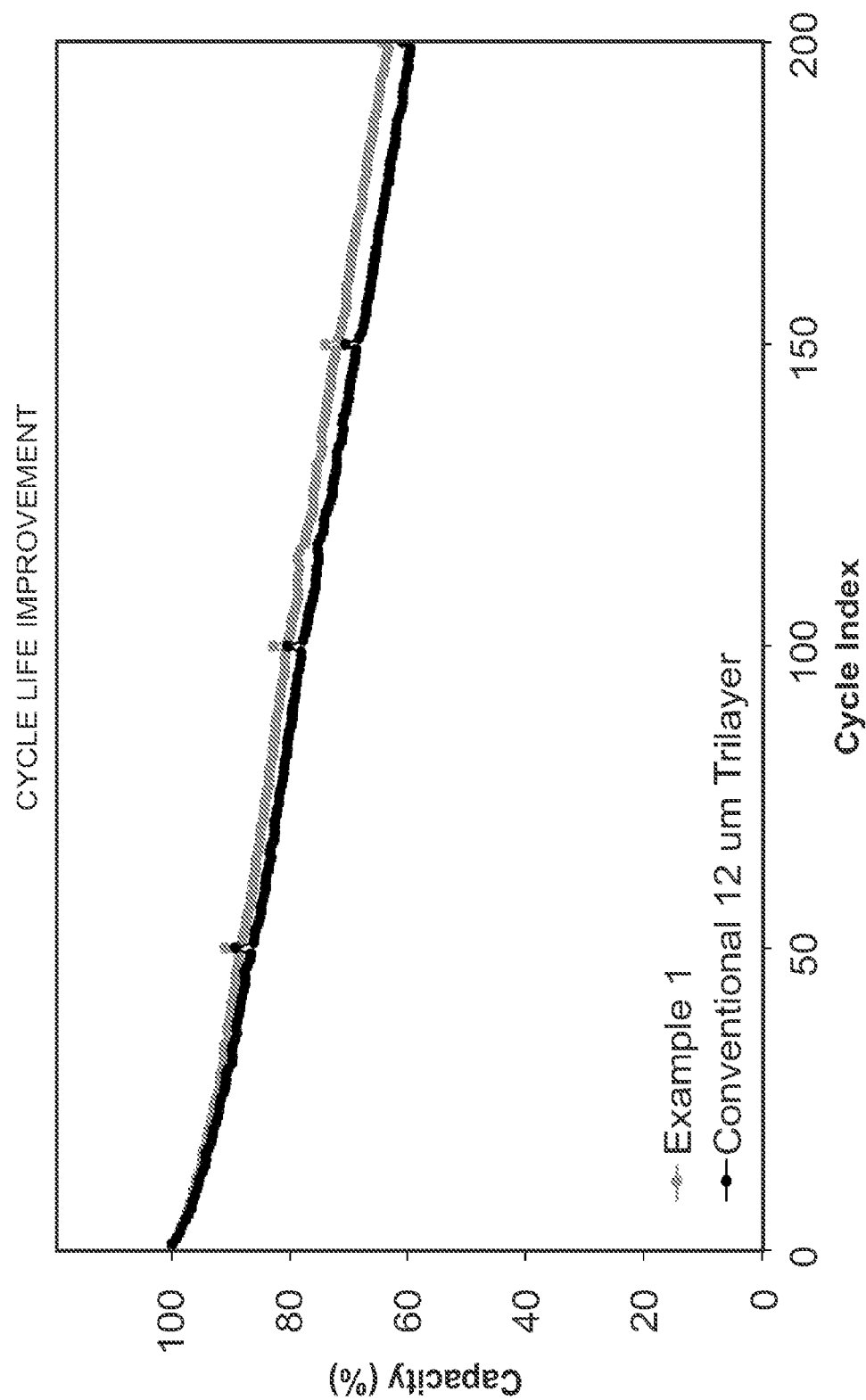
FIG. 19 is a graph demonstrating the improved cycling behavior of an exemplary inventive construction (EX 1) as compared to a conventional 12 um trilayer product. The comparison film shown here is 12 um trilayer (PP/PE/PP)(no microlayers). This was done at a C-rate of C/3 with 4.3 V cutoff in a 523 NCM vs. Graphite system. The data shown represent an average of 5 cells for each sample (or a total of 10 cells). Perhaps due to improved electrolyte uptake due to increased interfaces and complexity of pore structure, we can see a repeatable improvement in cycle life for EX 1 over the conventional trilayer.
Figure 20:
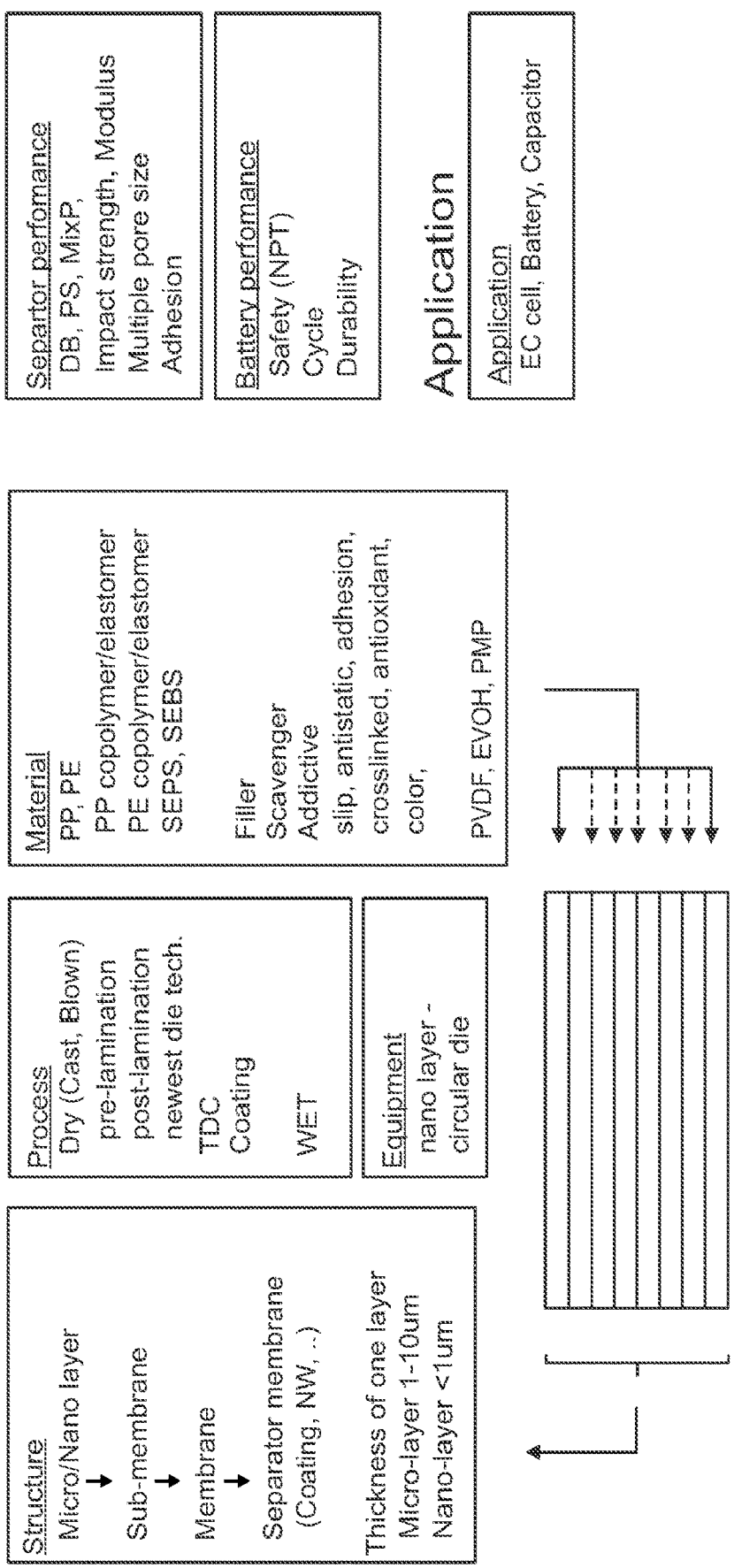
FIG. 20 lists many non-limiting exemplary embodiments, features, advantages, or structures of the inventive Multilayer products and concepts.
Figure 21:
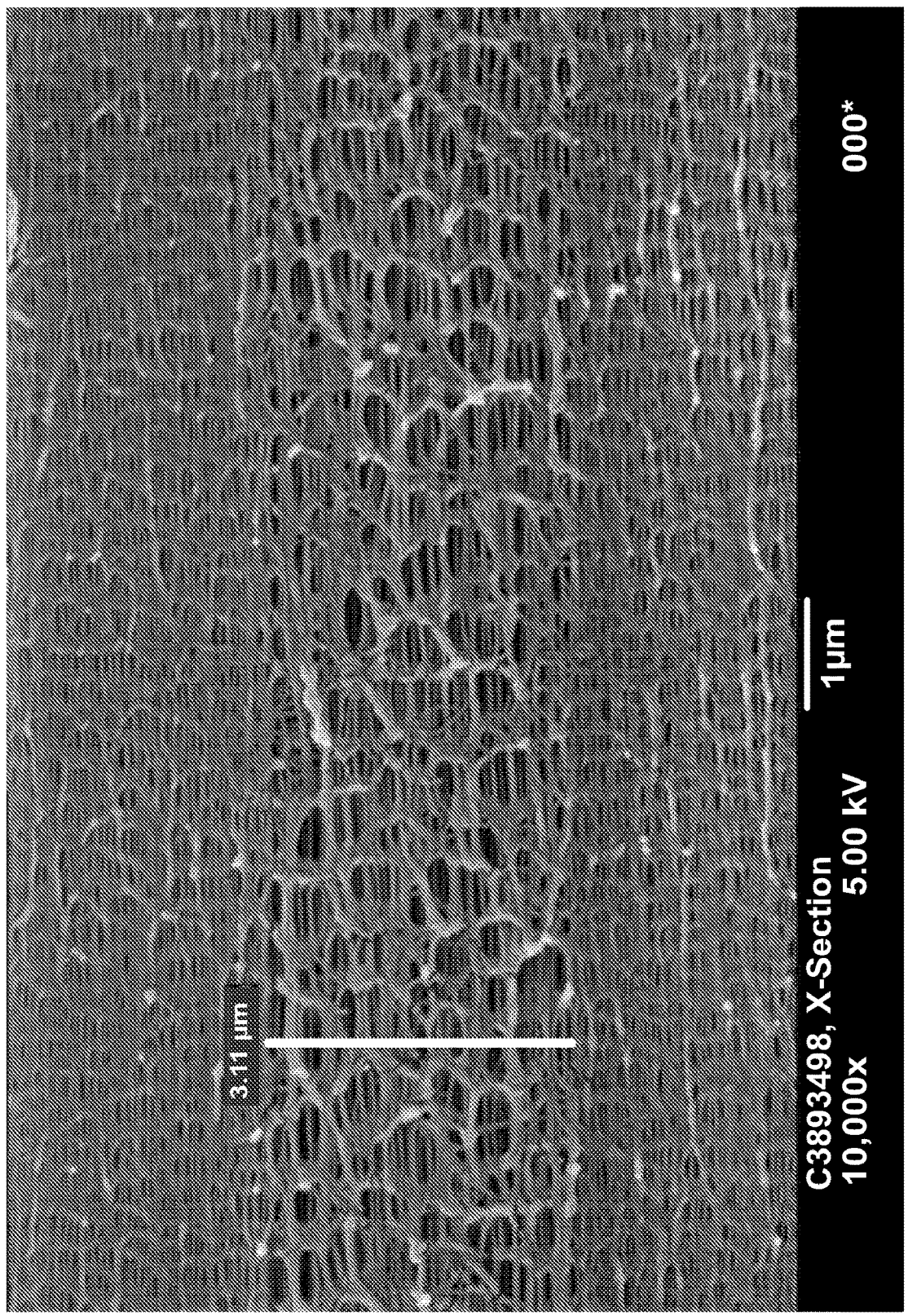

Cycle life for Example 1 and Comparative Example 1 were compared. This was done at a C-rate of C/3 with 4.3 V cutoff in a 523 NCM vs. Graphite system. The data shown represent an average of 5 cells for each sample (or a total of 10 cells). The results are shown in FIG. 19. Without wishing to be bound by any particular theory, it is believed that this is perhaps due to improved electrolyte uptake due to increased interfaces, e.g., the lamination interfaces and complexity of pore structure. A repeatable improvement in cycle life for multilayer products compared to conventional trilayer is shown by this test.

Compression Elasticity

Figure 5:
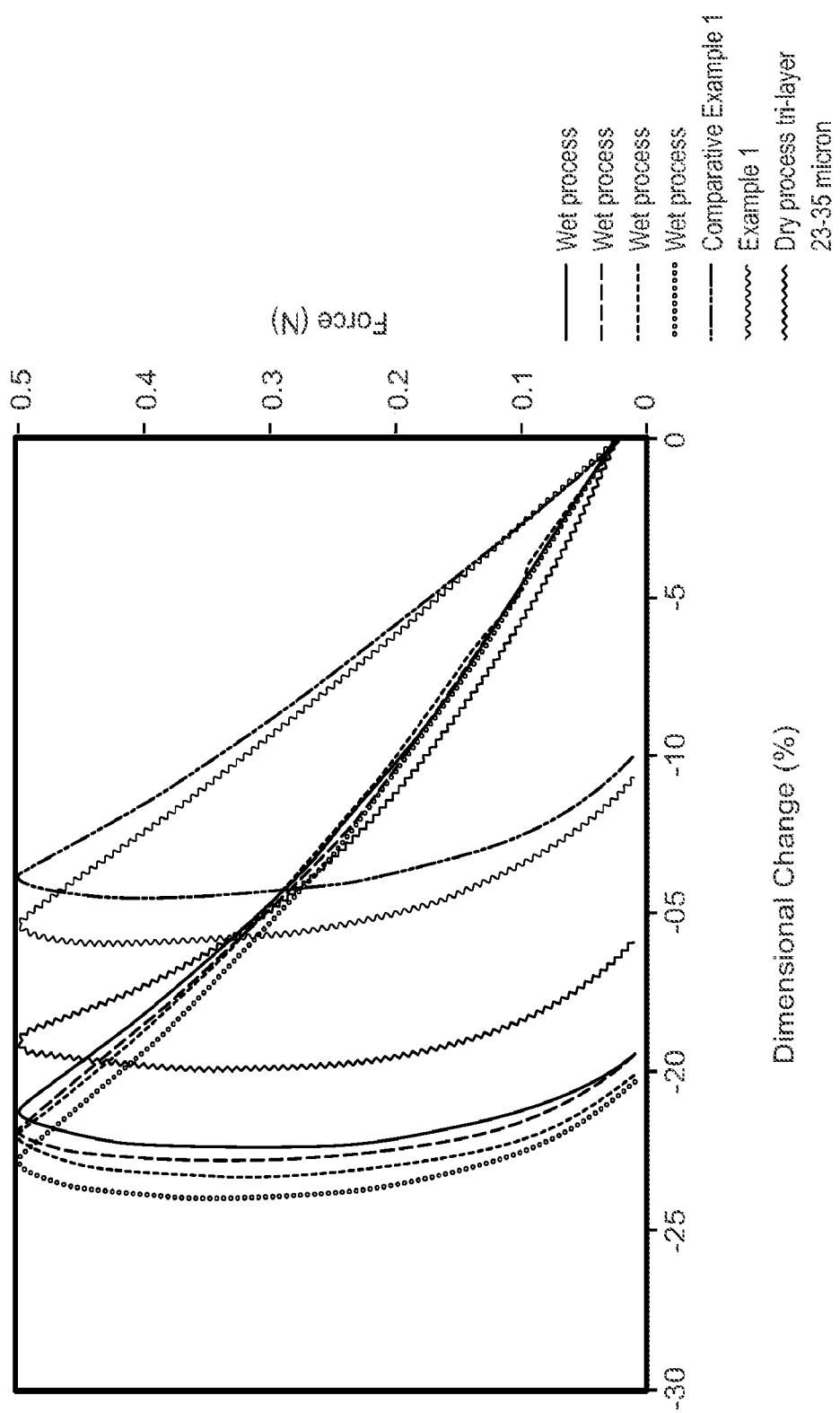
FIG. 5 is a graph demonstrating compression elasticity results of certain constructions as compared to COM EX 1.
Figure 6:
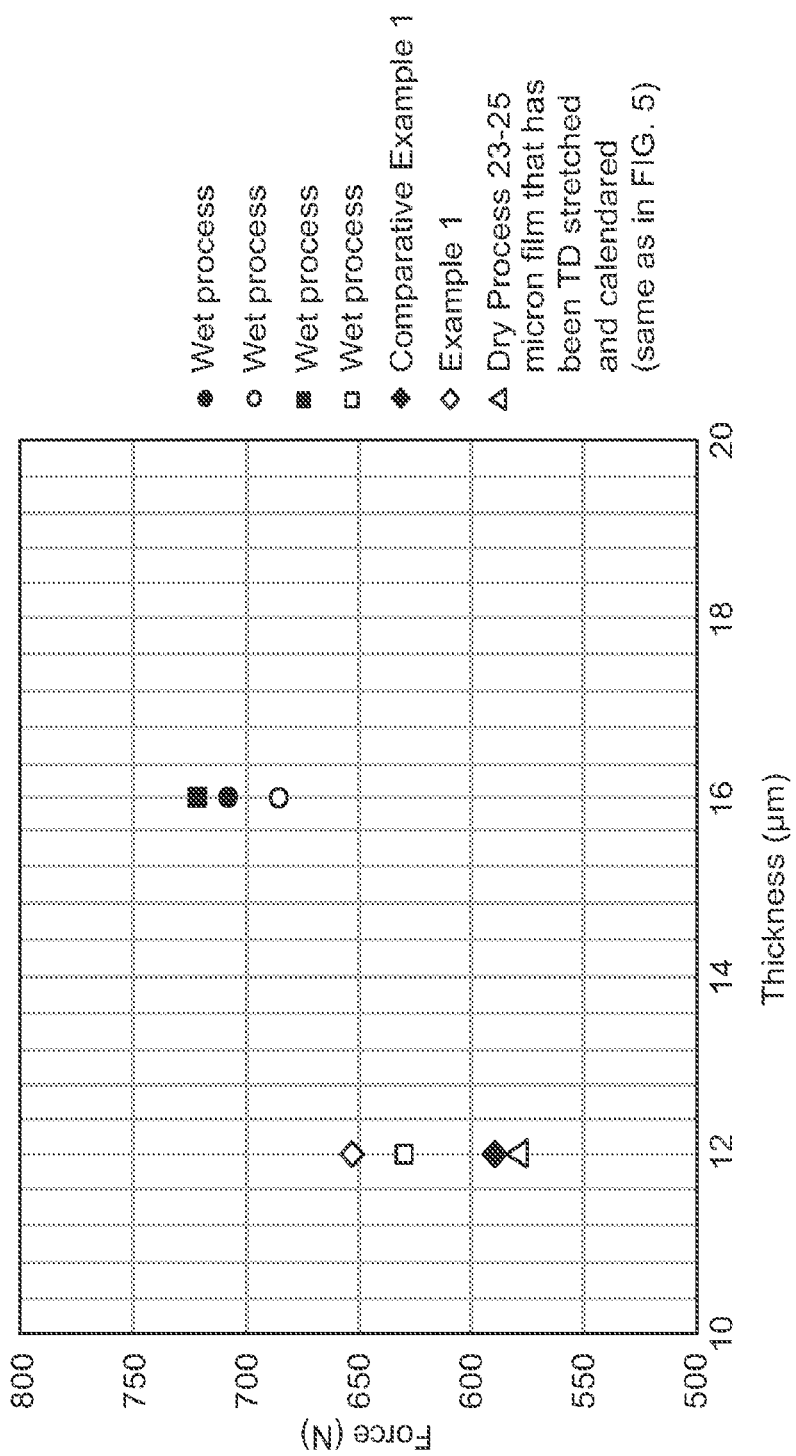
FIG. 6 is a graph demonstrating Mix P penetration test results of certain constructions as compared to COM EX 1.

Compression elasticity modulus was evaluated using the TMA Q400 and a hemi-sphere probe. A 5 mm×5 mm sample is compressed at a constant rate up to 1 N (568 N/cm2), then the pressure is released at a constant rate back down to 0 N at ambient temperature. Percentage of dimension change during compression and recovery are estimated based on the initial thickness of the sample. Compression Elasticity for Example 1 and Comparative Example 1 were tested and the results are reported in FIG. 5 and Table 1 below

TABLE 1

| Sample | COM EX 1 | EX 1 |
|---|---|---|
| Thickness (μm) | 12 | 12 |
| Mix-P (N) | 588 | 653 |
| Compression Recovery (%) | 3.81 | 4.47 |
| Max Compression (%) | 13.82 | 15.20 |
| Final Compression (%) | 10.01 | 10.73 |

The microlayer construction provides greater compression recovery than the comparable wet process membrane. In certain applications, less crush and/or better compression recovery may be desired Pin Removal Pin removal data in the attachment was collected with a pin removal winding machine. The machine is loaded with a 45-mm slit roll and the separator roll is threaded onto the machine into a split pin mandrel (4-mm diameter). The separator is wound over the mandrel and the pins are pulled apart. The maximum force of removal is recorded and reported in Newtons. For each test sample, the outer diameter is held constant, tension and length of the film wound will change based on film thickness. It is best to compare films of the same or substantially the same thickness.

Characterization of Examples—Structural Properties

AQ Porosity (%)

The porosity of a microporous film sample is measured using ASTM method D-2873 and is defined as the percentage void spaces in a microporous membrane measured in both Machine Direction (MD) and Transverse Direction (TD). AQ porosity for Examples 1-6 and Comparative Examples 1-4 were calculated and are reported in the table in FIG. 22. Some additional porosity data for Example 1 were determined and are reported in Table 2 below:

TABLE 2

| Product Number | Stretch Lot # | Ply No. | PP Pore Size (μm) | PE Pore Size (μm) | Porosity (%) | Surface Area (m²/g) |
|---|---|---|---|---|---|---|
| EX 1 | C3435497 | 2 | 0.0402 | 0.0533 | 39.98 | 76.84 |
|  | C3435497 | 5 | 0.0415 | 0.0552 | 40.18 | 74.33 |
|  | C3435498 | 2 | 0.0390 | 0.0514 | 38.80 | 74.65 |
|  | C3435498 | 5 | 0.0399 | 0.0521 | 39.03 | 73.78 |
|  | C3435499 | 2 | 0.0378 | 0.0507 | 38.93 | 76.37 |
|  | C3435499 | 5 | 0.0376 | 0.0515 | 39.11 | 77.33 |

Aquapore Porosity (%)

Aquapore (AQ) porosity for Examples 1-6 and Comparative Examples 1-4 was measured and are reported in the table in FIG. 23.

AQ PP Pore Size (μm)

Pore size is measured using the Aquapore available through Porous Materials, Inc. (PMI). Pore size is expressed in μm. AQ PP Pore Size for Examples 1-6 and Comparative Examples 1-4 were calculated and are reported in the table in FIG. 22. Additional data for Examples 1, 9, and 10 were determined and are reported in Table 2.

AQ PE Pore Size (μm)

Pore size is measured using the Aquapore available through Porous Materials, Inc. (PMI). Pore size is expressed in μm. AQ PE Pore Size for Examples 1-6 and Comparative Examples 1-4 were determined and are reported in the table in FIG. 22. Additional data for Examples 1, 9, and 10 were determined and are reported in Table 2.

AQ Surface Area (m²/g)

Aquapore is a water intrusion measurement technique, and is only available for testing base film. In this measurement, a large area of film is immersed in water and pressurized to 3,000 psi. The result for aquapore testing is the overall porosity of the film (reported in %), the pore size of PP and/or PE (reported in μm), and the surface area of the interior and exterior of the pores (reported in m²/g). Sample mass must be ≥3 g for each aquapore measurement. AQ surface area for Examples 1-6 and Comparative Examples 1-4 were determined and are reported in the table in FIG. 22. Additional data for Examples 1, 9, and 10 were determined and are reported in Table 2.

Figure 33:
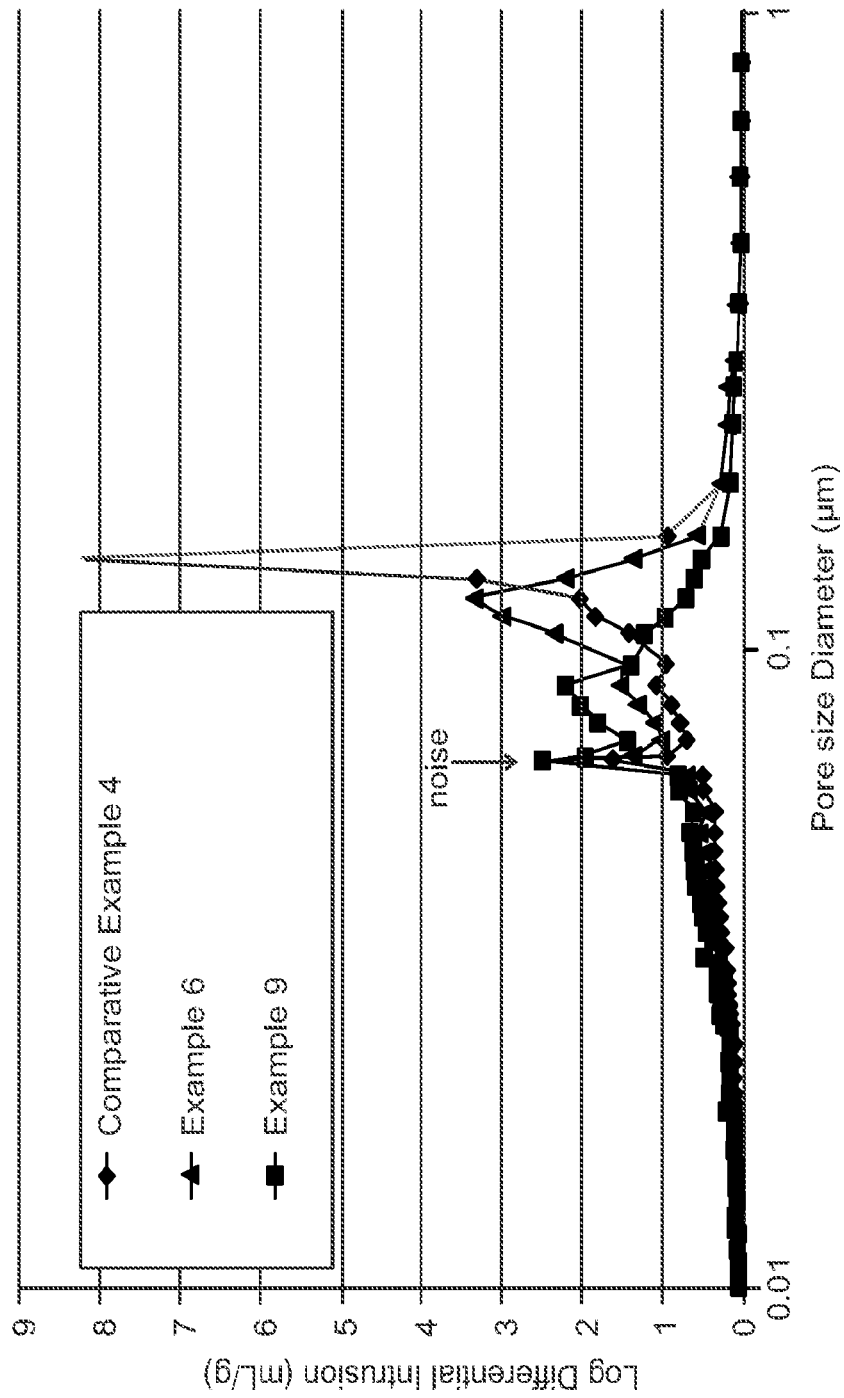
FIG. 33 is a graph showing quantitative evaluation of pore diameter distribution (using mercury intrusion porosimetry) for multilayer and tri-layer products described herein.
Figure 35:
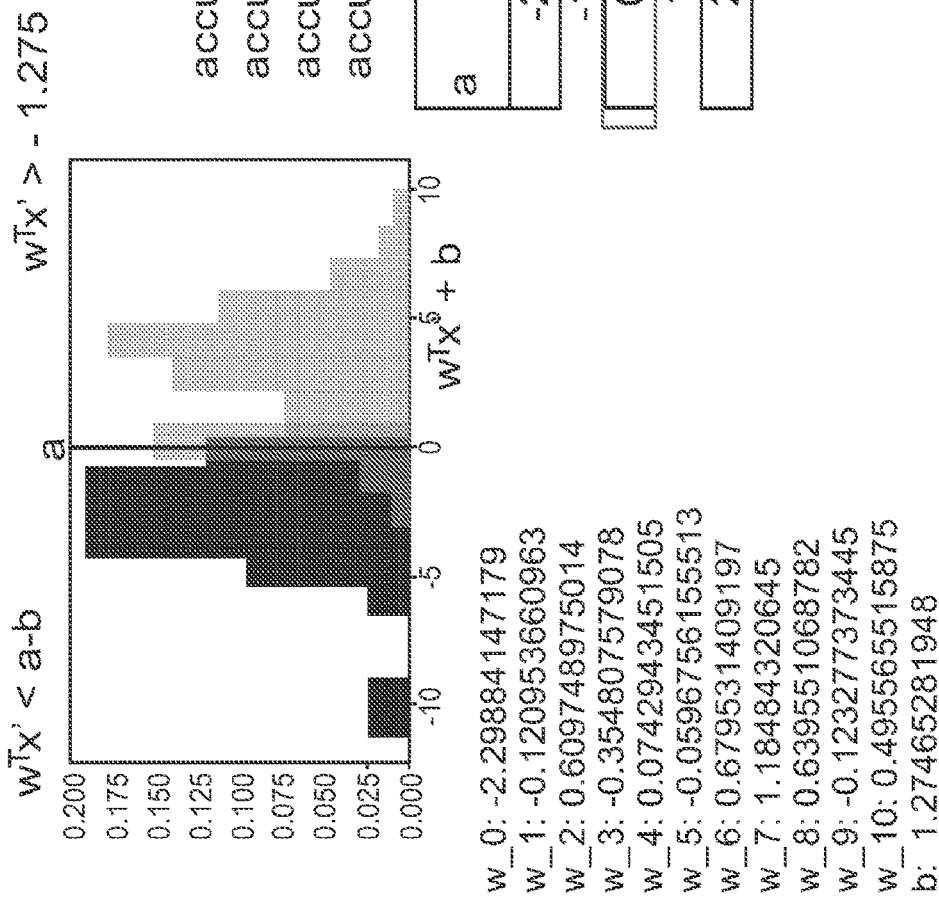
FIG. 35 shows coefficient and boundary parameters (PP) according to the Machine Learning Test described herein.
Figure 37:
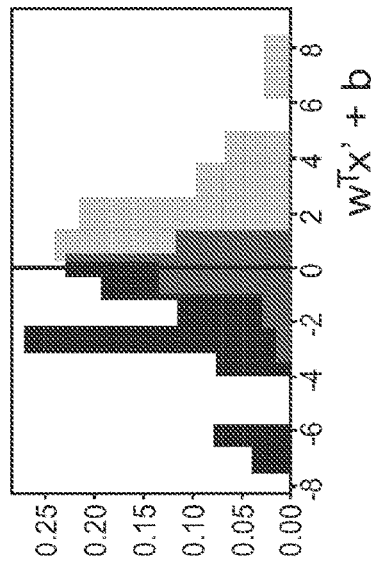
FIG. 37. shows coefficient and boundary parameters (PE) according to the Machine Learning Test described herein.
Figure 39:
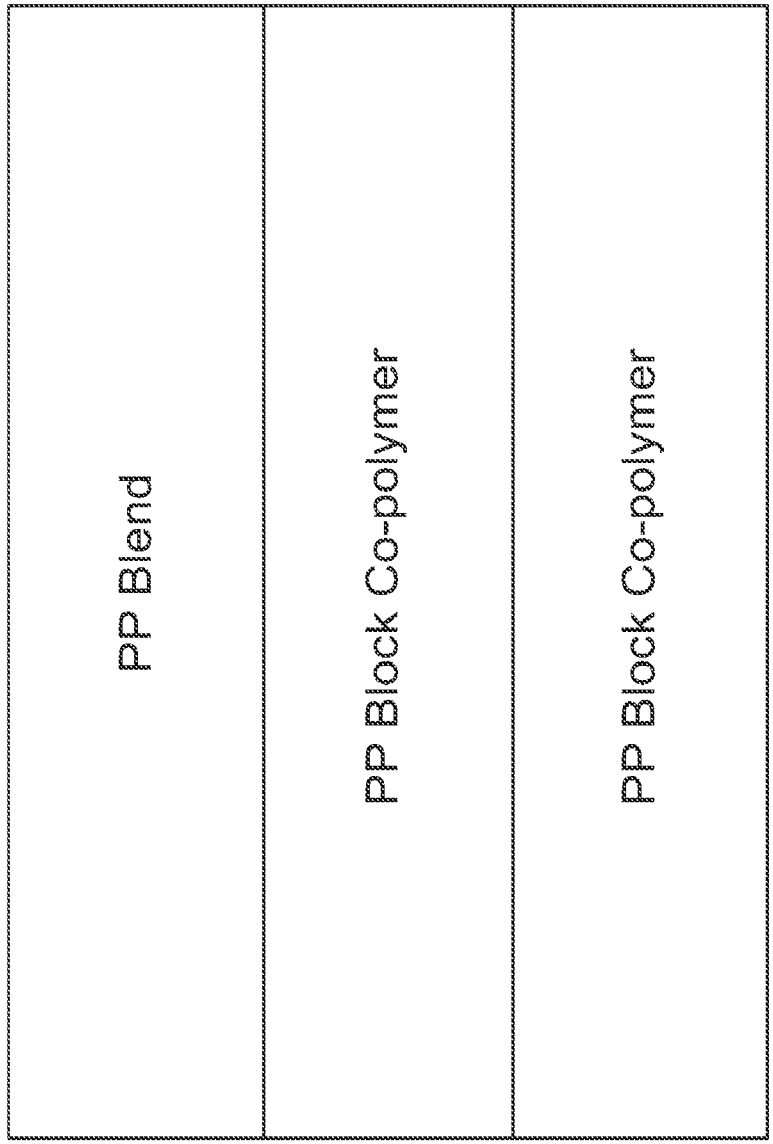

Pore Diameter Distribution Pore diameter distribution of Examples 6 and 11 and Comparative Example 4 were measured using mercury intrusion porosimetry. Results are shown in FIG. 33. Pore diameter in the Comparative Example 4 was larger and had a narrower distribution than in the Inventive Examples.

Calculated Tortuosity.

Tortuosity was calculated by the following Formula (1):

$$N_m = T^2/P \quad (1),$$

where $N_m$ is the MacMullin Number, T is the tortuosity, and P is the porosity. Without wishing to be bound by any particular theory, it is believed that a battery separator with higher tortuosity will be safer. The reason for this is believed to be that, due to the more tortuous path a growing dendrite will have to follow to go from the anode to the cathode, it will be more difficult for a dendrite to grow between the electrodes. Calculated tortuosity for Examples 1-6 and Comparative Examples 1-4 are provided in the table in FIG. 23.

SEM Images

1. Preprocessing Conditions

Procedure for cross-sectional observation by Scanning Electron Microscope (SEM).

a.) Cut samples to the proper size (several mm square).

b.) ion milling processing to produce a flat cross-section (MD-ND plane).

Ion milling instrument: E-3500 (Hitachi High-Technologies Corporation.)

Ion source: Ar+ accelerating voltage: 3.5 kV discharge voltage: 2.0 kV stage control: 5 (Setting value)

processing time: 4 h temperature: 20-25° C.

c.) Mount the samples on stubs with double sided carbon conductive tapes and carbon paste.

d.) Osmium plasma coating is applied to give conductivity to samples.

2. SEM observation conditions a.) Instrument: S-4800 (Hitachi High-Technologies Corporation.)

accelerating voltage: 1 kV working distance: about 5 mm

SEM images were taken of Examples 1, 2, 4, and 6 and of Comparative Examples 1, 4, and 5. Some of these images are shown in FIGS. 24-30. It was noticed that distinct structural differences existed between the multilayer products in the Examples and the tri-layer products of the Comparative Examples. For example, the PP layers of the tri-layer products comprised more columnar or vertically continuous amorphous regions, whereas the amorphous regions of the PP regions (having three layers of PP in the Examples) of the multilayer were mostly discontinuous and non-columnar. Side-by-side comparisons in FIGS. 28-30 show these differences between the multilayer and tri-layer products.

Machine Learning Test

Detailed Procedure

1: Image feature extraction to obtain vectors for machine learning read image with OpenCV python module cv2 obtain 50 240×160 pixels^2 partial images at uniformly random positions from the entire PP or PE region and normalize the images by using cv2.normalize with alpha=0, beta=255 and norm_type=cv2.NORM_MINMAX.

for each partial images, use SIFT feature detector cv2.xfeatures2d.SIFT_create with default settings to obtain features having angles and sizes transform each angle a of obtained features into a'=90−|a mod 180-90| count the number of transformed angles a' in the range [10*(i−1), 10*i] for i from 1 to 9, called bincounts concatenate 9 bincounts, average feature sizes (scalar) and the number of features (scalar) to be its feature vector $x_k$(11 dimensions) (k-th image)

take median of 11 features from 50 partial images to be the feature vector x of the input image.

Books on OpenCV python module cv2 include Python Machine Learning by Sebastian Raschka (ISBN 1783555130) and OpenCV with Python Blueprints by Michael Beyeler (1785282697). Both of these books are incorporated herein by reference in their entirety. More information on OpenCV is found at https://en.wikipedia.org/wiki/OpenCV.

Example for PP layer:
obtain feature vector x from PP layer with the procedure 1 described before standardize each value x in x as x'=(x−m)/s using the following mean vector m=[0.121252742025, 0.0932702969461, 0.0637613832138, 0.0471628522627, 0.0410994787666, 0.0455612990903, 0.0663893557564, 0.143913936237, 0.373695714612, 3.470413863, 569.830508475] and standard deviation vector s=[0.0177890460233, 0.0126226741459, 0.0109280746046, 0.00952236047605, 0.00919810029221, 0.00802167410741, 0.00965575771023, 0.0135729399588, 0.0556357096109, 0.181326979354, 52.6681415756]

let w be [−2.29884147179, −0.120953660963, 0.609748975014, −0.354807579078, 0.0742943451505, −0.0596756155513, 0.679531409197, 1.18484320645, 0.639551068782, −0.123277373445, 0.495565514875], and compute the inner product $w^T x'$ if $w^T x' > -1.27465281948$, then the image would be classified as 9-layer.

Example for PE Layer:
obtain feature vector x from PE layer with the procedure 1 described before standardize each value x in x as x'=(x−m)/s using the following mean vector m=[0.0753659021681, 0.0647442404474, 0.052445934828, 0.0441842705626, 0.0424971059836, 0.0495261454071, 0.0745156791392, 0.15315494777, 0.434028151238, 3.51412063686, 480.02173913] and standard deviation vector s=[0.0212709138539, 0.0156303526361, 0.0100887199823, 0.00610554172426, 0.00588628646619, 0.00509466227247, 0.00868424601387, 0.0177249443105, 0.0499726205047, 0.217925555283, 60.5317430669]

let w be [0.0026717153, −0.2072501509, −0.4883326802, 0.0172248418, −0.5467527574, −0.3892225728, 0.7356477088, 1.1574408691, −1.1992044378, −1.920101147, 0.1068808983, 0.6542173447], and compute the inner product $w^T x'$ if $w^T x' > -0.6542173447$, then the image would be classified as 9-layer. Examples 1, 2, 4, 7, 8, and 10 and Comparative Examples 1, 4, and 5 were subjected to the Machine Learning Test to see if the Comparative (tri-layer) and Inventive (multilayer) Examples could be distinguished by this test, and the results are in FIGS. 34 to 37. The Comparative (tri-layer) and Inventive (multilayer) Examples could be distinguished.

DSC

The DSC analysis is conducted to determine the melting temperature ($T_m$) and the onset of crystallinity. A Netzsch DSC 200 F3 model is used with a sealed aluminum sample holder with perforated lid. Nitrogen is used as the carrier gas at 40 ml/min to prevent sample oxidation. The mass of the analyzed samples varies from 5 to 6 mg. In order to determine $T_m$ and the onset of crystallinity the samples are initially subjected to thermal treatment to erase the thermal history. Next the instrument performs another heating and cooling cycle starting from 25° C. up to 300° C. at 10° C./min. Data acquisition and handling is made with Proteus Analysis software. Examples 1, 3, 5, and 6 and Comparative Examples 1, 2, 3, and 4 were evaluated by DSC. The PE layers and PP layers were evaluated separately. The results are shown in FIGS. 31 and 32.

In accordance with at least selected embodiments, the application, disclosure or invention relates to novel or improved membranes, separator membranes, separators, battery separators, secondary lithium battery separators, multilayer membranes, multilayer separator membranes, multilayer separators, multilayer battery separators, multilayer secondary lithium battery separators, and/or multilayer battery separators with improved properties, novel or improved batteries, capacitors, fuel cells, lithium batteries, lithium ion batteries, secondary lithium batteries, and/or secondary lithium ion batteries, and/or methods for making and/or using such membranes, separator membranes, separators, battery separators, secondary lithium battery separators, batteries, capacitors, fuel cells, lithium batteries, lithium ion batteries, secondary lithium batteries, and/or secondary lithium ion batteries, and/or devices, vehicles or products including the same. In accordance with at least certain embodiments, the disclosure or invention relates to novel or improved membrane layers, membranes or separator membranes, battery separators including such membranes, and/or related methods. In accordance with at least certain selected embodiments, the disclosure or invention relates to novel or improved porous polymer membranes or separator membranes, battery separators including such membranes, and/or related methods. In accordance with at least particular embodiments, the disclosure or invention relates to novel or improved microporous polyolefin membranes or separator membranes, microlayer membranes, multi-layer membranes including one or more microlayer or nanolayer membranes, battery separators including such membranes, and/or related methods. In accordance with at least certain particular embodiments, the disclosure or invention relates to novel, optimized or improved microporous stretched polymer membranes or separator membranes having one or more novel or improved exterior layers and/or interior layers, microlayer membranes, multi-layered microporous membranes or separator membranes having exterior layers and interior layers, some of which layers or sublayers are created by co-extrusion and then laminated together to form the novel, optimized or improved membranes or separator membranes. In some embodiments, certain layers, microlayers or nanolayers may comprise a homopolymer, a copolymer, block copolymer, elastomer, and/or a polymer blend. In select embodiments, at least certain layers, microlayers or nanolayers may comprise a different or distinct polymer, homopolymer, copolymer, block copolymer, elastomer, and/or polymer blend. The disclosure or invention also relates to novel or improved methods for making such a membrane, separator membrane, or separator, and/or methods for using such a membrane, separator membrane or separator, for example as a lithium battery separator. In accordance with at least selected embodiments, the present application or invention is directed to novel or improved multi-layered and/or microlayer porous or microporous membranes, separator membranes, separators, composites, electrochemical devices, and/or batteries, and/or methods of making and/or using such membranes, separators, composites, devices and/or batteries. In accordance with at least particular selected embodiments, the present application or invention is directed to novel or improved separator membranes that are multi-layered, in which one or more layers of the multi-layered structure is produced in a multi-layer or microlayer co-extrusion die with multiple extruders. The novel or improved membranes, separator membranes, or separators may preferably demonstrate improved shutdown, improved strength, improved dielectric breakdown strength, and/or reduced tendency to split. In accordance with at least selected embodiments, this application or invention is directed to additives for improved battery performance, improved additive containing membranes, improved battery separators, and/or improved batteries, and/or improved or related methods of manufacture and/or use thereof. In accordance with at least certain embodiments, this application or invention is directed to additive-containing membranes, separator membranes, and/or battery separators, and/or methods for making and/or for using such membranes, separator membranes, and/or battery separators. In accordance with at least particular embodiments, this application or invention is directed to the incorporation of additives into microporous membranes or separator membranes for use in secondary lithium batteries, such as secondary lithium ion batteries, improved battery separators, and/or related methods. In some embodiments, the membrane may contain additives that improve performance in battery chemistries, for example, in lithium ion batteries. In other selected embodiments, the membrane may contain additives that improve pin removal performance such as siloxane or lithium stearate. In other certain embodiments, the invention may also relate to methods for making such a membrane or separator membrane and methods for using such a membrane or separator membrane, for example, as a lithium battery separator. In accordance with at least selected embodiments, the present application or invention is directed to novel or improved porous membranes, separator membranes, separators, dry process separators, composites, electrochemical devices, batteries, methods of making such membranes, separators, composites, devices and/or batteries. In accordance with at least certain selected embodiments, the present invention is directed to a novel or improved separator membrane that contains additives or elastomers. The improved membrane may preferably demonstrate improved shutdown, improved strength, improved dielectric breakdown strength, and/or reduced tendency to split. In accordance with at least certain selected embodiments, this application or invention is directed to battery separators having a microporous polymeric film or membrane and an optional coating layer on at least one side of the microporous polymeric film, wherein at least one of the microporous polymeric film and the optional coating comprises an additive. The additive may be selected from the group of a lubricating agent, a plasticizing agent, a nucleating agent, a shrinkage reducing agent, a surfactant, an SEI improving agent, a cathode protection agent, a flame retardant additive, $LiPF_6$ salt stabilizer, an overcharge protector, an aluminum corrosion inhibitor, a lithium deposition agent or improver, or a solvation enhancer, an aluminum corrosion inhibitor, a wetting agent, a viscosity improver, a friction reducer, a COF reducer, a pin removal force reducer, a co-polymer, a block co-polymer, and/or combinations thereof. Also, described herein are batteries, including primary or secondary lithium ion batteries, comprising one or more of the described films, membranes, coatings, and/or separators. Methods for making the films, membranes, coatings, and/or battery separators are also described. In accordance with at least particular embodiments, this application or invention is directed to improved or novel battery separators having at least one of increased puncture strength, decreased pin removal force, improved electrolyte wettability, and increased pore size, microporous polymeric films with an optional coating layer on at least one side of the microporous polymeric film, battery separators having at least one of an optional coating and an microporous polymeric film including therein and/or thereon an additive selected from the group of a lubricating agent, a surfactant, a nucleating agent, a shrinkage reducing agent, and/or a plasticizing agent, microporous polymeric films having an additive present mainly in at least one surface region of the film or present throughout the film, present in a single surface region of the film, present in a first surface region of the film and in a second surface region of the film that is opposite to the first surface region, a coating applied to a surface of the microporous polymeric film, the coating may be applied to only one surface of the microporous polymeric film, to a first side of the microporous polymeric film and another coating may be applied to a second side of the microporous polymeric film that is opposite to the first side, and/or combinations thereof. In accordance with at least possibly preferred embodiments, the microporous polymeric film or membrane is a microporous polyolefin membrane such as a dry stretch process membrane such as a monolayer dry-process film, a bilayer dry-process film, or a multilayer dry-process film. Also, in accordance with at least possibly preferred embodiments, one, or two, or three, or four, or all five of the different types of additives may be added or a single additive that acts as one, or two, or three, or four, or all five of the different types of additives may be added to the film, coating or separator, for example, an additive that is both a lubricant and a surfactant may be added therein or thereon.

The microporous multilayer battery separators described herein, in some embodiments, exhibit improved safety, strength, and durability compared to prior bi-layer, tri-layer, or multi-layer battery separators. For example, the separators may exhibit increased average Dielectric Breakdown (DB), increased minimum DB, increased shutdown speed, and increased tortuosity, all of which are indicative of a safer battery separator. The separators may also exhibit increased puncture strength and an increased mixed penetration value, indicative of a stronger more durable battery.

These properties of the microporous multilayer battery separators described herein are a result of, at least in part, the method by which they are made. This method, in some embodiments, comprises at least coextruding two or more polymer mixtures to form a first coextruded bi-layer, tri-layer, or multi-layer film, coextruding two or more other polymer mixtures to form a second coextruded bi-layer, tri-layer, or multi-layer film, and coextruding two or more further polymer mixtures to form a third coextruded bi-layer, tri-layer, or multi-layer film. Co-extrusion typically involves use of a co-extrusion die with one or more extruders feeding the die (typically one extruder per layer of the bi-layer, tri-layer, or multi-layer film). The polymer mixtures used to form each layer of the first, second, and third bi-layer, tri-layer, or multi-layer layer film may be the same or different. The mixtures may only include one polymer, or more than one polymer, e.g., polymer blends. Also, more than three bi-layer, tri-layer, or multi-layer films may be formed. After the first, second, and third bi-layer, tri-layer, or multi-layer film is formed, the films are laminated together with two of the films formed on opposite surfaces of one of the films to form the microporous battery separators described herein.

The microporous multilayer battery separators described herein may be used in lithium ion batteries, including secondary lithium batteries, resulting in batteries with improved safety and durability.

The battery separators herein may be described in several different ways.

In a first aspect, a battery separator for a lithium battery is described herein. In some embodiments, the battery separator comprises at least one microporous separator membrane or sub-membrane comprising a plurality of porous or microporous polymer microlayers or nanolayers, wherein at least one of the individual microlayers or nanolayers comprises a different or distinct polymer, molecular weight polymer, homopolymer, copolymer, and/or polymer blend, comprises a different or distinct additive, agent, material, and/or filler, or comprises combinations of different or distinct polymers, molecular weight polymers, homopolymers, copolymers, polymer blends, additives, agents, materials, and/or fillers as compared to an adjacent individual microlayer or nanolayer. In some embodiments, a plurality of said separator membranes or sub-membranes of polymer microlayers or nanolayers are laminated to each other or to a microporous polymer membrane. In some embodiments, at least one of said separator membranes or sub-membranes of polymer microlayers or nanolayers has at least three microlayers or nanolayers. Sometimes, at least one of said separator membranes or sub-membranes of polymer microlayers or nanolayers are made of one or more polyolefins. Sometimes, at least one of said separator membranes or sub-membranes of polymer microlayers or nanolayers are made up of coextruded dry process polyolefin microlayers or nanolayers. In some embodiments, at least two said separator membranes or sub-membranes of polymer microlayers or nanolayers. In some embodiments, at least three said separator membranes or sub-membranes of polymer microlayers or nanolayers.

Described herein is a multilayer microporous film or membrane that may exhibit improved properties, including improved dielectric break down and strength, compared to prior monolayer or tri-layer microporous membranes of the same thickness. The preferred multilayer microporous membrane comprises microlayers and one or more lamination barriers. Also disclosed is a battery separator or battery comprising one or more of the multilayer microporous films or membranes. The inventive battery and battery separator is preferably safer and more robust than batteries and battery separators using prior monolayer and tri-layer microporous membranes. Also, described herein is a method for making the multilayer microporous separators, membranes or films described herein.

Various embodiments of the invention have been described in fulfillment of the various objects of the invention. It should be recognized that these embodiments are merely illustrative of the principles of the present invention. Numerous modifications and adaptations will be readily apparent to those skilled in the art without departing from the spirit and scope of this invention.

The present invention may be embodied in other forms without departing from the spirit and the essential attributes thereof, and, accordingly, reference should be made to the appended claims, rather than to the foregoing specification, as indicating the scope of the invention. Disclosed are components that may be used to perform the disclosed methods and systems. These and other components are disclosed herein, and it is understood that when combinations, subsets, interactions, groups, etc. of these components are disclosed that while specific reference of each various individual and collective combinations and permutation of these may not be explicitly disclosed, each is specifically contemplated and described herein, for all methods and systems. This applies to all aspects of this application including, but not limited to, steps in disclosed methods. Thus, if there are a variety of additional steps that may be performed it is understood that each of these additional steps may be performed with any specific embodiment or combination of embodiments of the disclosed methods.

The foregoing written description of structures and methods has been presented for purposes of illustration only. Examples are used to disclose exemplary embodiments, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The compositions and methods of the appended claims are not limited in scope by the specific compositions and methods described herein. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

As used in the specification and the appended claims, the singular forms "a," "an," and "the" include plural referents unless the context clearly dictates otherwise. Ranges may be expressed herein as from "about" or "approximately" one particular value, and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. "Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers, or steps. The terms "consisting essentially of" and "consisting of" may be used in place of "comprising" and "including" to provide for more specific embodiments of the invention and are also disclosed. "Exemplary" or "for example" means "an example of" and is not intended to convey an indication of a preferred or ideal embodiment. Similarly, "such as" is not used in a restrictive sense, but for explanatory or exemplary purposes.

Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

Unless defined otherwise, all technical and scientific terms used herein have the same meanings as commonly understood by one of skill in the art to which the disclosed invention belongs. Publications cited herein and the materials for which they are cited are specifically incorporated by reference.

Additionally, the invention illustratively disclosed herein suitably may be practiced in the absence of any element which is not specifically disclosed herein.

The invention claimed is:

1. A battery separator for a lithium battery comprising:
    at least one microporous separator membrane or sub-membrane comprising a plurality of porous or microporous polymer microlayers or nanolayers, wherein:
        at least one of the individual microlayers or nanolayers comprises a different or distinct polymer, molecular weight polymer, homopolymer, copolymer, and/or polymer blend, or comprises a different or distinct additive, agent, material, and/or filler, or comprises combinations of different or distinct polymers, molecular weight polymers, homopolymers, copolymers, polymer blends, additives, agents, materials, and/or fillers as compared to an adjacent individual microlayer or nanolayer
        wherein the battery separator has a puncture strength of 290 gf or more;
        wherein each of the plurality of porous or microporous polymer microlayers or nanolayers are dry process microlayers or nanolayers;
        wherein at least three consecutive microlayers or nanolayers each have a thickness of 0.1 to 2 microns.

2. The battery separator of claim 1 wherein a plurality of said microporous separator membranes or sub-membranes are laminated to each other or to a microporous polymer membrane.

3. The battery separator of claim 1 wherein at least one of said microporous separator membranes has at least three microlayers or nanolayers.

4. The battery separator of claim 1 wherein at least one of said microporous separator membranes or sub-membranes is made of one or more polyolefins.

5. The battery separator of claim 1 wherein at least one of said microporous separator membranes or sub-membranes is made up of coextruded dry process polyolefin microlayers or nanolayers.

6. The battery separator of claim 1 comprising at least two of said microporous separator membranes or sub-membranes.

7. The battery separator of claim 1 comprising at least three of said microporous separator membranes or sub-membranes.

8. A lithium battery comprising the battery separator of claim 1.

9. The battery separator of claim 1, wherein the at least three consecutive microlayers or nanolayers.

10. The battery separator of claim 9, wherein the at least three consecutive coextruded microlayers or nanolayers were laminated with a microporous polymer membrane to form the battery separator.

11. The battery separator of claim 10, wherein the microporous polymer membrane is a co-extruded polymer membrane.

12. The battery separator of claim 1, wherein the at least three consecutive microlayers or nanolayers comprise a polyolefin or a polyolefin blend.

13. The battery separator of claim 1, wherein the battery separator comprises 9 or more microlayers or nanolayers.

14. The battery separator of claim 1, wherein the battery separator has a puncture strength of 300 gf or more.

15. A method for forming an improved battery separator comprising a multilayer microporous membrane, the method comprising:
    forming the multilayer microporous membrane by coextruding at least three layers, at least four layers, at least 5 layers, at least 6 layers, at least 7 layers, at least 8 layers, at least 9 layers, or at least 10 layers, wherein the multilayer microporous membrane has at least three co-extruded layers each having a thickness of 0.1 to 2 microns; and
    laminating the multilayer microporous membrane to at least one other microporous membrane to form the improved battery separator.

16. The method of claim 15, wherein the other microporous membrane is a coextruded membrane or a mono-extruded membrane.

17. The method of claim 15, wherein the multilayer microporous membrane is laminated to at least two other microporous membranes.

18. A battery separator made by the method of claim 15.

* * * * *